United States Patent
Tatsumura et al.

(10) Patent No.: US 10,397,139 B2
(45) Date of Patent: *Aug. 27, 2019

(54) STORAGE DEVICE IN WHICH FORWARDING-FUNCTION-EQUIPPED MEMORY NODES ARE MUTUALLY CONNECTED AND DATA PROCESSING METHOD

(71) Applicant: TOSHIBA MEMORY CORPORATION, Tokyo (JP)

(72) Inventors: Kosuke Tatsumura, Kawasaki (JP); Atsuhiro Kinoshita, Kamakura (JP); Hirotaka Nishino, Yokohama (JP); Masamichi Suzuki, Tokyo (JP); Yoshifumi Nishi, Yokohama (JP); Takao Marukame, Tokyo (JP); Takahiro Kurita, Kawasaki (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,216

(22) Filed: Jul. 16, 2018

(65) Prior Publication Data

US 2018/0324111 A1 Nov. 8, 2018

Related U.S. Application Data

(63) Continuation of application No. 14/974,245, filed on Dec. 18, 2015, now Pat. No. 10,044,642, which is a
(Continued)

(30) Foreign Application Priority Data

Nov. 10, 2010 (JP) .................................. 2010-252336

(51) Int. Cl.
*H04L 12/937* (2013.01)
*H04L 12/741* (2013.01)
(Continued)

(52) U.S. Cl.
CPC .......... *H04L 49/253* (2013.01); *G06F 3/0605* (2013.01); *G06F 3/0635* (2013.01);
(Continued)

(58) Field of Classification Search
CPC ... H04L 12/6418; H04L 45/74; H04L 49/253; H04L 12/4633; H04L 12/66;
(Continued)

(56) References Cited

U.S. PATENT DOCUMENTS 5,463,381 A * 10/1995 Ryu .................... G06F 16/2282
5,751,934 A 5/1998 Han et al.
(Continued)

FOREIGN PATENT DOCUMENTS

CN 1490979 A 4/2004
CN 101841471 A 9/2010
(Continued)

OTHER PUBLICATIONS

Chinese Fourth Office Action dated Dec. 29, 2015, from corresponding Chinese Patent Application No. 201110274966.0, 16 pages.
(Continued)

*Primary Examiner* — Tuan V Thai
*Assistant Examiner* — Edward Waddy, Jr.
(74) *Attorney, Agent, or Firm* — Oblon, McClelland, Maier & Neustadt, L.L.P.

(57) ABSTRACT

According to one embodiment, a storage device includes a plurality of memory nodes. Each of memory nodes includes a plurality of input ports, a plurality of output ports, a selector, a packet controller and a memory. The selector
(Continued)

outputs a packet input to the input port to one of the output ports. The packet controller controls the selector. The memory stores data. The memory nodes are mutually connected at the input ports and the output ports. The memory node has an address that is determined by its physical position. The packet controller switches the output port that outputs the packet based on information including at least a destination address of the packet and an address of the memory node having the packet controller when receiving a packet that is not addressed to the memory node having the packet controller.

18 Claims, 60 Drawing Sheets

Related U.S. Application Data continuation of application No. 13/293,399, filed on Nov. 10, 2011, now Pat. No. 9,246,709.

(51) Int. Cl.
  *G06F 3/06* (2006.01)
  *H04L 12/64* (2006.01)

(52) U.S. Cl.
  CPC .......... *G06F 3/0656* (2013.01); *G06F 3/0658* (2013.01); *G06F 3/0683* (2013.01); *H04L 12/6418* (2013.01); *H04L 45/74* (2013.01)

(58) Field of Classification Search
  CPC ........... H04L 29/12377; H04L 61/2517; H04L 45/54; H04L 45/60; H04L 45/742; H04L 45/00; H04L 45/38; G06F 3/0605; G06F 3/0635; G06F 3/0656; G06F 3/0658; G06F 3/0683; G06F 2212/1016; G06F 3/0608; G06F 3/0638
  USPC ......... 711/E12.002, 103, 200; 370/392, 229, 370/331, 401; 707/E17.041, 999.107; 719/318
  See application file for complete search history.

(56) References Cited

U.S. PATENT DOCUMENTS

| | | | |
|---|---|---|---|
| 5,926,101 A * | 7/1999 | Dasgupta | H04L 45/48 340/2.81 |
| 6,230,303 B1 | 5/2001 | Dave | |
| 6,456,624 B1 | 9/2002 | Eccles et al. | |
| 6,457,100 B1 | 9/2002 | Ignatowski et al. | |
| 7,213,106 B1 * | 5/2007 | Koster | G06F 12/0833 711/119 |
| 7,325,095 B2 | 1/2008 | Williams | |
| 7,633,940 B1 * | 12/2009 | Singh | H04L 45/12 370/237 |
| 7,975,109 B2 * | 7/2011 | McWilliams | G06F 12/0284 711/147 |
| 8,204,054 B2 * | 6/2012 | Ajima | G06F 15/17368 370/389 |
| 2003/0191855 A1 * | 10/2003 | Lee | G06F 15/17337 709/239 |
| 2004/0076154 A1 | 4/2004 | Mizutani et al. | |
| 2006/0059196 A1 | 3/2006 | Sato et al. | |
| 2006/0200696 A1 | 9/2006 | Shimada | |
| 2007/0083728 A1 | 4/2007 | Nijhawan et al. | |
| 2008/0133633 A1 | 6/2008 | Bhanot et al. | |
| 2008/0138067 A1 | 6/2008 | Beshai | |
| 2008/0301256 A1 | 12/2008 | McWilliams et al. | |
| 2009/0147725 A1 * | 6/2009 | Shin | H04B 7/155 370/315 |
| 2009/0216924 A1 | 8/2009 | Bennett | |
| 2010/0110934 A1 * | 5/2010 | Li | G06F 12/0831 370/256 |
| 2010/0238944 A1 | 9/2010 | Ajima et al. | |
| 2010/0241783 A1 | 9/2010 | Garcia et al. | |

FOREIGN PATENT DOCUMENTS

| | | |
|---|---|---|
| JP | 4-148484 A | 5/1992 |
| JP | 11-32057 | 2/1999 |
| JP | 2003-174460 A | 6/2003 |
| JP | 2004-140539 A | 5/2004 |
| JP | 2006-243967 A | 9/2006 |
| JP | 2008-537265 A | 9/2008 |
| JP | 2009-037273 A | 2/2009 |
| JP | 4385387 B1 | 12/2009 |
| JP | 2010-218364 A | 9/2010 |
| WO | WO 2008/149784 | 12/2008 |

OTHER PUBLICATIONS

Chinese First Office Action dated May 5, 2014, from corresponding Chinese Patent Application No. 201110274966.0, 30 pages.
Taiwan Office Action dated Apr. 29, 2014, from corresponding Taiwan Patent Application No. 100132486, 25 pages.
Japanese Office Action dated Aug. 20, 2013, from corresponding Japanese Patent Application No. 2013-064768, 13 pages.
Chinese Third Office Action dated Jul. 7, 2015, from corresponding Chinese Patent Application No. 201110274966.0, 9 pages.
Japanese First Office Action dated Jul. 7, 2015, from corresponding Japanese Patent Application No. 2014-191969, 11 pages.
Japanese Final Office Action dated Mar. 1, 2016, from corresponding Japanese Patent Application No. 2014-191969, 8 pages.
Japanese First Office Action dated Oct. 23, 2012, from corresponding Japanese Patent Application No. 2010-252336; 6 pages.
Korean Notice of Preliminary Rejection dated Nov. 13, 2012, from corresponding Korean Patent Application No. 10-2011-92935, 9 pages.

* cited by examiner $|e_x| = |e_y|$  
$\alpha = 90°$  
Number of mutual connection ports = 4

$|e_x| \neq |e_y|$  
$\alpha = 90°$  
Number of mutual connection ports = 4

$|e_x| \neq |e_y|$
$\alpha \neq 90°$
Number of mutual connection ports = 4

$|e_x| = |e_y|$
$\alpha = 60°$
Number of mutual connection ports = 6

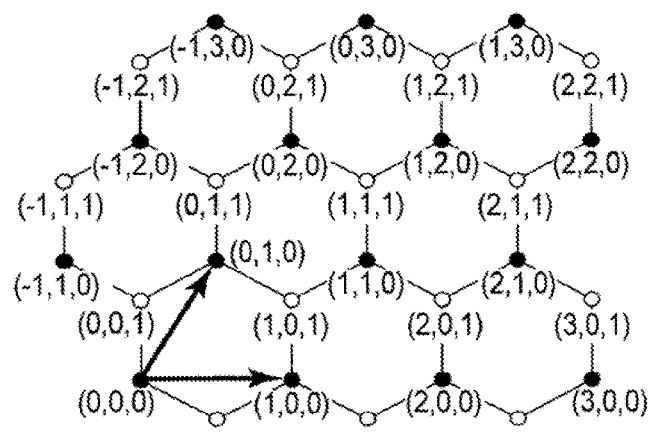
$|e_x| = |e_y|$
$\alpha = 60°$
Number of mutual connection ports = 3
F I G. 3 E
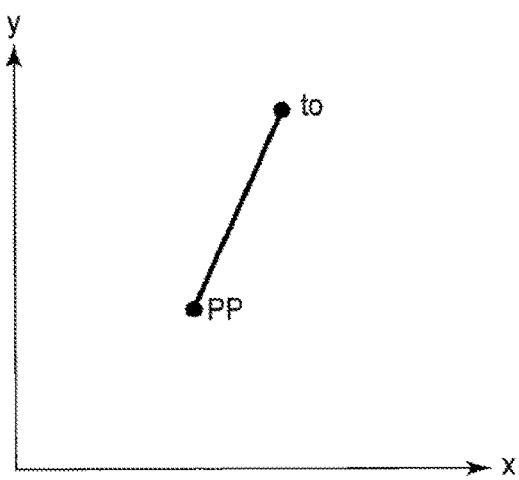
F I G. 4

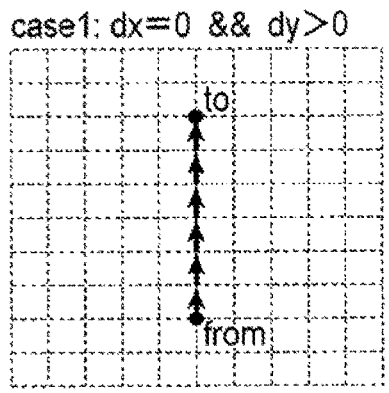
case1: dx=0 && dy>0
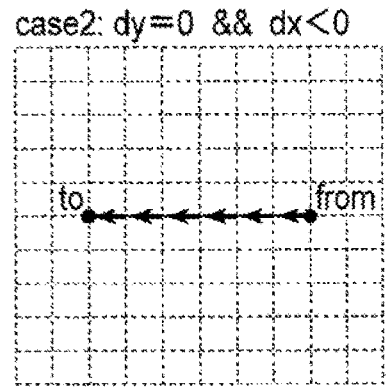
case2: dy=0 && dx<0
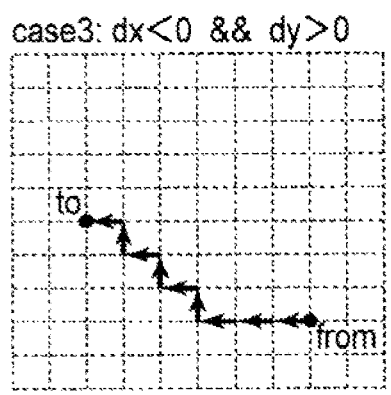
case3: dx<0 && dy>0
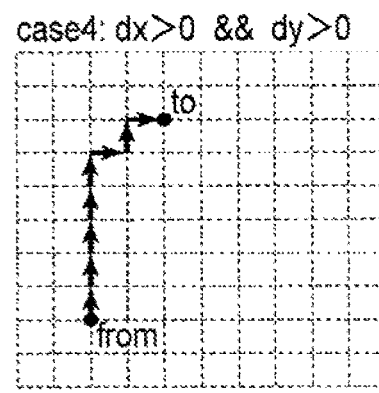
case4: dx>0 && dy>0
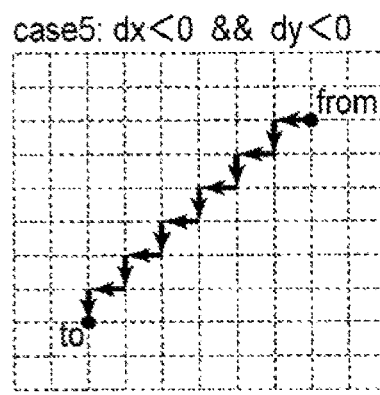
case5: dx<0 && dy<0
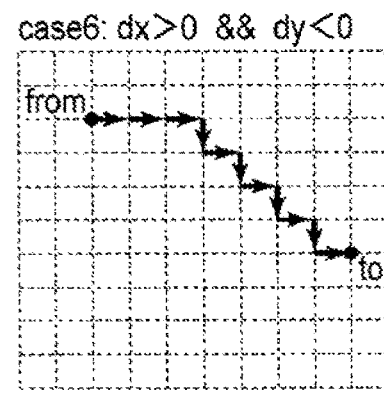
case6: dx>0 && dy<0
F I G. 5 D

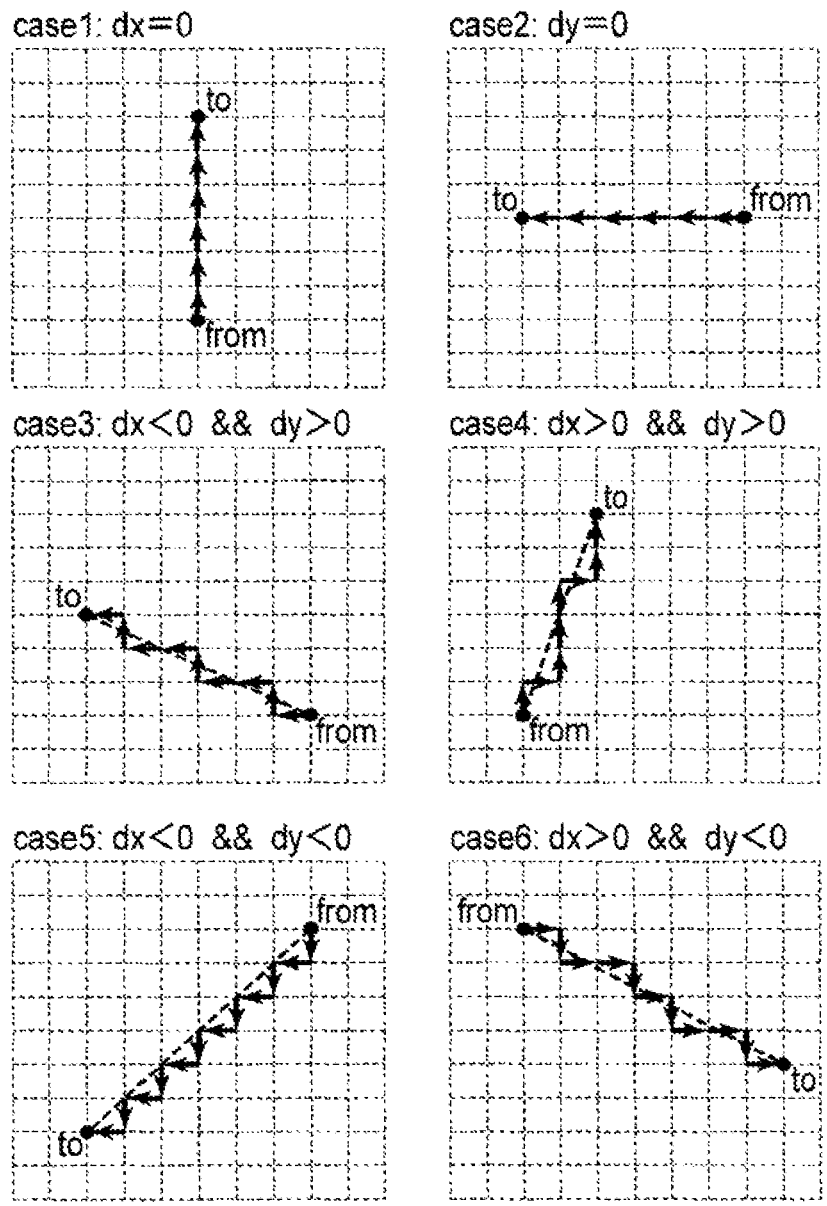
F I G. 11D

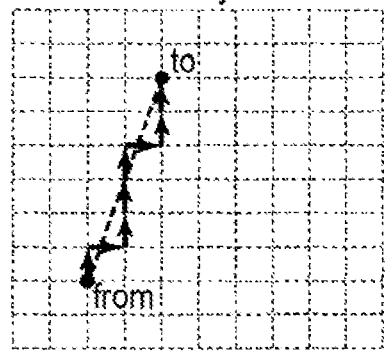
case1: without jam
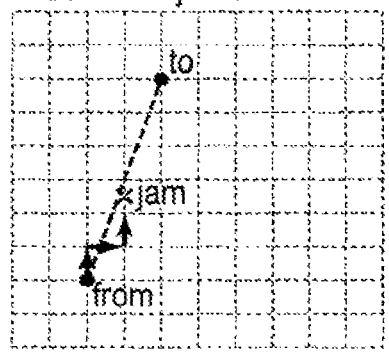
case2: with jam1
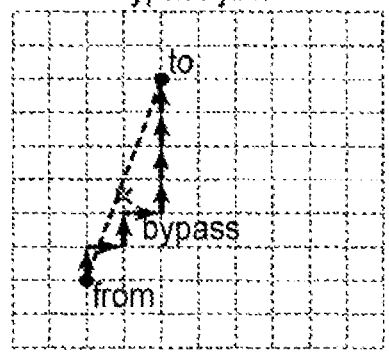
case3: bypass jam1
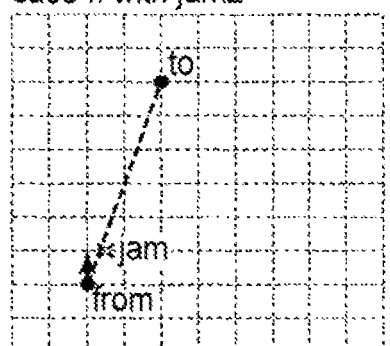
case4: with jam2
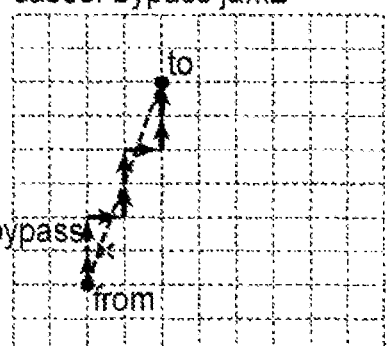
case5: bypass jam2
FIG. 14D

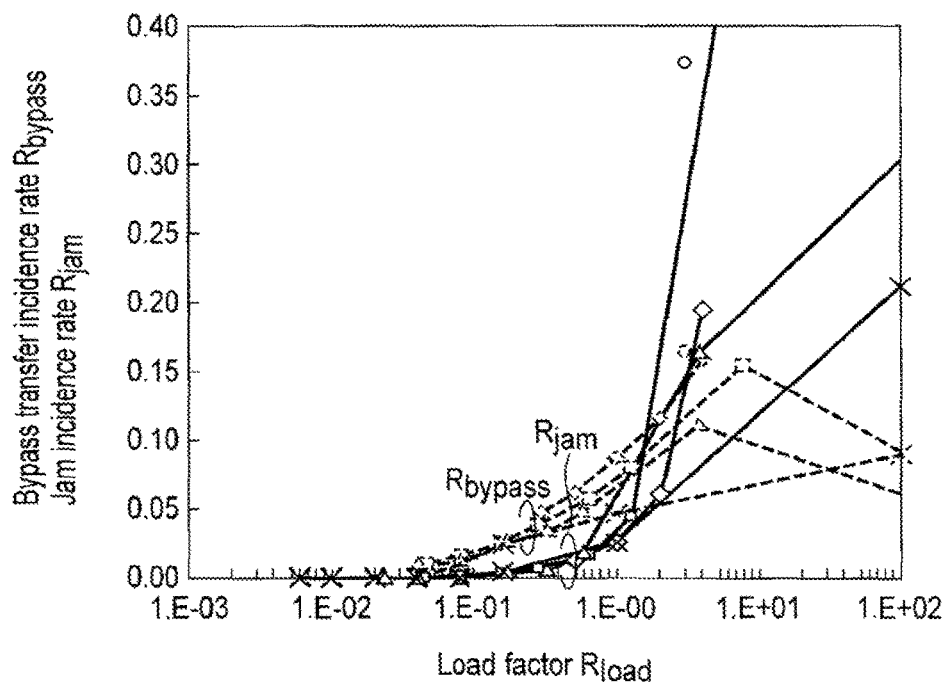
F I G. 18

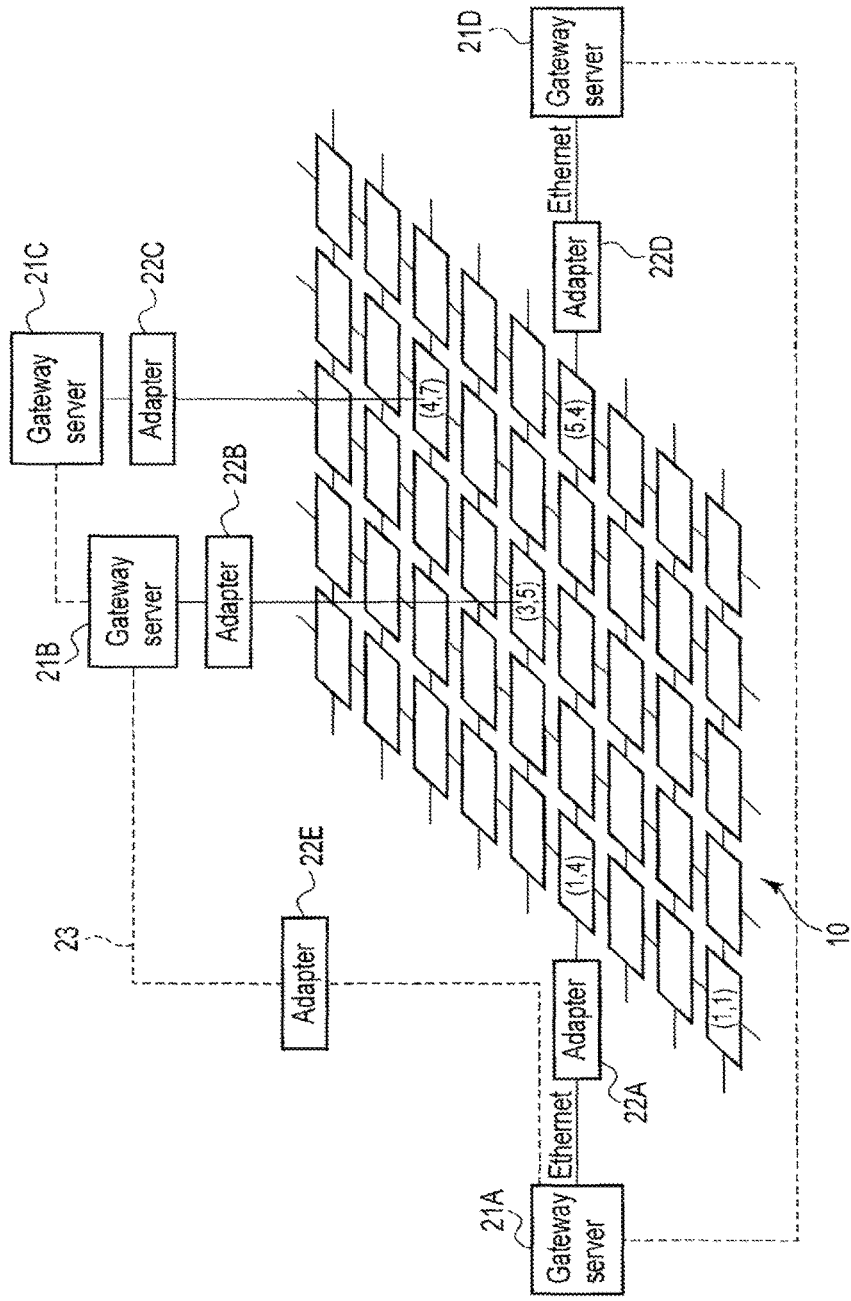
F I G. 21

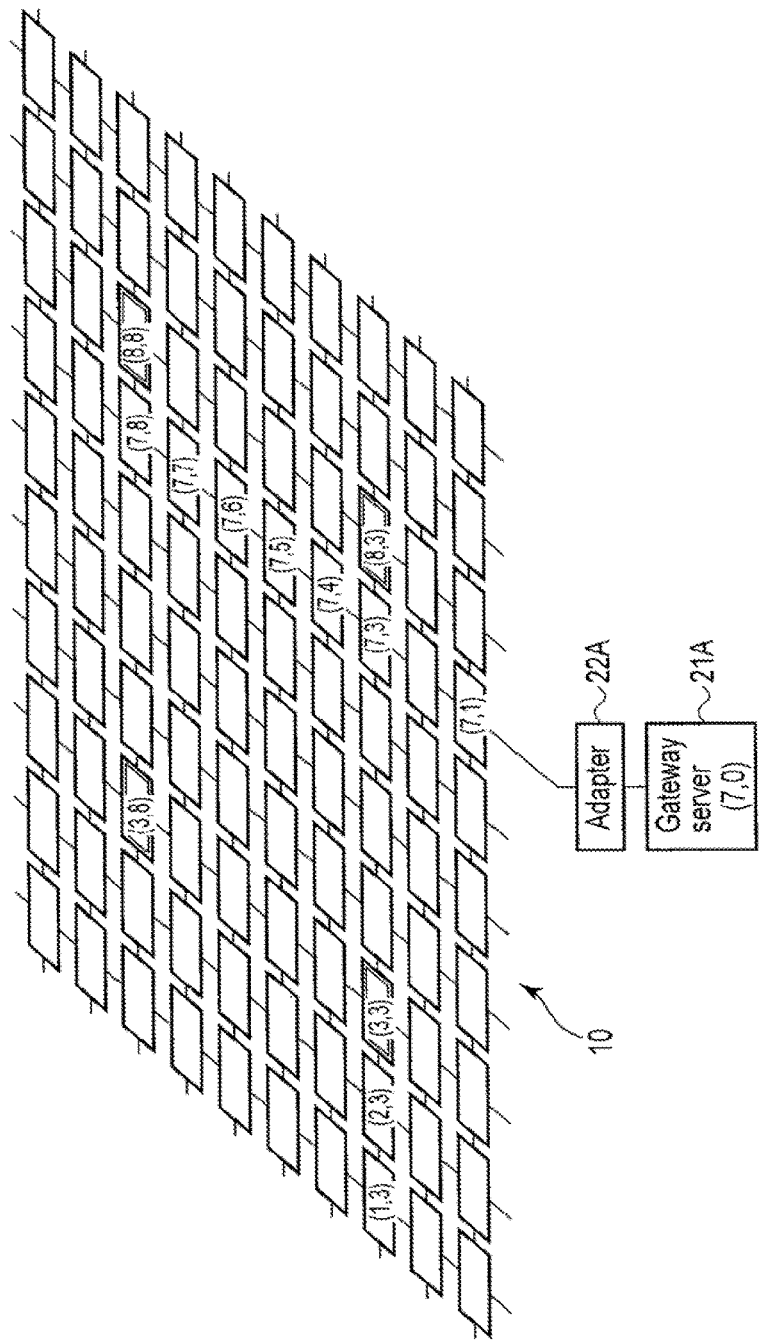
F I G. 23

| Temporary destination node address and type | Temporary source node address and type | First relay node sub-address | Second relay node sub-address | Final destination node main address | Source node main address |
|---|---|---|---|---|---|
| | | | | | |
F I G. 24
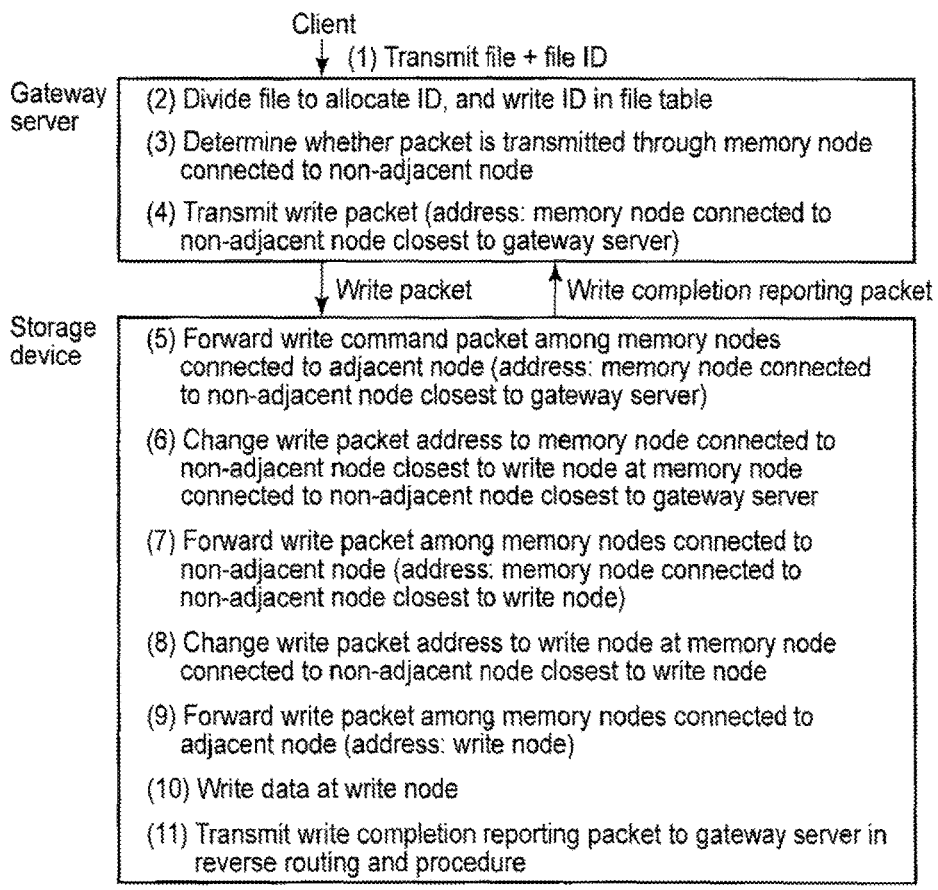
F I G. 25

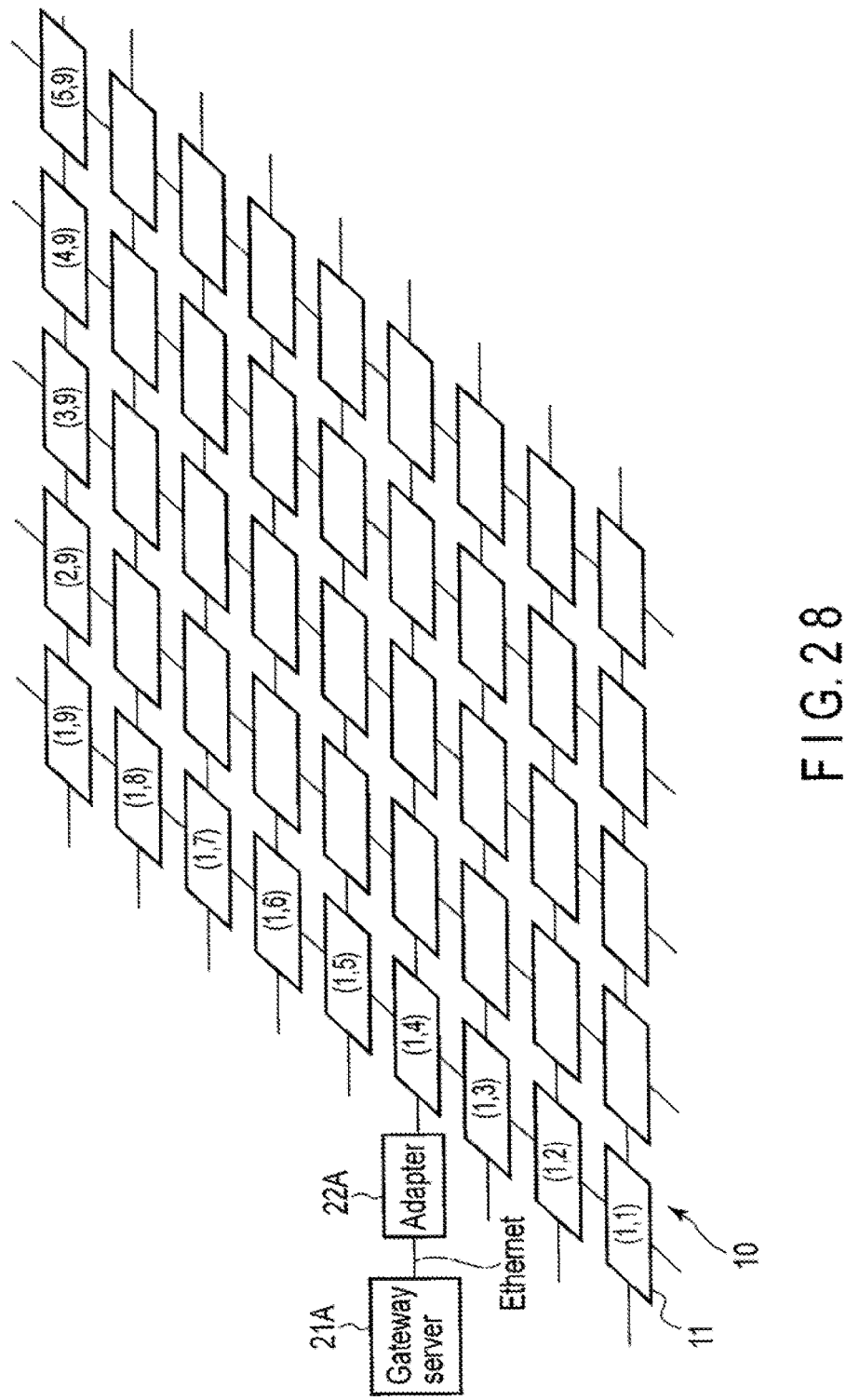
F I G. 28

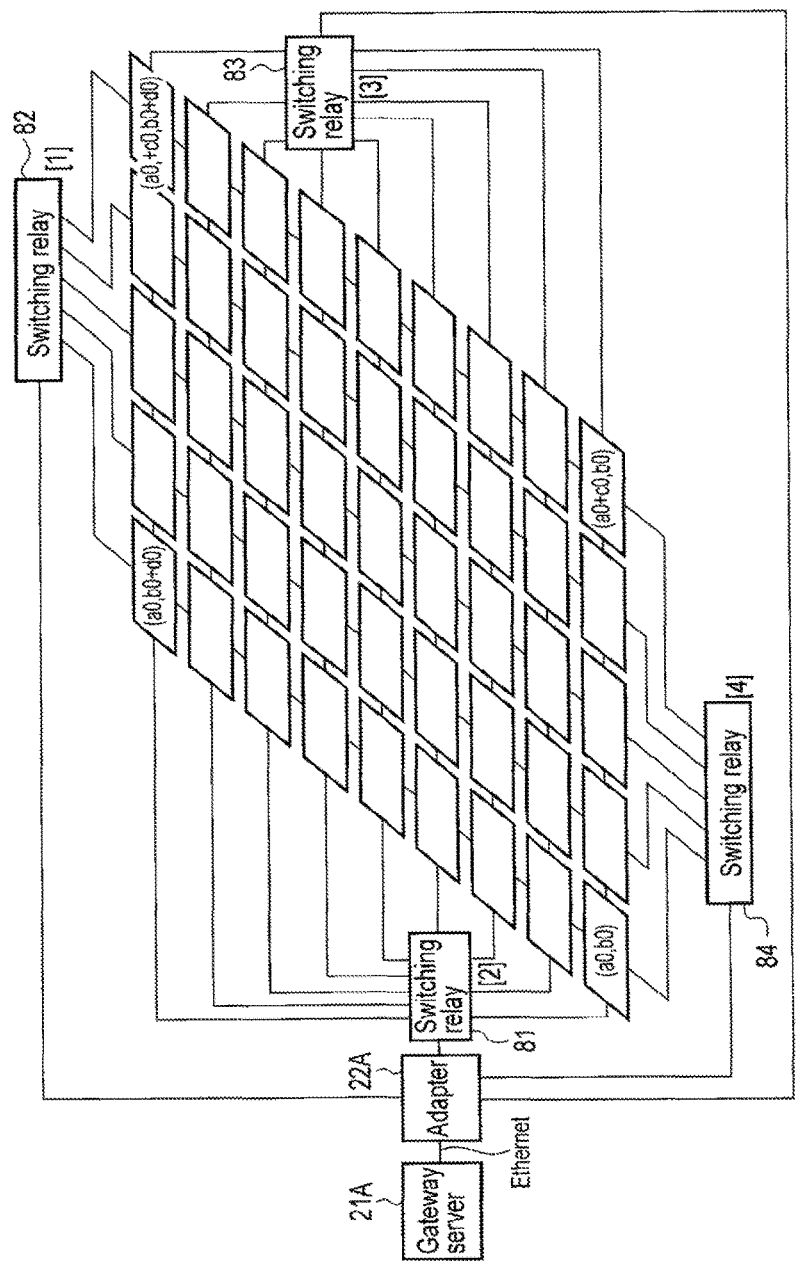
F I G. 3 1

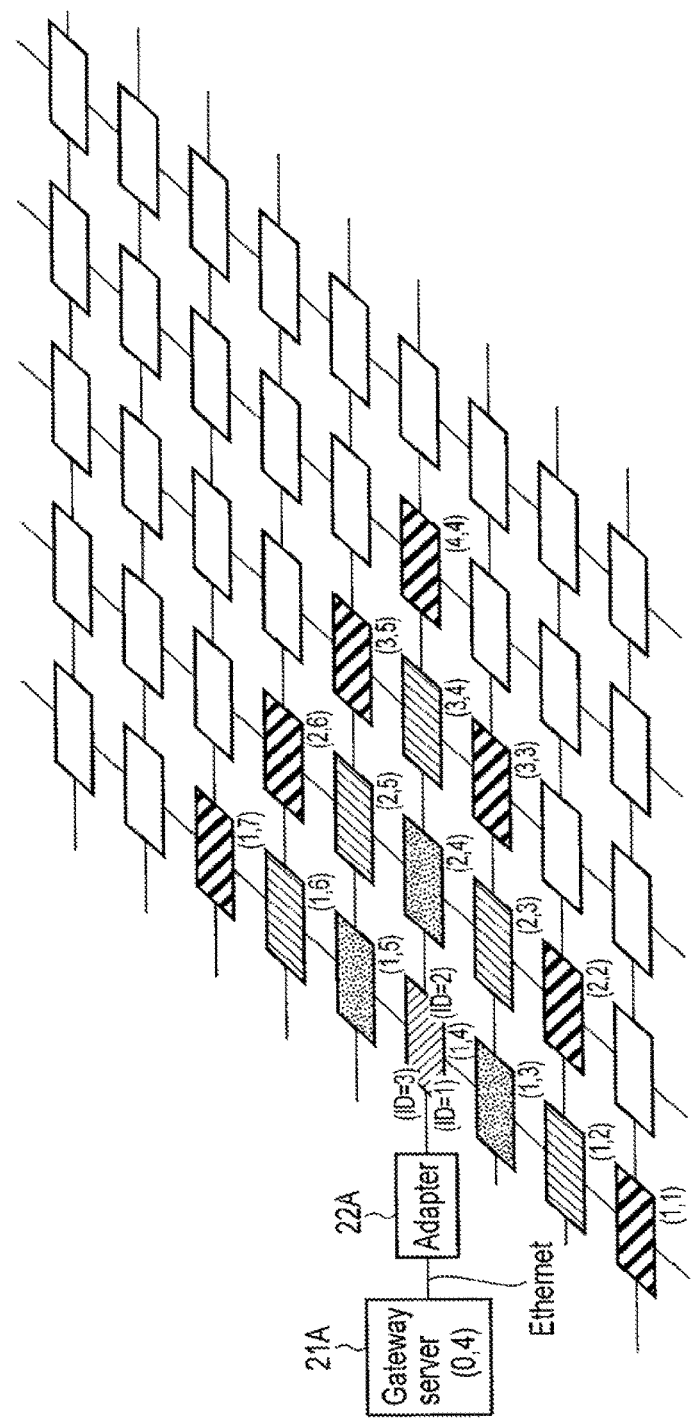
F I G. 33 D

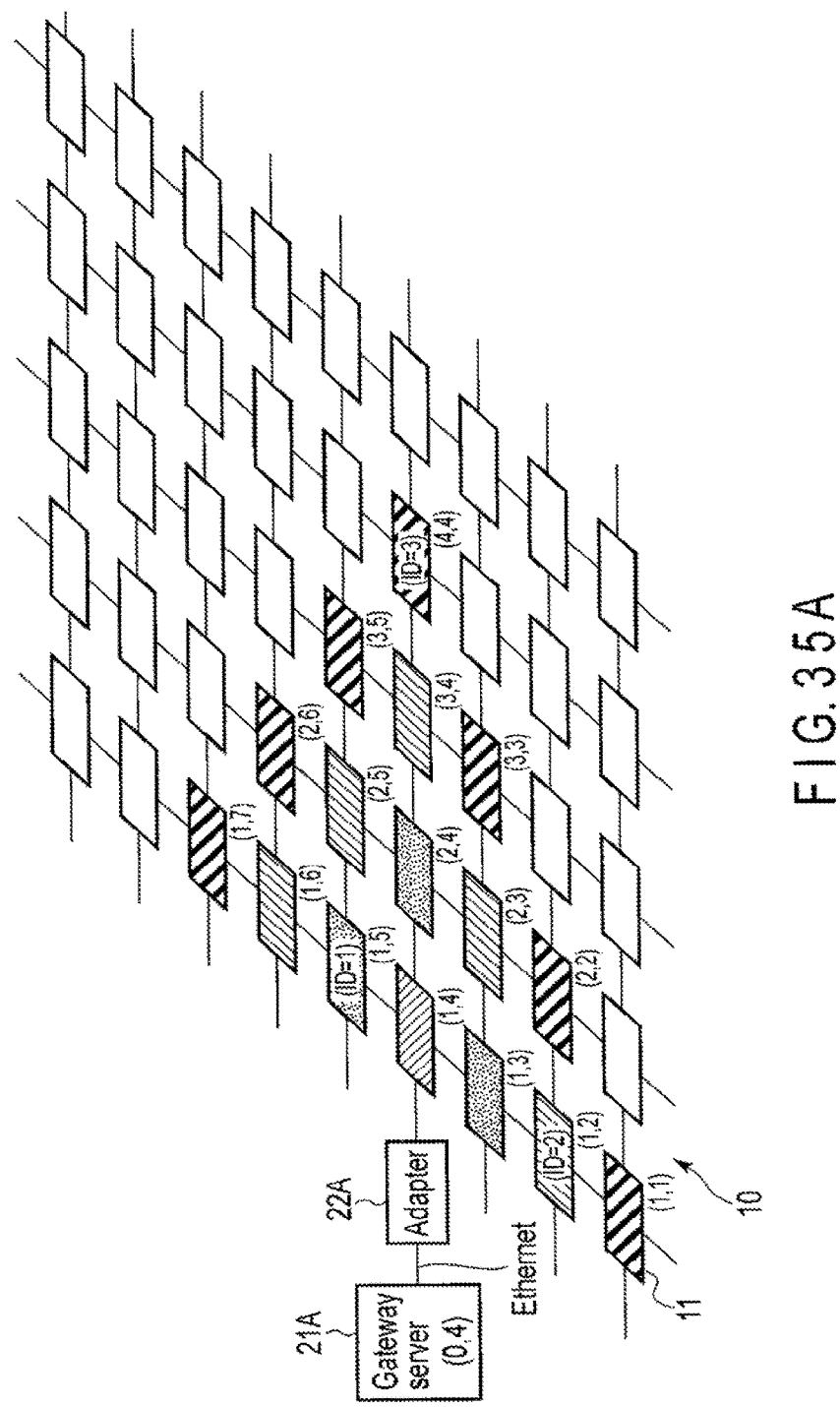
F I G. 35A

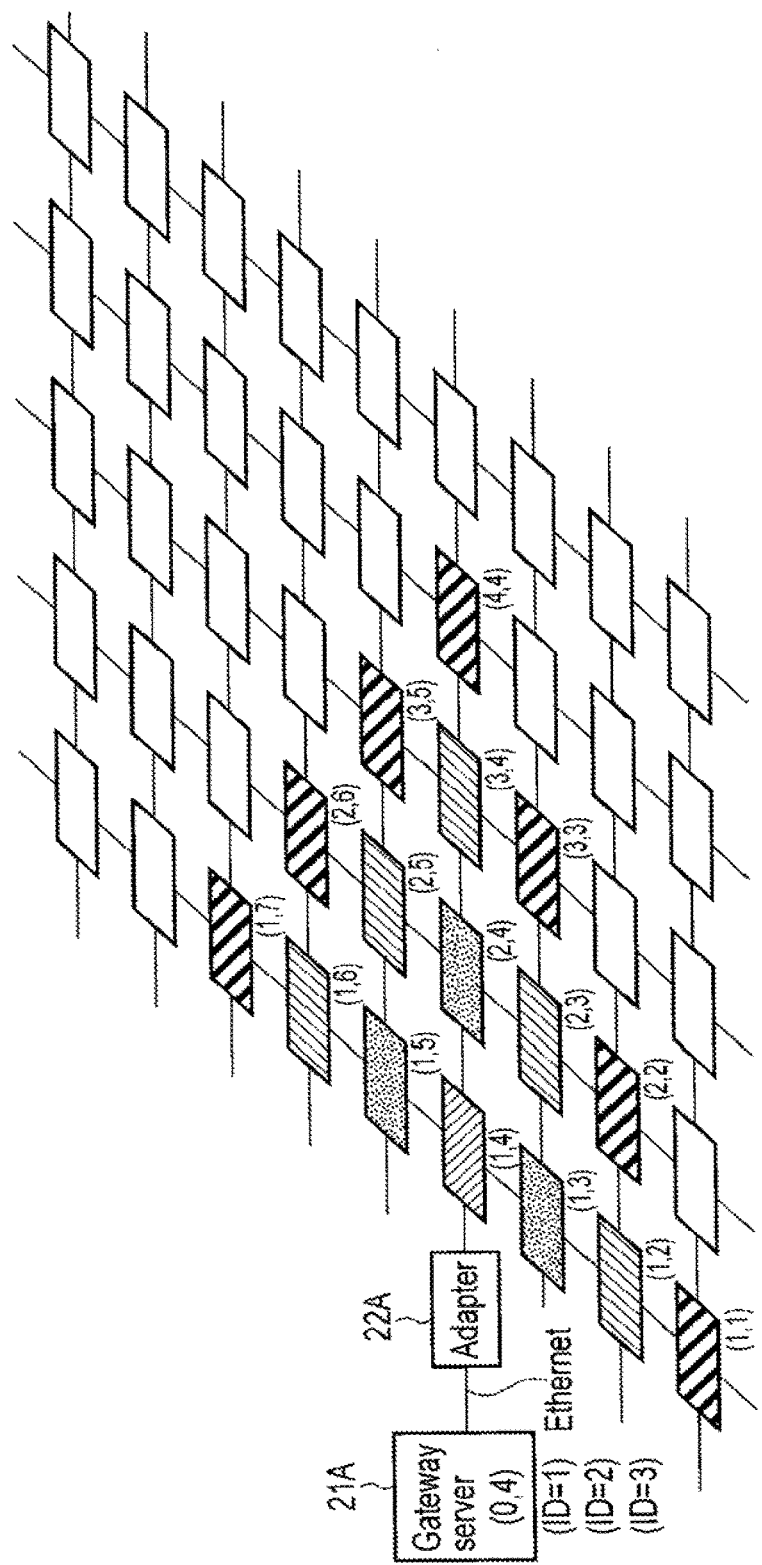
F I G. 35 B

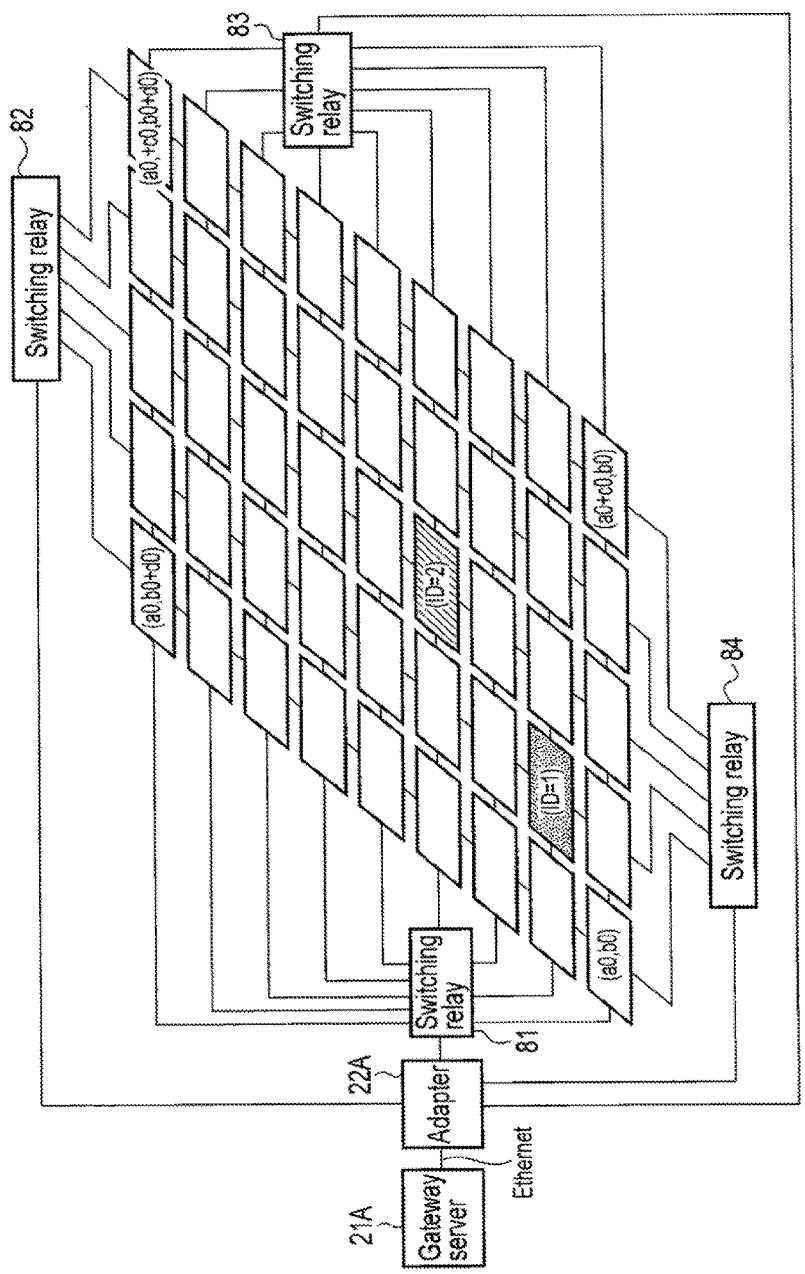
F I G. 36 C

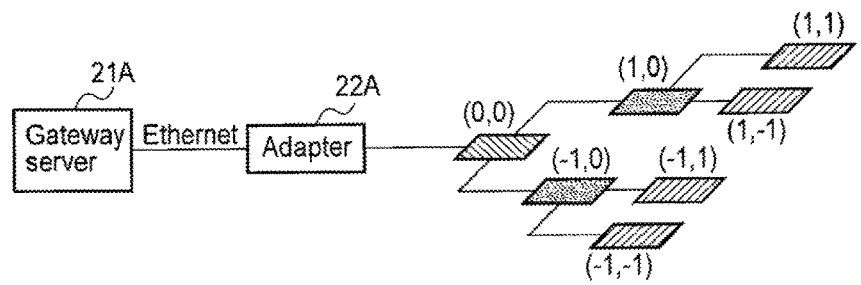
F I G. 3 6 E
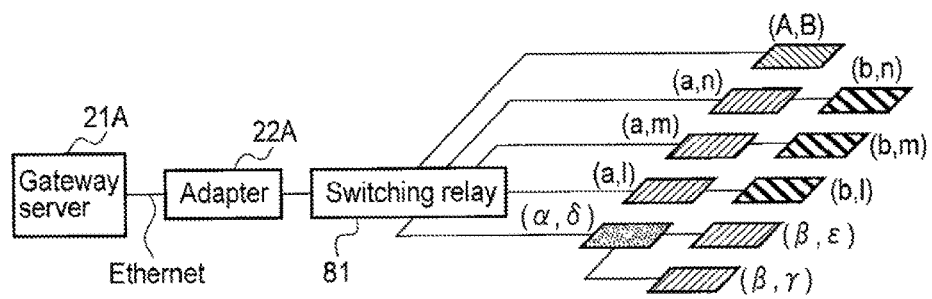
F I G. 3 6 F

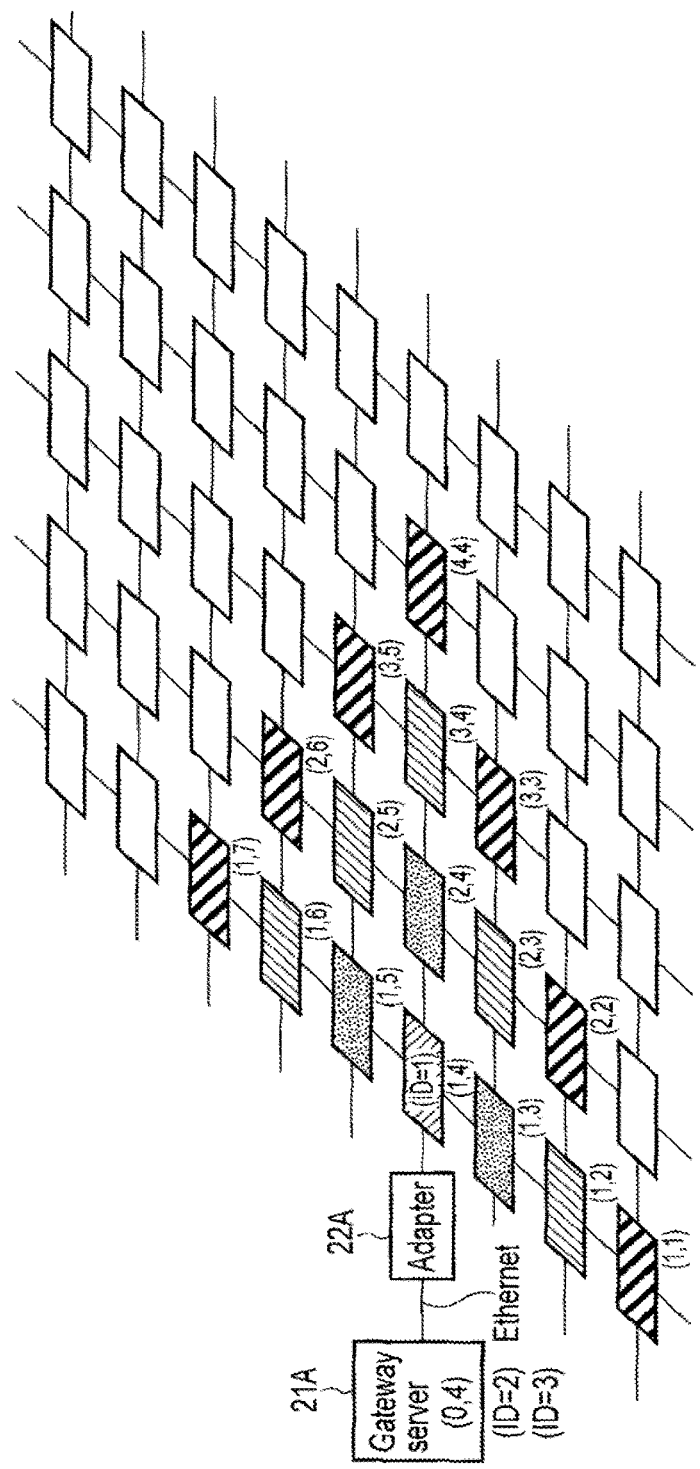
F I G. 37B

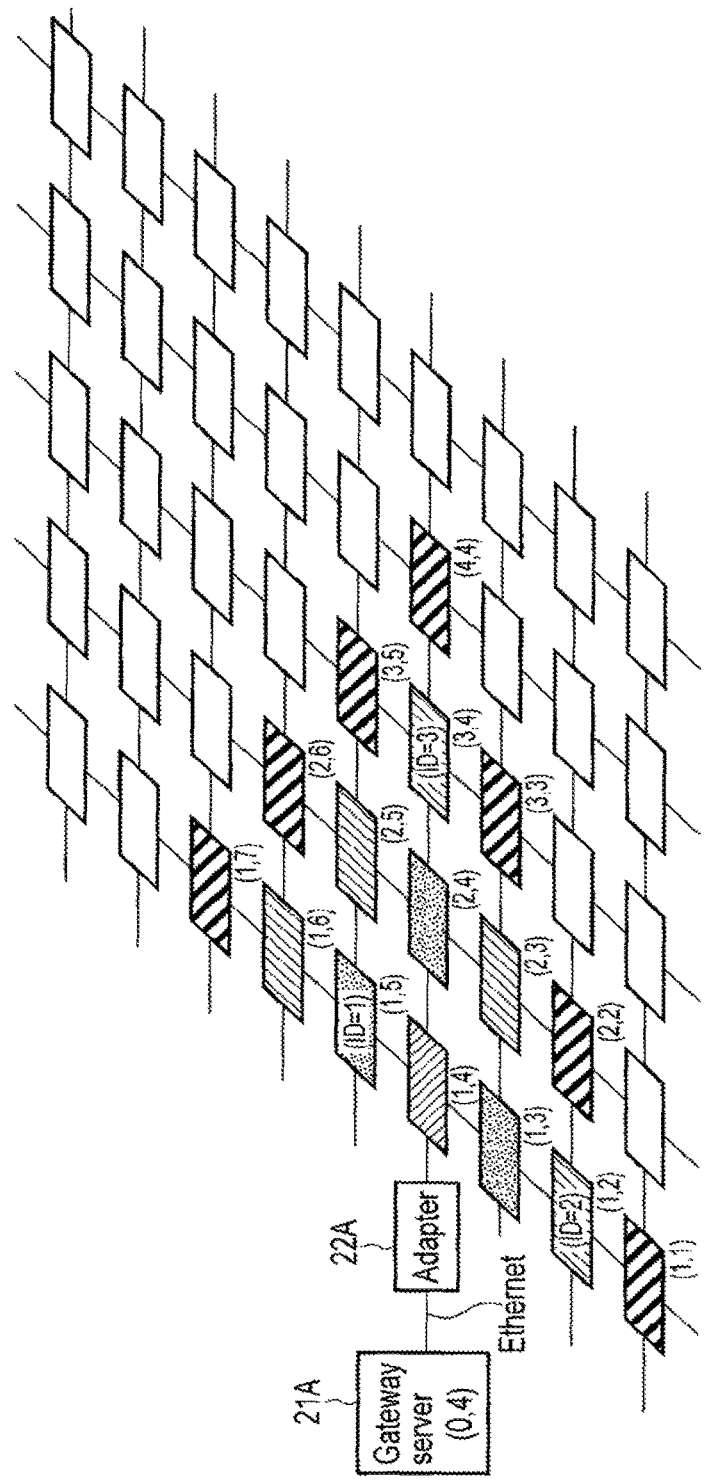
F I G. 37 F

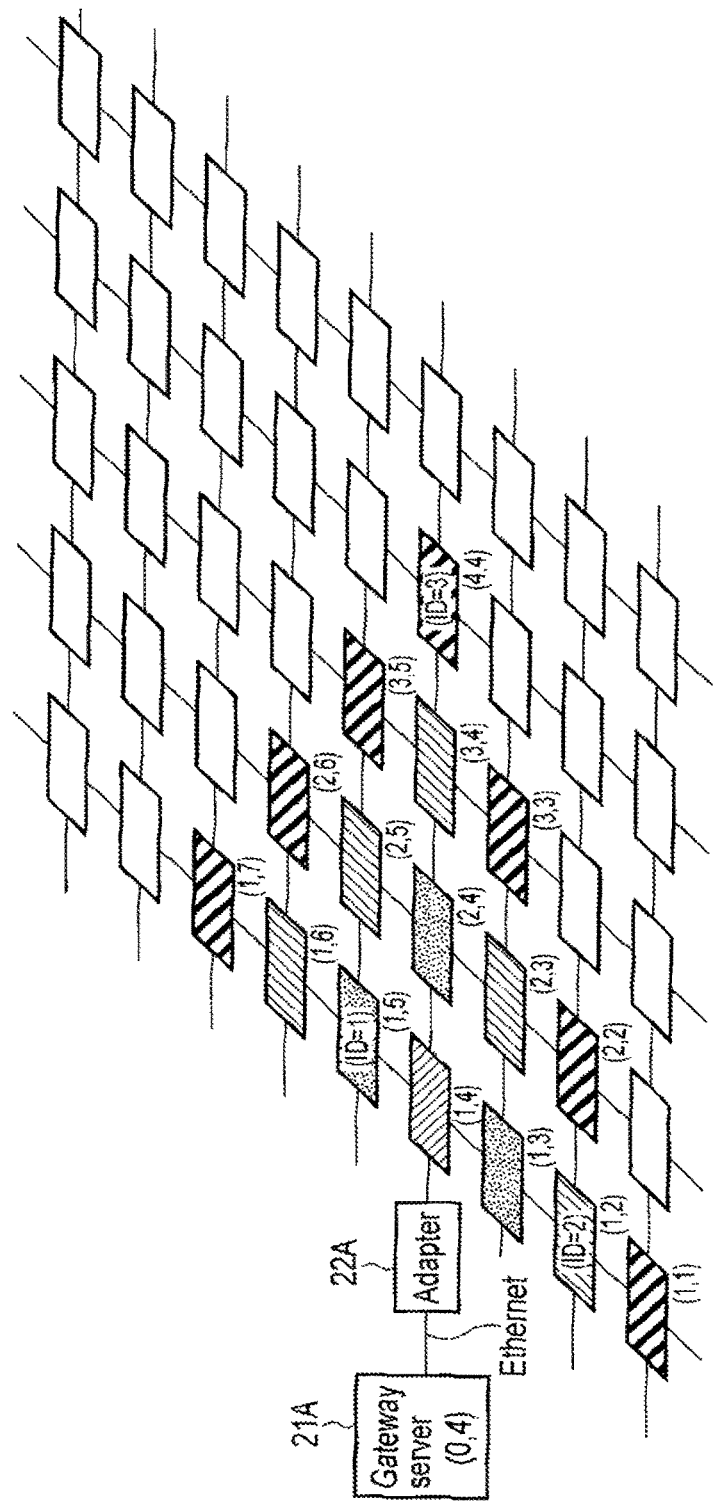
F I G. 37 G

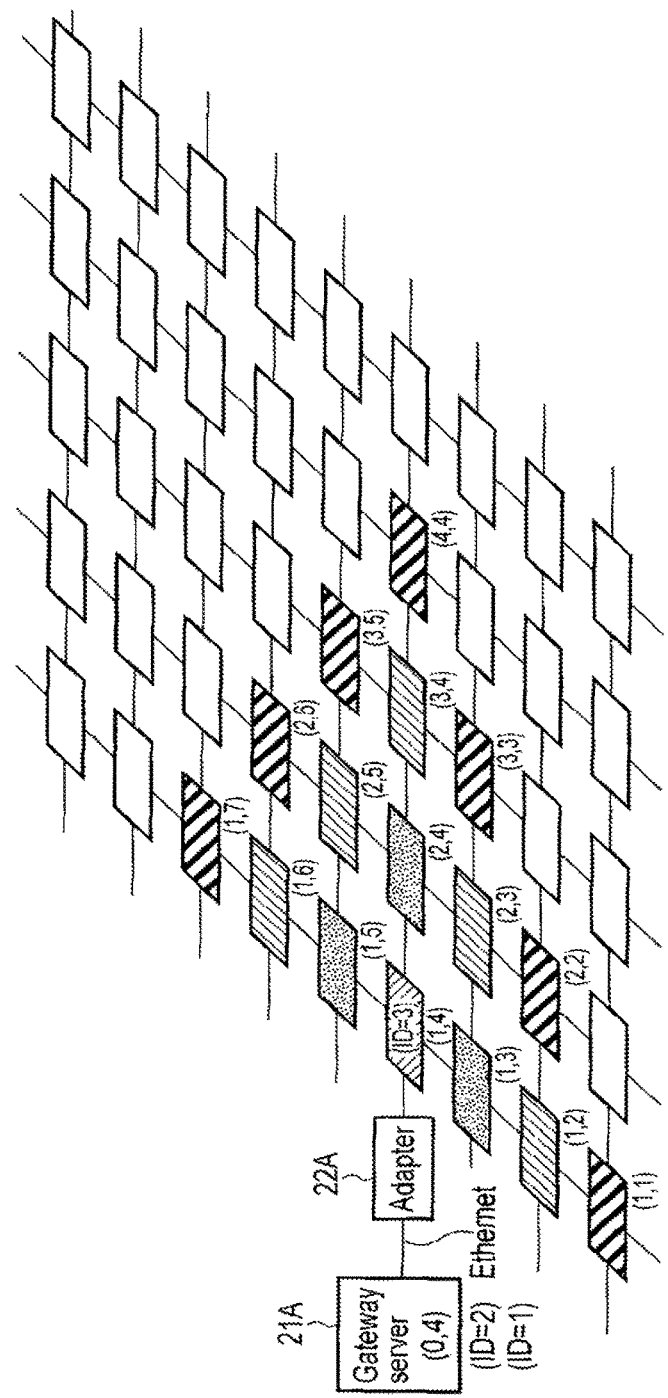
F I G. 38 B

STORAGE DEVICE IN WHICH
FORWARDING-FUNCTION-EQUIPPED
MEMORY NODES ARE MUTUALLY
CONNECTED AND DATA PROCESSING
METHOD

CROSS-REFERENCE TO RELATED
APPLICATIONS

This application is a continuation of U.S. application Ser. No. 14/974,245, filed on Dec. 18, 2015, which is a continuation of U.S. application Ser. No. 13/293,399, filed Nov. 10, 2011, now U.S. Pat. No. 9,246,709, which claims priority to Japanese Patent Application No. 2010-252336, filed on Nov. 10, 2010, the entire contents of each of which are incorporated herein by reference.

FIELD

Embodiments described herein relate generally to a storage device in which forwarding-function-equipped memory nodes are mutually connected and a data processing method, for example, to a data packet forwarding control method in the storage device.

BACKGROUND

A storage device in which forwarding-function-equipped memory nodes are mutually connected is conceivable as a storage device in which a capacity can easily be expanded. Each memory node performs given processing such as read and write in the case that the memory node receives a data packet addressed thereto. On the other hand, in the case that the memory node receives the data packet that is not addressed thereto, the memory node properly forwards the received data packet to another memory node. Each memory node properly performs the forwarding, which allows the data packet to reach the destination memory node.

Each memory node includes a memory, a controller equipped with the forwarding function, and ports. Each memory node maintains and manages a routing table indicating a forwarding destination of the packet, and forwards the packet according to the routing table. When the routing table is managed, any logical packet forwarding network can foe constructed irrespective of the physical position of each memory node.

However, in the case that a new memory node is added in order to expand the capacity, or in the case that the existing memory node is removed due to a malfunction and the like, it is necessary to update the routing table of each memory node, and a procedure to update the routing table becomes troublesome. In the case that the number of memory nodes is significantly increased, a huge amount of computing cost is necessary to maintain and manage the routing table, which sets a restriction to expandability of the capacity.

In the storage device in which the forwarding-function-equipped memory nodes are mutually connected, when a plurality of pieces of data are written or read to/from the memory nodes, generally it is difficult to simultaneously conduct communication of the data through the same line, which easily generates forwarding waiting of the data. The forwarding waiting of the data leads to increase a time necessary to write and read the data.

BRIEF DESCRIPTION OF THE DRAWINGS

FIG. 4 is a view illustrating a forwarding algorithm 1 in the storage device of the first embodiment;

FIG. 5D is a view illustrating an example of the packet forwarding procedure by the forwarding algorithm 1 in the first embodiment;

FIG. 11D is a view illustrating an example of the packet forwarding procedure by the forwarding algorithm 2 in the second embodiment;

FIG. 14D is a view illustrating an example of the packet forwarding procedure by the forwarding algorithm 3 in the third embodiment;

FIG. 18 is a view illustrating a bypass transfer occurrence rate and jam occurrence rate in the storage system of the fourth embodiment;

FIG. 21 is a view illustrating another configuration of the storage system of the sixth embodiment;

FIG. 23 is a view illustrating a comparative example of the storage system of the seventh embodiment;

FIG. 24 is a view illustrating address information recorded in a header portion of the packet in the seventh embodiment;

FIG. 25 is a view illustrating a write operation in the storage system of the seventh embodiment;

FIG. 28 is a view illustrating a comparative example of the storage system of the eighth embodiment;

FIGS. 31 and 32 are views illustrating other configuration examples of the storage system of the eighth embodiment;

FIGS. 33B, 33C, and 33D are views illustrating a read operation in which forwarding waiting is generated in the storage system;

FIGS. 35A and 35B are views illustrating another example of the read operation in which the generation of the forwarding waiting is avoided in the storage system of the ninth embodiment;

FIGS. 36A, 368, 36C, 36D, 36E and 36F are views illustrating other examples of the read operation in which the generation of the forwarding waiting is avoided in the storage system of the ninth embodiment;

FIGS. 37B, 37C, 37D, 37E, 37F and 37G are views illustrating a write operation in which the forwarding waiting is generated in the storage system; and FIGS. 38A, 38B, 38C, 38D and 38E are views illustrating other examples of the write operation in which the generation of the forwarding waiting is avoided in the storage system of the tenth embodiment.

DETAILED DESCRIPTION

Hereinafter, embodiments will be described with reference to the drawings. In the following description, a component having the same function and configuration is designated by the same numeral, and the overlapping description is made only when required.

In general, according to one embodiment, a storage device includes a plurality of memory nodes. Each of memory nodes includes a plurality of input ports, a plurality of output ports, a selector, a packet controller and a memory. The selector outputs a packet input to the input port to one of the output ports. The packet controller controls the selector. The memory stores data. The memory nodes are mutually connected at the input ports and the output ports. The memory node has an address that is determined by its physical position. The packet controller switches the output port that outputs the packet based on information including at least a destination address of the packet and an address of the memory node having the packet controller when receiving a packet that is not addressed to the memory node having the packet controller.

[First Embodiment]

According to a first embodiment, a storage device in which, forwarding-function-equipped memory nodes are mutually connected has a forwarding method in which each memory node efficiently forwards a data packet.

[1] Configuration of Storage Device

Figure 1:
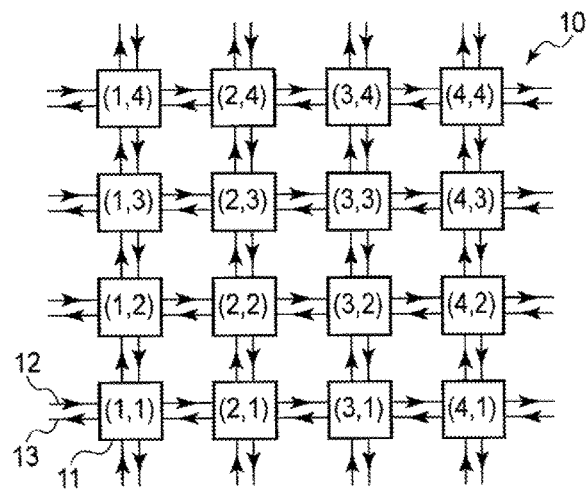
FIG. 1 is a view illustrating a configuration of a storage device according to a first embodiment.

FIG. 1 is a view illustrating a configuration of the storage device of the first embodiment, and FIG. 1 illustrates a method for physically disposing the memory nodes and an example of a corresponding address allocating method.

As illustrated in FIG. 1, a storage device 10 includes memory nodes 11 equipped with data forwarding functions. Each memory node 11 is disposed at a lattice point of a square lattice. It is assumed that a logical address of the memory node located at a lattice coordinate (x,y) is (x,y) that is matched with a position coordinate. That is, the logical address of the memory node 11 is matched with a physical address (lattice coordinate (x,y)).

Each memory node 11 includes four input ports 12 and four output ports 13. Each memory node 11 is mutually connected to four adjacent memory nodes 11 through the input ports 12 and the output ports 13. Specifically, the input port 12 and the output port 13 of the two adjacent memory nodes that are opposite each other are connected to each other.

Figure 2:
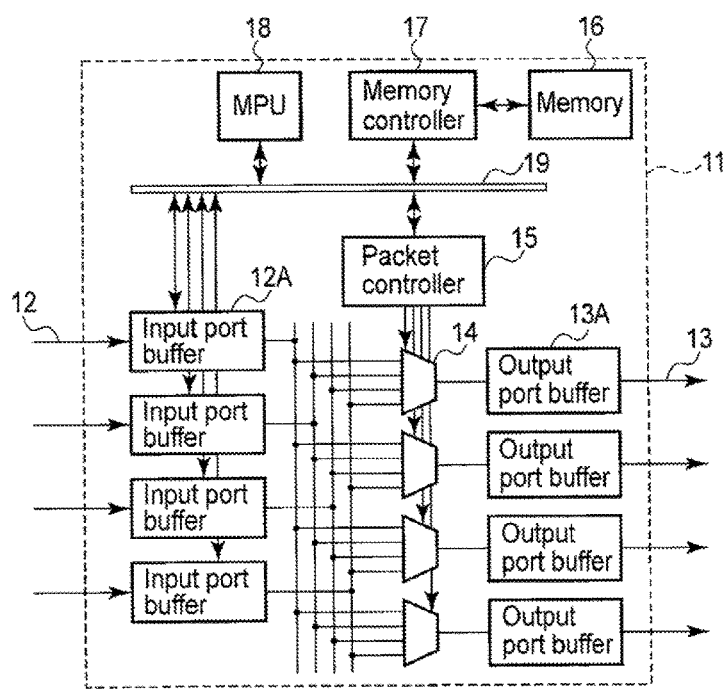
FIG. 2 is a view illustrating a configuration of a memory node in the first embodiment.

FIG. 2 illustrates a configuration of each memory node 11. The memory node 11 includes the input port 12, an input port buffer 12A, the output port 13, an output port buffer 13A, a selector 14, a packet controller 15, a memory 16, a memory controller 17, an MPU 18, and a local bus 19.

A packet input to the input port 12 is temporarily stored in the input port buffer 12A. The packet is input to the selector 14 from the input port buffer 12A, and a control signal is input to the selector 14 from the packet controller 15. The selector 14 selects one of the input packets and outputs the selected packet to the output port buffer 13A in response to the control signal. The output port buffer 13A temporarily stores the packet output from the selector 14, and outputs the packet to the output port 13. The packet controller 15 controls the output of the selector 14. As used herein, the packet means a formatted unit of transferring data that includes a header portion including at least a destination address and a source address and a data portion.

The memory 16 includes memory cells in which pieces of data are stored. For example, the memory 16 includes a NAND flash memory. The memory controller 17 controls write, read, and erase operations with respect to the memory 16. The MPU 18 performs arithmetic processing necessary in the memory node. The local bus 19 mutually connects the input port buffer 12A, the packet controller 15, the memory controller 17, and the MPU 18 to perform signal transmission.

The packet received by the memory node 11 is stored in the input port, buffer 12A through the input port 12. The packet controller 15 determines whether the received packet is addressed to the memory node (hereinafter referred to as a self-node) of the packet controller 15 based on two pieces of information on the destination (target) address included in the packet and the address of the self-node.

When the received packet is addressed to the self-node, the packet controller 15 performs the write or read operation or given processing with respect to the memory 16 of the self-node. When the received packet is not addressed to the self-node, the packet controller 15 determines the adjacent memory node to which the packet is forwarded based on the two pieces of information on the destination address and the address of the self-node, and the selector 14 outputs the packet to the corresponding output port buffer 13A.

In the storage device illustrated in FIG. 1, the memory node is disposed at the lattice point of the square lattice. However the first embodiment is not limited to the storage device illustrated in FIG. 1. Examples will be described below with reference to FIGS. 3A to 3E.

Figure 3A:
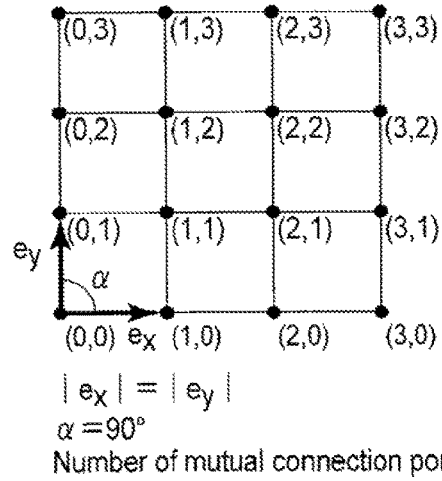
FIGS. 3A, 3B, 3C, 3D, and 3B are views illustrating disposition examples of the memory nodes in the first embodiment.
Figure 3B:
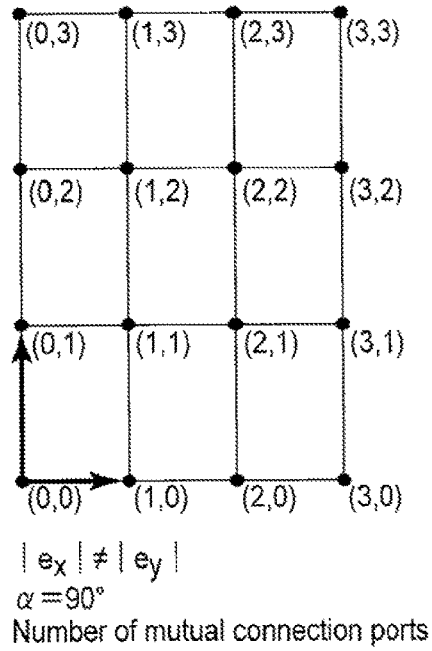

A configuration illustrated in FIG. 3A corresponds to the example illustrated in FIG. 1. More generally, in the first embodiment, each memory node is disposed at the lattice point. Here, the lattice points are sets of regularly placed points in a plane. Both the x-coordinate and the y-coordinate of each lattice point are integers. The lattice points also include the case in which the length of the unit vector in the x-direction ($e_x$) differs from that of the unit vector in the y-direction ($e_y$), that is, the case in which the repetition period in the x-direction differs from that in the y-direction. FIG. 3B illustrates this example.

Figure 3C:
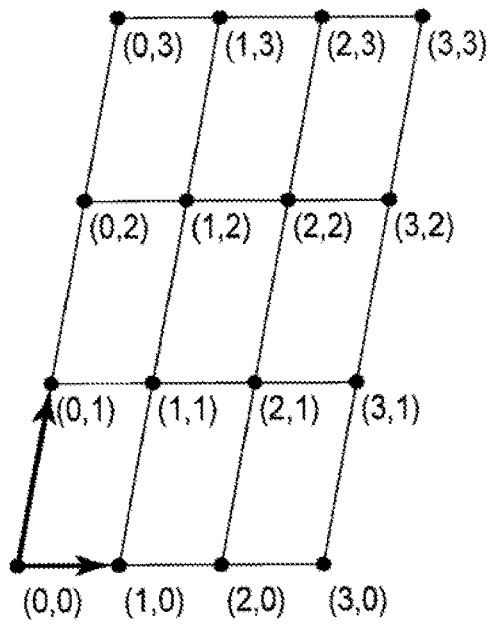
Figure 3D:
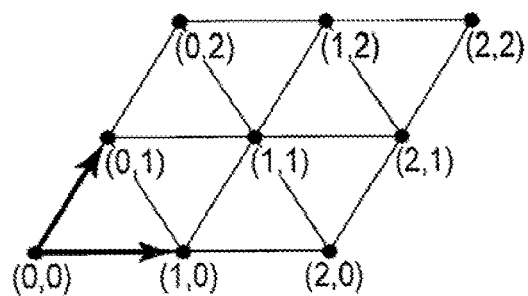

The lattice also includes the case in which the unit vectors in the x-direction and the y-direction are not orthogonal to each other, namely, the case in which an x-axis and a y-axis are not orthogonal to each other. FIG. 3C illustrates this example. The number of mutual connection ports of the memory node is not limited to 4. FIG. 3D illustrates an example in which the number of mutual connection ports is 6.

In the first embodiment, in each case, it is assumed that the logical address of the memory node located at the lattice coordinate (x,y) is (x,y) that is matched with the position coordinate irrespective of the definition of the lattice. That is, the logical address of the memory node is matched with the physical address (lattice coordinate (x,y)).

More generally, in the first embodiment, included is the case in which a set of two or more memory nodes is disposed at each lattice point. FIG. 3E illustrates an example in which the two memory nodes are disposed at each lattice point. In the example of FIG. 3E, for example, the two memory nodes are disposed at a lattice point (1,0). It is assumed that the two memory nodes disposed at the lattice point (1,0) are (1,0,0) and (1,0,1). That is, the coordinate of one memory node is expressed by a set of three integers of (x,y,z). In this case, it is also assumed that the logical address of the memory node located at the node coordinate (x,y,z) is (x,y,z) that is matched with the position coordinate. That is, the logical address of the memory node is matched with the physical address (lattice coordinate (x,y,z)). In addition, in the first embodiment, also included is the case in which the plane in which the lattice points are disposed is three-dimensionally bent or folded.

The adjacent memory node means a memory node having the following positional relationship in FIGS. 3A to 3E. In FIGS. 3A to 3C, for example, in the case that the self-node exists at the coordinate (1,1), the memory node adjacent to the self-node means the four memory nodes that exist at the coordinates (0,1), (1,2), (2,1), and (1,0). In FIG. 3D, for example, in the case that the self-node exists at the coordinate (1,1), the memory node adjacent to the self-node means the six memory nodes that exist at the coordinates (0,1), (0,2), (1,2), (2,1), (2,0), and (1,0). In FIG. 3E, for example, in the case that the self-node exists at the coordinate (1,0,1), the memory node adjacent to the self-nods means the three memory nodes that exist at the coordinates (0,1,0), (1,1,0), and (1,0,0).

[2] Forwarding Algorithm 1 of Storage Device

In a forwarding algorithm 1, the memory node of the forwarding destination is determined based on two pieces of information on the destination address included in the packet and the address of the self-node.

FIG. 4 is a view illustrating the forwarding algorithm 1 in the storage device of the first embodiment. An example of a method for determining the adjacent node of the forwarding destination based on the two pieces of information on the destination address included in the packet and the address of the self-node will be described with reference to FIG. 4. This method is referred to as the forwarding algorithm 1.

The memory node that receives the packet forwards the packet to the adjacent memory node in which a distance between the destination node (to) of the packet and the self-node (PP: Present position) is minimized.

A specific example of a packet forwarding process based on the forwarding algorithm 1 will be described with reference to FIGS. 5A to 5D.

Figure 5A:
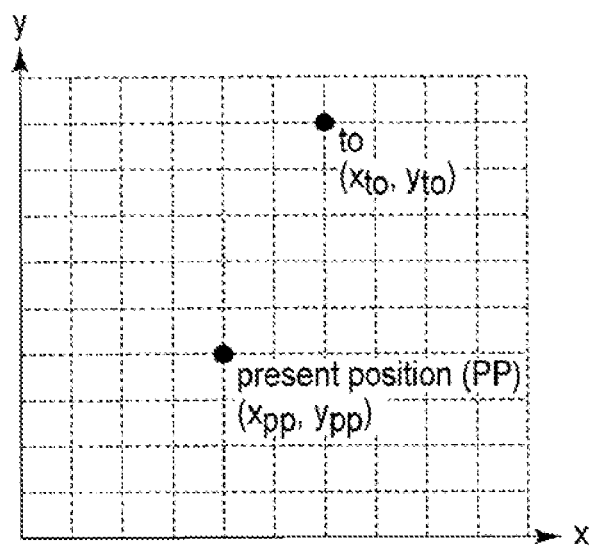
FIGS. 5A and 5B are views illustrating a packet forwarding procedure by the forwarding algorithm 1 in the first embodiment.
Figure 5B:
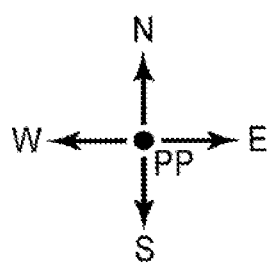

As illustrated in FIG. 5A, it is assumed that ($X_{to}$, $Y_{to}$) is an address of the destination node (to), it is assumed that ($X_{pp}$, $y_{pp}$) is an address of the self-node (PP), and it is assumed that $dx = x_{to} - X_{pp}$ and $dy = y_{to} - y_{pp}$. As illustrated in FIG. 5B, as to a direction indicating the forwarding destination, it is assumed that N (North) is a direction in which y is increased, it is assumed that E (East) is a direction in which x is increased, it is assumed that S (South) is a direction in which y is decreased, and it is assumed that W (West) is a direction in which x is decreased.

Assuming that |a| is a sign indicating an absolute value of a, the packet proceeds in the x-direction in the case of |dx|>|dy|, and the packet proceeds in the y-direction in the case of |dx|<|dy|. In the case that the packet proceeds in the x-direction, the packet is forwarded to E in the case of dx >0, and the packet is forwarded to W in the case of dx <0. Similarly, in the case that the packet proceeds in the Y-direction, the packet is forwarded to N in the case of dy > 0, and the packet is forwarded to S in the case of dy < 0.

Figure 5C:
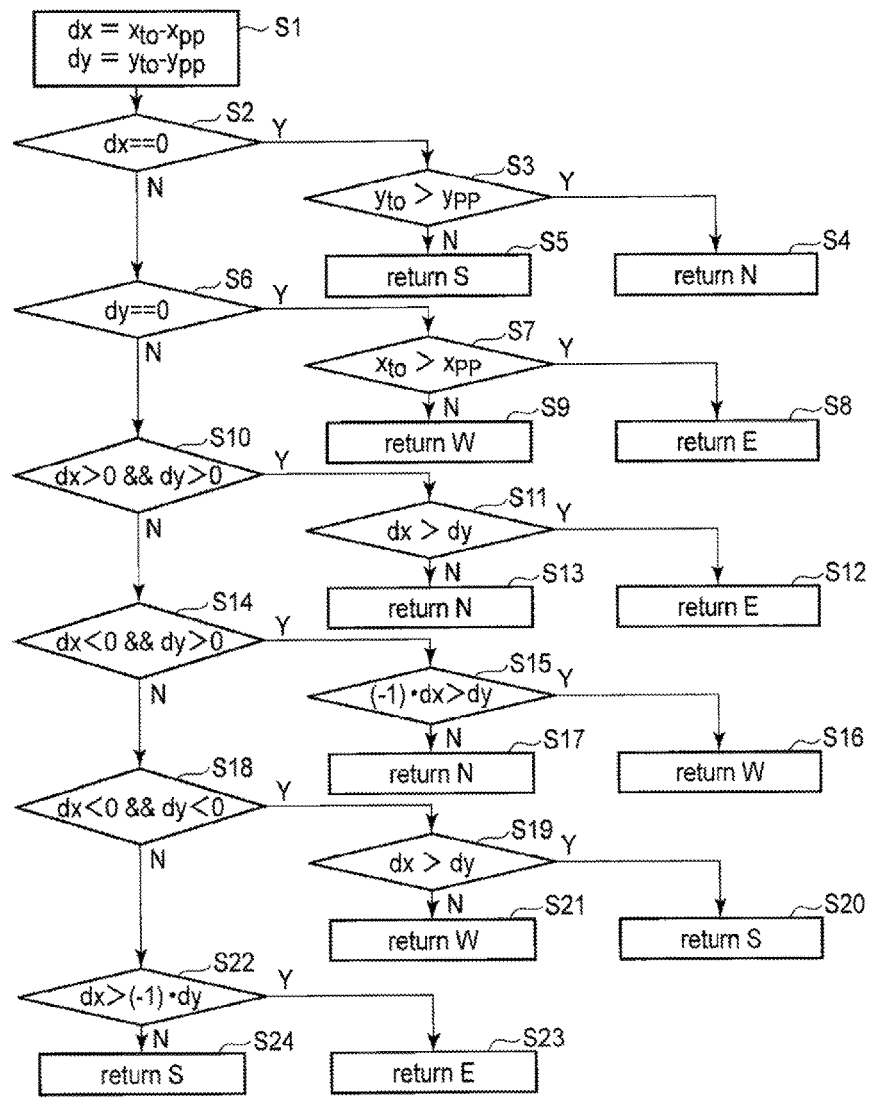
FIG. 5C is a flowchart of the packet forwarding procedure by the forwarding algorithm 1 in the first embodiment.

FIG. 5C illustrates a flowchart of the forwarding algorithm 1 in the storage device. The forwarding algorithm 1 is stored in the packet controller 15 and executed by the packet controller 15.

The packet controller 15 calculates $dx=x_{to}-x_{pp}$ and $dy=y_{to}-y_{pp}$ (Step S1). Then the packet controller 15 determines whether dx is 0 (Step S2). When dx is 0, the packet controller 15 determines whether $y_{to}>y_{pp}$ holds (Step S3). When $y_{to}>y_{pp}$ holds, the packet controller 15 forwards the packet to N (Step S4). On the other hand, when $y_{to}>y_{pp}$ does not hold, the packet controller 15 forwards the packet to S (Step S5).

When dx is not 0 in Step S2, the packet controller 15 determines whether dy is 0 (Step S6). When dy is 0, the packet controller 15 determines whether $x_{to}>x_{pp}$ holds (Step S7). When $x_{to}>x_{pp}$ holds, the packet controller 15 forwards the packet to E (Step S8). On the other hand, when $x_{to}>x_{pp}$ does not hold, the packet controller 15 forwards the packet to W (Step S9).

When dy is not 0 in Step S6, namely, when dx and dy are not 0, the packet controller 15 determines whether dx >0 and dy >0 hold (Step S10). When dx >0 and dy >0 hold, the packet controller 15 determines whether dx >dy holds (Step S11). When dx>dy holds, the packet controller 15 forwards the packet to E (Step S12). On the other hand, when dx>dy does not hold, the packet controller 15 forwards the packet to N (Step S13).

When dx >0 and dy >0 do not hold in Step S10, the packet controller 15 determines whether dx <0 and dy >0 hold (Step S14). When dx <0 and dy >0 hold, the packet controller 15 determines whether (−1)·dx>dy holds (Step S15). When (−1)·dx>dy holds, the packet controller 15 forwards the packet to W (Step S16). On the other hand, when (−1)·dx >dy does not hold, the packet controller 15 forwards the packet to N (Step S17).

When dx<0 and dy>0 do not hold in Step S14, the packet controller 15 determines whether dx<0 and dy<0 hold (Step S18). When dx<0 and dy<0 hold, the packet controller 15 determines whether dx>dy holds (Step S19). When dx>dy holds, the packet controller 15 forwards the packet to S (Step S20). On the other hand, when dx>dy does not hold, the packet controller 15 forwards the packet to W (Step S21).

When dx<0 and dy<0do not hold in Step S18, the packet controller 15 determines whether dx>(−1)·dy holds (Step S22). When dx>(−1)·dy holds, the packet controller 15 forwards the packet to E (Step S23). On the other hand, when dx>(−1)·dy does not hold, the packet controller 15 forwards the packet to S (Step S24).

Through the above processing, the packet input to the memory node is forwarded to the adjacent memory node in which the distance between the destination node (to) and the self-node (PP) is minimized, FIG. 5D illustrates a specific example of the packet forwarding process. In the forwarding algorithm 1, the packet proceeds in the x-direction until |dx|=|dy| in the case of |dx|>|dy|, and the packet proceeds continuously in the y-direction in the case of |dx|<|dy|, and the packet proceeds mutually in the x-direction and the y-direction after |dx|=|dy|.

For example, in the case 1, because of dx=0 and dy>0, the packet proceeds to N until reaching the destination node (to). In the case 4, because of dx>0 and dy>0 and dx<dy, the packet proceeds continuously to N until dx=dy, and the packet proceeds mutually to E and N after dx=dy.

[3] Storage System including Storage Device

Figure 6:
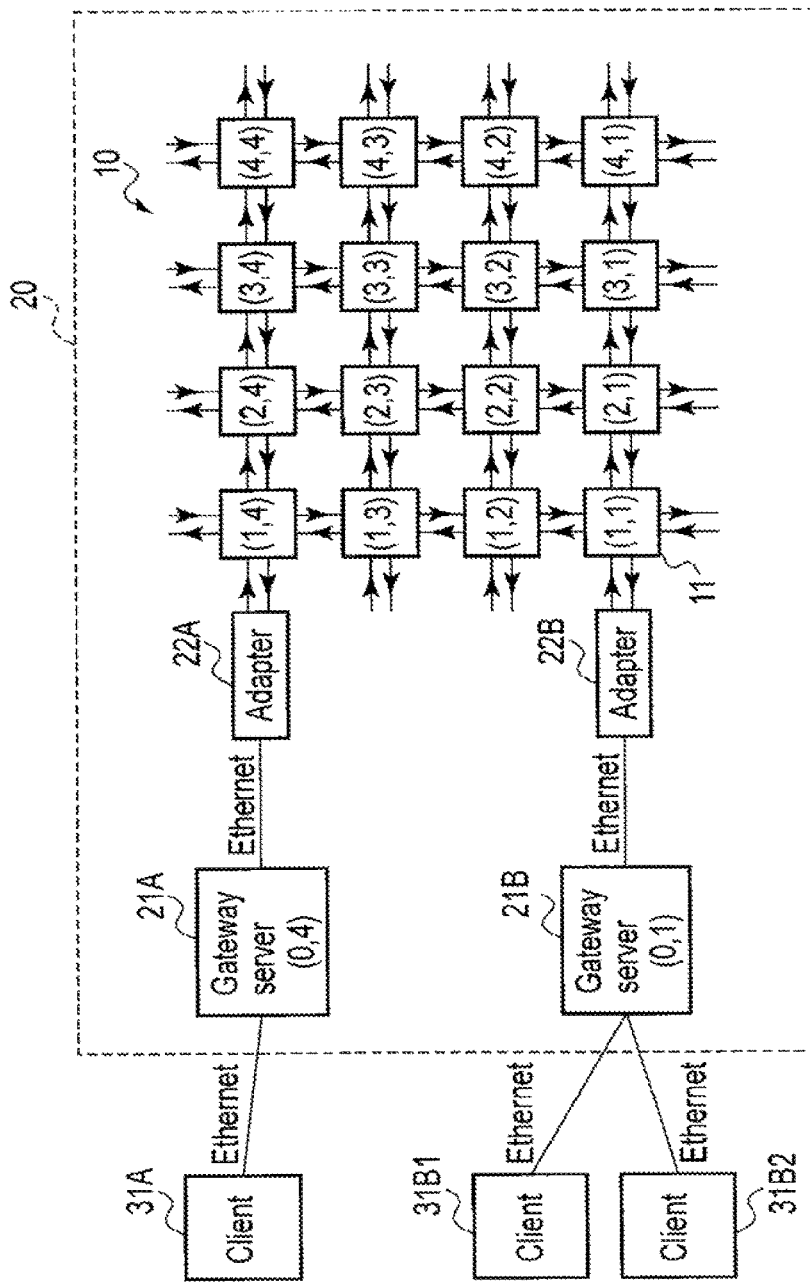
FIG. 6 is a view illustrating a configuration of a storage system including a storage device of the first embodiment.

FIG. 6 is a view illustrating a configuration of a storage system including the storage device of the first embodiment.

A storage system 20 is one in which a client uses the storage device, and the storage system 20 includes the following configuration.

The storage device 10 is connected to the client through a gateway server. In the case that the communication protocol in the storage device 10 differs from the communication protocols of gateway servers 21A and 21B, adapters 22A and 22B may be placed therebetween.

Particularly, the memory node (1,4) disposed in an outer peripheral portion of the storage device 10 is connected to a client 31A through the adapter 22A and the gateway server 21A. Similarly, the memory node (1,1) is connected to clients 31B1 and 31B2 through the adapter 22B and the gateway server 21B. The "memory node (x,y)" expresses the memory node having the address (x,y). The same holds true for the following description.

For example, each of the gateway servers 21A and 21B includes a computer, and has an address based on the same protocol as the memory node 11 of the storage device 10. In FIG. 6, the gateway server 21A has the address (0,4), and the gateway server 21B has the address (0,1).

A write operation in the storage system will be described below.

Figure 7:
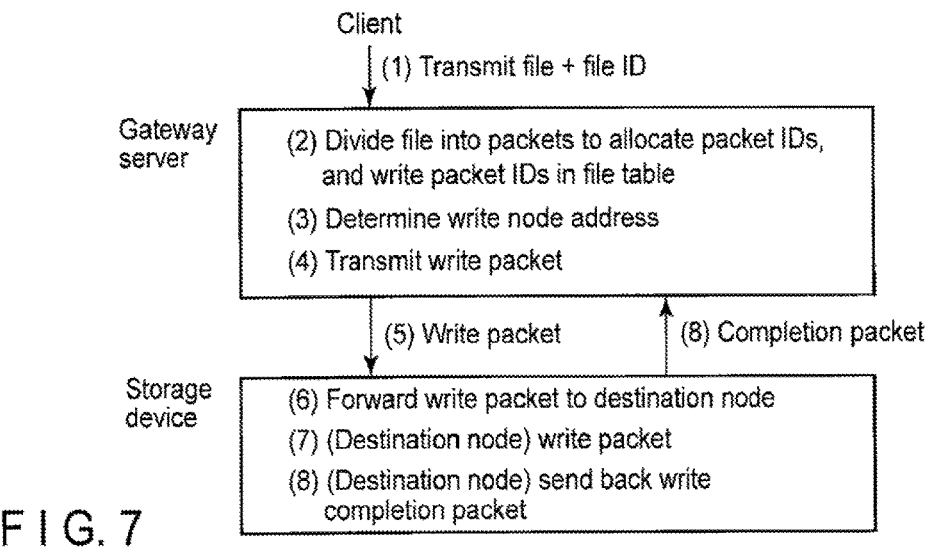
FIG. 7 is a view illustrating a write operation in the storage system of the first embodiment.

FIG. 7 illustrates a procedure in which the client writes a file in the storage device 10. Here the client 31A writes the file in the storage device 10.

The client 31A transmits the file and a file ID to the gateway server 21A (see (1) of FIG. 7). The file ID is an identifier that can uniquely identify the file. For example, a full path file name of ￥￥strage_system ￥home ￥cliantA ￥file1.txt in a given file system can be used as the file ID.

The gateway server 21A divides the file into data packets having a defined size and allocates a packet ID to each packet. The gateway server 21A writes the file ID and the packet IDs of the divided packets in a file table (see (2) of FIG. 7). The packet ID is an identifier that can uniquely identify the packet. For example, "file ID+continuous number" of . . . \file1. text_ 1 and . . . \file1.txt⁻2 can be allocated as the packet ID.

The gateway server 21A determines the address (hereinafter referred to as a write node address) of the memory node in which the packet is written based on the information on the packet ID (see (3) of FIG. 7). At this point, a node de termini rig technique called a consistent hashing (see Document 1) used in a large-scale distributed file system may be used. The consistent hashing has an advantage that the write nods address is determined using both a hash value of the node address and a hash value of the packet ID.

[Document 1]: "Cloud technology seizing far side of cloud world" edited by Fujio Maruyama and Kazuyuki Shuto, ASCII MEDIA WORKS, Nov. 6, 2009, p.88, ISBN978-4-04-868064-6

Then the gateway server 21A sets the write node address to the destination address while setting the address of the gateway server 21A to the source address, and transmits the write packet to the storage device 10 (see (4) and (5) of FIG. 7).

The forwarding is properly repeated in the storage device 10 according to the forwarding algorithm 1, whereby the packet transmitted to the memory node (1,4) from the gateway server 21A reaches the memory node of the destination address (see (6) of FIG. 7). In the target memory node, the received packet is written in the memory 16 of the self-node (see (7) of FIG. 7). Then a write completion packet is sent back to the gateway server 21A (see (8) of FIG. 7).

A read operation in the storage system will be described below.

Figure 8:
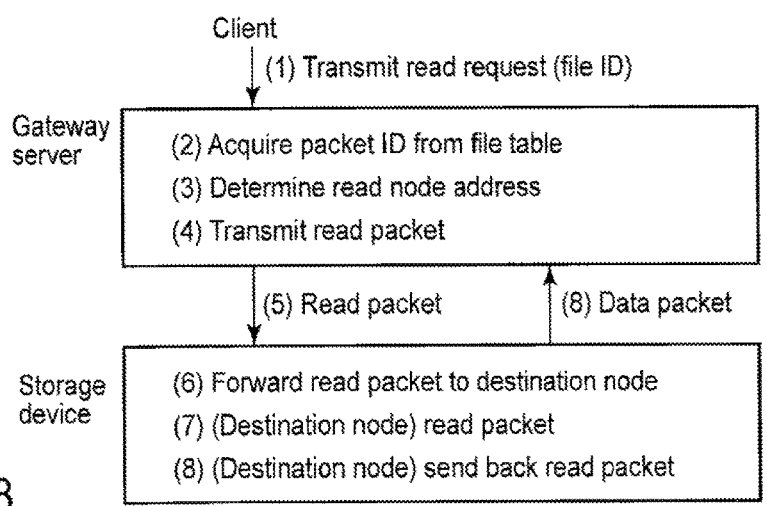
FIG. 8 is a view illustrating a read operation in the storage system of the first embodiment.

FIG. 8 illustrates a procedure in which the client reads the file from the storage device 10. Here, the client 31A reads the file from the storage device 10.

The client 31A transmits a read request (file ID) to the gateway server 21A (see (1) of FIG. 8).

The gateway server 21A acquires the packet ID corresponding to the file ID from the file table (see (2) of FIG. 8). The gateway server 21A determines the address (hereinafter referred to as a read node address) of the memory node from which the data is read based on the information on the packet ID (see (3) of FIG. 8). At this point, the node determining technique called the consistent hashing used in the large-scale distributed file system may be used.

The gateway server 21A sets the read node address to the destination address while setting the address of the gateway server 21A to the source address, and transmits the read packet to the storage device 10 (see (4) and (5) of FIG. 8).

The forwarding is properly repeated in the storage device 10 according to the forwarding algorithm 1, whereby the packet transmitted to the memory node (1,4) reaches the memory node of the destination address (see (6) of FIG. 8). In the target memory node, the target data is read from the memory 16 of the self-node according to the read packet (see (7) of FIG. 8). Then the read data is sent back as the data packet to the gateway server 21A (see (8) of FIG. 8).

In the system illustrated in FIG. 6, the gateway server may perform write data randomizing processing (Rand processing), providing an Error-Correcting Code (ECC) to the write data, and a function (ECC function) of detecting and correcting an error of the read data using the ECC. In this case, it is not necessary for the memory controller of each memory node to have the write data randomizing processing function and the ECC function. Additionally, it is not necessary to perform the ECC processing during communication between the memory nodes. Therefore, cost per memory node can be reduced.

[4] Expandability of Storage Device

A method for adding a new memory node to the storage device will be described.

Figure 9:
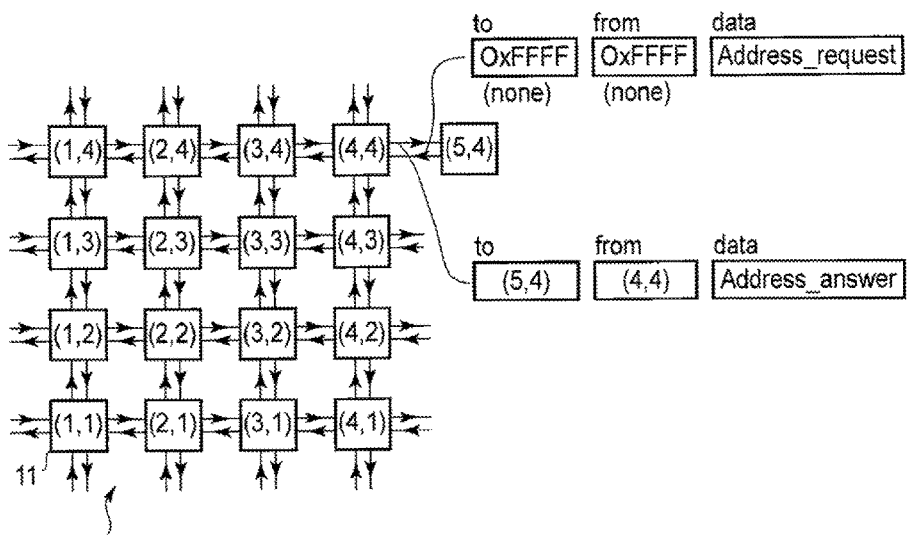
FIG. 9 is a view illustrating an automatic address acquiring method in the storage device of the first embodiment.

FIG. 9 illustrates an automatic address acquiring method when the new memory node is added to the storage device.

In the storage device 10 of the first embodiment, because the logical address of the memory node located at the lattice coordinate (x,y) is (x,y) that is matched with the position coordinate, the additional memory node makes an inquiry of the address to the adjacent node to be able to easily determine the address of the self-node.

For example, when the additional memory node makes the inquiry of the address to the adjacent node located in the W-direction, assuming that (x,y) is the address of the adjacent node, the address of the additional node becomes (x+1,y). Similarly, when the additional memory node makes the inquiry of the address to the adjacent nodes (x,y) located in the N-, E-, and S-direction, the address of the self-node becomes (x, y−1), (x−1, y), and (x, y+1), respectively.

FIG. 9 illustrates the case in which the new memory node is added in the E-direction of the memory node (4,4). The additional memory node transmits an address request packet in which "to" and "from" are none to the adjacent node (4,4) located in the W-direction. The memory node (4,4) that receives the address_ request packet sets an address_ answer packet, in which "from" is set to the self-node address while "to" is set to (5,4), to an output port buffer of the memory node located in the E-direction. The additional node receives the address_ answer packet to determine that the address of the self-node is (5,4).

A manual address setting method is also conceivable as another method. In the manual address setting method, an operator of the storage device 10 previously determines the address of the additional memory node, and the operator adds the new memory node after the new memory node is preset.

In the automatic address acquiring method, it is necessary for the packet controller of each memory node to have a function of replying the Address_request packet. Therefore, the cost per packet controller tends to be increased. On the other hand, it is not necessary to preset the address of the additional memory node, so that the procedure for adding the memory node can be simplified, leading to reduction of operational cost.

As described above, according to the first embodiment, the logical address and the physical position (physical address) of the memory node are matched with each other, so that the data forwarding method can efficiently be performed while each memory node needs not to manage the routing table. Therefore, the storage device has the excellent expandability, namely, the memory node can easily be added to the storage de vice.

[Second Embodiment]

A storage device according to a second embodiment will be described. The storage device of the second embodiment includes a forwarding algorithm 2 that is different from the forwarding algorithm 1 included in the storage device of the first embodiment. In the forwarding algorithm 2, the memory node of the forwarding destination is determined based on three pieces of information, namely, the destination address and the source address, which are included in the packet, and the address of the self-node. Because the storage device of the second embodiment has the same configuration as those of FIGS. 1 and 2, the description is omitted.

[1] Forwarding Algorithm 2 of Storage Device

Figure 10:
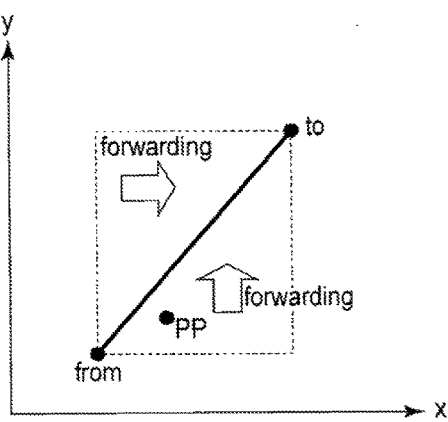
FIG. 10 is a view illustrating a forwarding algorithm 2 in a storage device according to a second embodiment.

FIG. 10 is a view illustrating the forwarding algorithm 2 in the storage device of the second embodiment. An example of a method for determining the adjacent node of the forwarding destination based on the three pieces of information, namely, the destination address and the source address of the packet and the address of the self-node will be described with reference to FIG. 10. This method is referred to as the forwarding algorithm 2.

As illustrated in FIG. 10, a determination, which one of two areas separated by a straight line connecting the destination node (to) and the source node (from) the self-node (PP) exists in is made, and the packet is forwarded to the adjacent memory node in the direction allocated to the area.

A specific example of the packet forwarding process based on the forwarding algorithm 2 will be described with reference to FIGS. 11A to 11D.

Figure 11A:
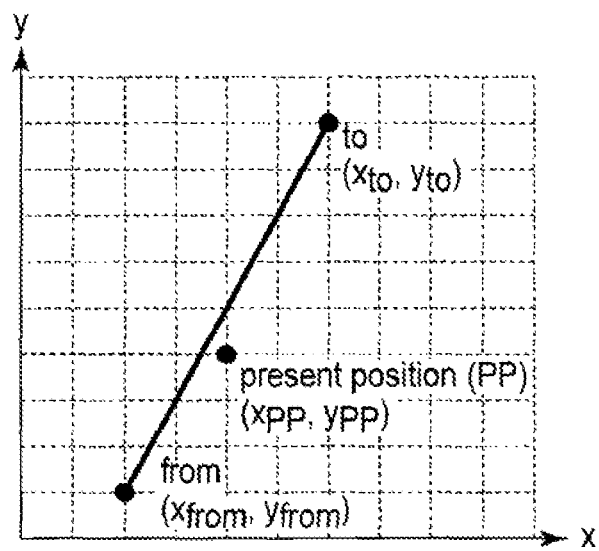
FIGS. 11A and 11B are views illustrating a packet forwarding procedure by the forwarding algorithm 2 in the second embodiment.
Figure 11B:
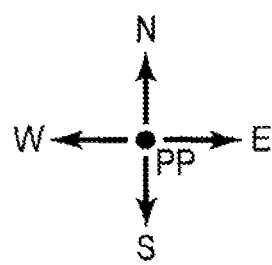

As illustrated in FIG. 11A, it is assumed that ($x_{to}$, $y_{to}$) is an address of the destination node (to), it is assumed that ($x_{from}$, $y_{from}$) is an address of the source node (from), it is assumed that ($x_{pp}$, $y_{pp}$) is an address of the self-node (PP), and it is assumed that $dx=x_{to}-x_{from}$, $dy=y_{to}-y_{from}$, $Dx=x_{pp}-x_{from}$, and $Dy=y_{pp}-y_{from}$. As to the direction indicating the forwarding destination, as illustrated in FIG. 11B, it is assumed that N is a direction in which y is increased, it is assumed that E is a direction in which x is increased, it is assumed that S is a direction in which y is decreased, and it is assumed that W is a direction in which x is decreased.

Based on an equation of y=(dx/dy)·x that is the straight line connecting the destination node (to) and the source node (from), Dy and (dy/dx)·Dx are compared to determine which one of the two areas separated by the straight, line the self-node (PP) exists in.

The method for allocating the forwarding direction will be described by taking the case of dx>0 and dy>0 as an example. In the case that Dy and (dy/dx)·Dx are compared, it is assumed that an A area is one in which Dy is larger than (dy/dx)·Dx, and it is assumed that a B area is the other. In the forwarding, E is allocated to a first preferential direction of the A area, and N is allocated to a first preferential direction of the B area. In the forwarding algorithm 2, the forwarding is performed such that the packet proceeds along the straight line connecting the destination node (to) and the source node (from).

Figure 11C:
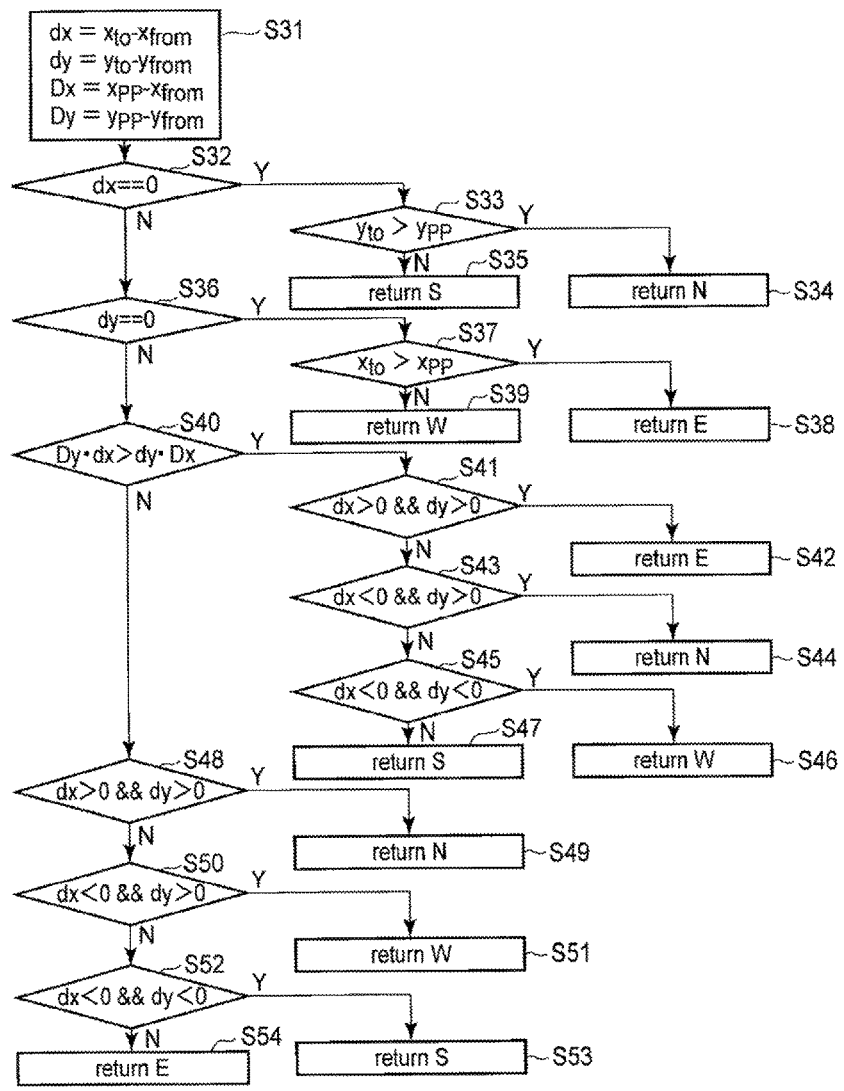
FIG. 11C is a flowchart of the packet forwarding procedure by the forwarding algorithm 2 in the second embodiment.

FIG. 11C illustrates a flowchart of the forwarding algorithm 2 in the storage device. The forwarding algorithm 2 is stored in a packet controller 15 and executed by the packet controller 15.

The packet controller 15 calculates $dx=x_{to}-x_{from}$, $dy=y_{to}-y_{from}$, $Dx=x_{pp}-x_{from}$, and $Dy=y_{pp}-y_{from}$ (Step S31). Then the packet controller 15 determines whether dx is 0 (Step S32). When dx is 0, the packet controller 15 determines whether $y_{to}>y_{pp}$ holds (Step S33). When $y_{to}>y_{pp}$ holds, the packet controller 15 forwards the packet to N (Step S34). On the other hand, when $y_{to}>y_{pp}$ does not hold, the packet controller 15 forwards the packet to S (Step S35).

When dx is not 0 in Step S32, the packet controller 15 determines whether dy is 0 (Step S36). When dy is 0, the packet controller 15 determines whether $x_{to}>x_{pp}$ holds (Step S37). When $x_{to}>x_{pp}$ holds, the packet controller 15 forwards the packet to E (Step S38). On the other hand, when $x_{to}>x_{pp}$ does not hold, the packet controller 15 forwards the packet to W (Step S39).

When dy is not 0 in Step S36, namely, when dx and dy are not 0, the packet controller 15 determines whether Dy·dx>dy·Dx holds (Step S40). When Dy·dx>dy·Dx holds, the packet controller 15 determines whether dx>0 and dy>0 hold (Step S41). When dx>0 and dy>0 hold, the packet controller 15 forwards the packet to E (Step S42). On the other hand, when dx>0 and dy>0 do not hold, the packet controller 15 determines whether dx<0 and dy>0 hold (Step 343). When dx<0 and dy>0 hold, the packet controller forwards the packet to N (Step 344).

When dx<0 and dy>0 do not hold in Step S43, the packet controller 15 determines whether dx<0 and dy<0 hold (Step S45). When dx<0 and dy<0 hold, the packet controller 15 forwards the packet to W (Step S46). When dx<0 and dy<0 do not hold, the packet controller 15 forwards the packet to S (Step S47).

When Dy·dx>dy·Dx does not hold in Step S40, the packet controller 1.5 determines whether dx>0 and dy>0 hold (Step S48). When dx>0 and dy>0 hold, the packet controller 15 forwards the packet to N (Step S49). When dx>0 and dy>0 do not hold, the packet controller 15 determines whether dx<0 and dy>0 hold (Step S50). When dx<0 and dy>0 hold, the packet controller 15 forwards the packet to W (Step S51). When dx<0 and dy>0 do not hold, the packet controller 15 determines whether dx<0 and dy<0 hold (Step S52). When dx<0 and dy<0 hold, the packet controller 15 forwards the packet to S (Step S53). When dx<0 and dy<0 do not hold, the packet controller 15 forwards the packet to E (Step S54).

Through the above processing, the packet input to the memory node is forwarded to the adjacent memory node such that the packet proceeds along the straight line connecting the destination node (to) and the source node (from).

FIG. 11D illustrates a specific example of the packet forwarding process. In the forwarding algorithm 2, the forwarding is performed such that the packet proceeds along the straight line connecting the destination node (to) and the source node (from). For example, in the case 3, because of dx<0 and dy>0, the packet proceeds to W or N so as to stay close to the straight line connecting the destination node (to) and the source node (from) as much as possible. In the case 4, because of dx>0 and dy>0, the packet proceeds to N or E so as to stay close to the straight line connecting the destination node (to) and the source node (from) as much as possible.

An advantage of the forwarding algorithm 2 over the forwarding algorithm 1 will be described with reference to FIGS. 12A and 12B.

Figure 12A:
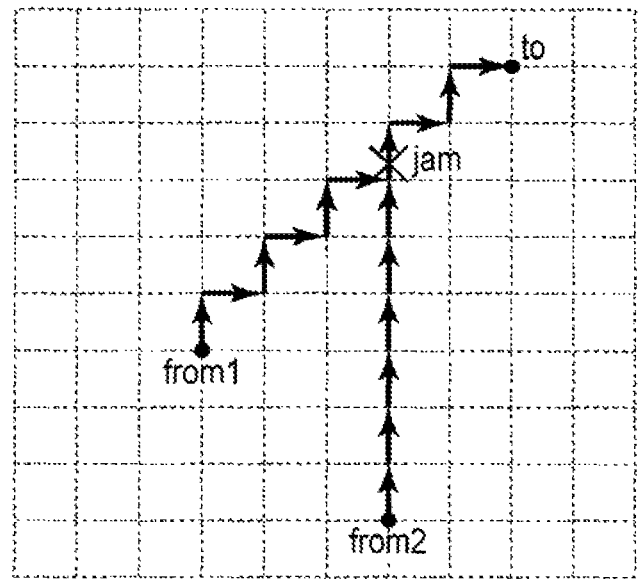
FIG. 12A is a view illustrating an example of the packet forwarding procedure by the forwarding algorithm 1.
Figure 12B:
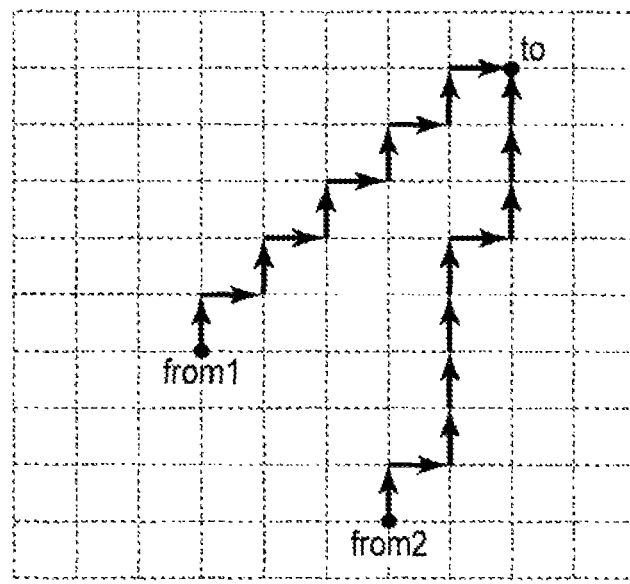
FIG. 12B is a view illustrating an example of the packet forwarding procedure by the forwarding algorithm 2.

FIGS. 12A and 12B illustrate the packet forwarding processes in the case that the packets addressed to the destination node (to) are transmitted from the two source nodes (from1) and (from2). FIG. 12A illustrates the packet forwarding process by the forwarding algorithm 1, and the FIG. 12B illustrates the packet forwarding process by the forwarding algorithm 2.

In the forwarding algorithm 1 illustrated in FIG. 12A, a merging waiting jam is generated at a point where the two packets merge. On the other hand, in the forwarding algorithm 2 illustrated in FIG. 12B, the jam is not generated. Accordingly, in the forwarding algorithm 2, a probability that the jam is generated can be decreased compared with the forwarding algorithm 1.

As described above, according to the second embodiment, the probability that the jam is generated can be decreased compared with the first embodiment, and the storage device in which a response speed is maintained even if many clients are simultaneously connected can be provided.

The logical address and the physical address of the memory node are matched similarly to the first embodiment, so that the data forwarding method can efficiently be performed while each memory node needs not to manage the routing table. Therefore, the storage device has the excellent expandability, namely, the memory node can easily be added to the storage device. Other configurations and effects of the embodiment are similar to those of the first embodiment.

[Third Embodiment]

A storage device according to a third embodiment, will be described. The storage device of the third embodiment includes a forwarding algorithm 3 that is different from the forwarding algorithms 1 and 2 included in the storage devices of the first and second embodiments. In the forwarding algorithm 3, the memory node of the forwarding destination is determined based on four pieces of information, namely, the destination address and the source address, which are included in the packet, the address of the self-node, and output port, occupancy information on the self-node. Because the storage device of the third embodiment has the same configuration as those of FIGS. 1 and 2, the description is omitted.

[1] Forwarding Algorithm 3 of Storage Device

Figure 13:
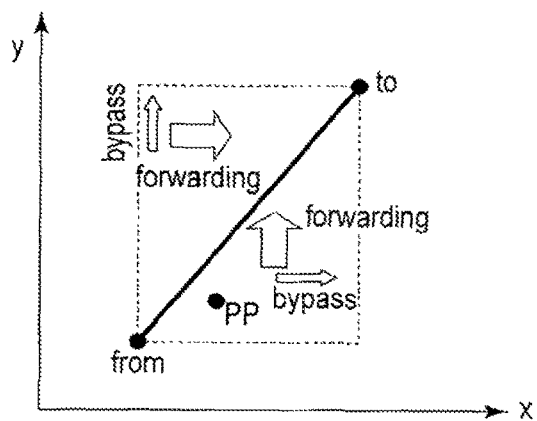
FIG. 13 is a view illustrating a forwarding algorithm 3 in a storage device according to a third embodiment.

FIG. 13 is a view illustrating the forwarding algorithm 3 in the storage device of the third embodiment. An example of a method for determining the adjacent node of the forwarding destination based on the four pieces of information, namely, the destination address and the source address of the packet, the address of the self-node, and the output port occupancy information on the self-node will be described with reference to FIG. 13. This method is referred to as the forwarding algorithm 3.

As illustrated in FIG. 13, the determination which one of two areas separated by the straight line connecting the destination node (to) and the source node (from) the self-node (PP) exists in is made, and the packet is forwarded to the adjacent node in the direction that is determined by the output port occupancy information on the self-node in the two directions allocated to the area. A first preferential direction and a second preferential direction are allocated to each area. The second preferential direction is selected in the case that an output port buffer in the first preferential direction is occupied by another packet.

A specific example of the packet forwarding process based on the forwarding algorithm 3 will be described with reference to FIG. 13 and FIGS. 14A to 14D.

Figure 14A:
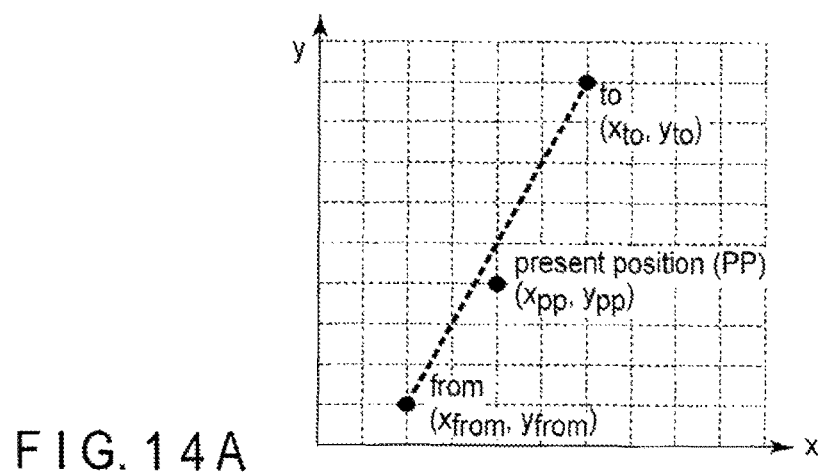
FIGS. 14A and 14B are views illustrating a packet forwarding procedure by the forwarding algorithm 3 in the third embodiment.

As illustrated in FIG. 14A, it is assumed that $(x_{to}, y_{to})$ is an address of the destination node (to), it is assumed that $(x_{from}, y_{from})$ is an address of the scarce node (from), it is assumed that $(x_{pp}, y_{pp})$ is an address of the self-node (PP), and it is assumed that $dx = x_{to} - x_{from}$, $dy = y_{to} - y_{from}$, $Dx = x_{pp} - x_{from}$, and $Dy = y_{pp} - y_{from}$.

FIG. 13 illustrates the case of dx>0 and dy>0. In the case that Dy and (dy/dx)·Dx are compared, it is assumed that an A area is one in which Dy Is larger than (dy/dx)·Dx, and it is assumed that a B area is the other. In the forwarding, E is allocated to the first preferential direction of the A area, and N is allocated to the first preferential direction of the B area. N is allocated to the second preferential direction (bypass direction) of the A area, and S is allocated to the second preferential direction of the B area. For example, in the case that the memory node that forwards the packet belongs to the B area as illustrated in the drawing, when the output port buffer in the N-direction that is the first preferential direction is occupied by another packet, the memory node forwards the packet in the E-direction that is the second preferential direction.

Figure 14B:
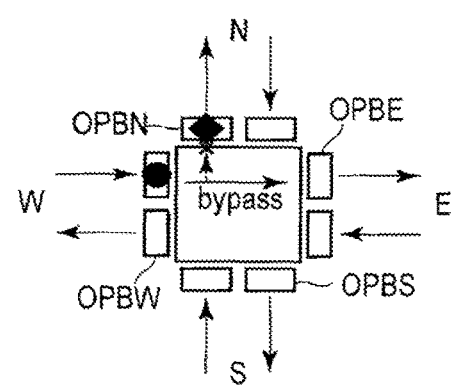
Figure 14C:
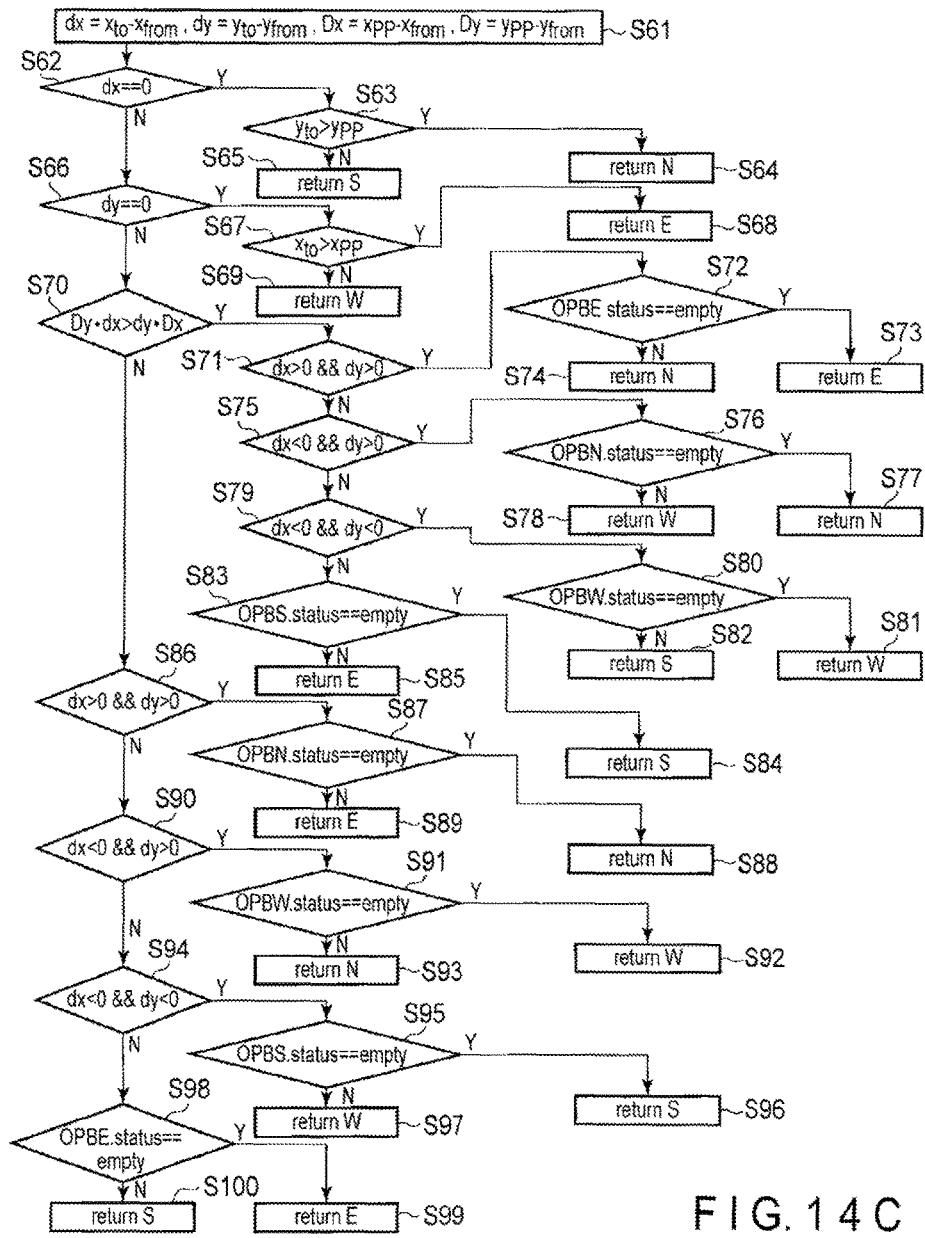
FIG. 14C is a flowchart of the packet forwarding procedure by the forwarding algorithm 3 in the third embodiment.

FIG. 14C illustrates a flowchart of the forwarding algorithm 3 in the storage device. The forwarding algorithm 3 is stored in a packet controller 15 and executed by the packet controller 15. As illustrated in FIG. 14B, it is assumed that OFBN is an output port buffer that outputs the packet to N, it is assumed that OPBE is an output port buffer that outputs the packet to E, it is assumed that OPBW is an output port buffer that outputs the packet to W, and it is assumed that OPBS is an output port buffer that outputs the packet to S.

Information (the output port occupancy information) on whether the output port buffers OPBN, OPBE, OPBW, and OPBS are vacant (the packet can be stored) or occupied by the packet is stored in the packet controller 15 as follows. The packet controller 15 has buffer occupancy flag bits corresponding to the total number of output port buffers and input port buffers. In the case that the packet is stored in the output port buffer, the packet controller 15 sets the buffer occupancy flag bit corresponding to the output, port buffer to "1". In the case that the packet is output from the output port buffer, the packet controller 15 sets the buffer occupancy flag bit corresponding to the output port buffer to "0". The packet controller 15 can determine whether the corresponding output port buffer is vacant (or occupied by the packet) by evaluating the buffer occupancy flag bit.

The packet controller 15 calculates $dx=x_{to}-x_{from}$, $dy=y_{to}-y_{from}$, $Dx=x_{pp}-x_{from}$, and $Dy=y_{pp}-y_{from}$ (Step S61). Then the packet controller 15 determines whether dx is 0 (Step S62). When dx is 0, the packet controller 15 determines whether $y_{to}>y_{pp}$ holds (Step S63). When $y_{to}>y_{pp}$ holds, the packet controller 15 forwards the packet to N (Step S64). On the other hand, when $y_{to}>y_{pp}$ does not hold, the packet controller 15 forwards the packet to S (Step S65).

When dx is not 0 in Step S62, the packet controller 15 determines whether dy is 0 (Step S66). When dy is 0, the packet controller 15 determines whether $x_{to}>x_{pp}$ holds (Step S67). When $x_{to}>x_{pp}$ holds, the packet controller 15 forwards the packet to E (Step S68). On the other hand, when $x_{to}>x_{pp}$ does not hold, the packet controller 15 forwards the packet to W (Step S69).

When dy is not 0 in Step S66, namely, when dx and dy are not 0, the packet controller 15 determines whether Dy·dx>dy·Dx holds (Step S70). When Dy·dx>dy·Dx holds, the packet controller 15 determines whether dx>0 and dy>0 hold (Step S71). When dx>0 and dy>0 hold, the packet controller 15 determines whether the output port buffer OPBE that outputs the packet to E is vacant, namely, whether the output port buffer OPBE is not occupied by another packet (Step S72). When the output port buffer OPBE is vacant, the packet controller 15 forwards the packet to E (Step S73). On the other hand, when the output port buffer OPBE is not vacant, the packet controller 15 forwards the packet to N (Step S74).

When dx>0 and dy>0 do not hold in Step S71, the packet controller 15 determines whether dx<0 and dy>0 hold (Step S75). When dx<0 and dy>0 hold, the packet controller 15 determines whether the output port buffer OPBN that outputs the packet to N is vacant (Step S76). When the output port buffer OPBN is vacant, the packet controller 15 forwards the packet to N (Step S77). On the other hand, when the output port buffer OFBN is not vacant, the packet controller 15 forwards the packet to W (Step S78).

When dx<0 and dy>0 do not hold in Step S75, the packet controller 15 determines whether dx<0 and dy<0 hold (Step S79). When dx<0 and dy<0 hold, the packet controller 15 determines whether the output port buffer OPBW that outputs the packet to W is vacant (Step S80). When the output port buffer OPBW is vacant, the packet controller 15 forwards the packet to W (Step S81). On the other hand, when the output port buffer OPBW is not vacant, the packet controller 15 forwards the packet to S (Step S82).

When dx<0 and dy<0 do not hold in Step S79, the packet controller 15 determines whether the output port buffer OPBS that outputs the packet to S is vacant (Step S83). When the output port buffer OPBS is vacant, the packet controller 15 forwards the packet to S (Step S84). On the other hand, when the output port buffer OPBS is not vacant, the packet controller 15 forwards the packet to E (Step S85).

When Dy·dx>dy·Dx does not hold in Step S70, the packet controller 15 determines whether dx>0 and dy>0 hold (Step S86). When dx>0 and dy>0 hold, the packet controller 15 determines whether the output port buffer OPEN that outputs the packet to N is vacant (Step S87). When the output port buffer OPEN is vacant, the packet controller 15 forwards the packet to N (Step S88). On the other hand, when the output port buffer OPBN is not vacant, the packet controller 15 forwards the packet to E (Step S89).

When dx>0 and dy>0 do not hold in Step S86, the packet controller 15 determines whether dx<0 and dy>0 hold (Step S90). When dx<0 and dy>0 hold, the packet controller 15 determines whether the output port buffer OPBW that outputs the packet to W is vacant (Step S91). When the output port buffer OPBW is vacant, the packet controller 15 forwards the packet to W (Step S92). On the other hand, when the output port buffer OPBW is not vacant, the packet controller 15 forwards the packet to N (Step S93).

When dx<0 and dy>0 do not hold in Step S90, the packet controller 15 determines whether dx<0 and dy<0 hold (Step S94). When dx<0 and dy<0 hold, the packet controller 15 determines whether the output port buffer OPBS that outputs the packet to S is vacant (Step S95). When the output port buffer OPBS is vacant, the packet controller 15 forwards the packet to S (Step S96). On the other hand, when the output port buffer OPBS is not vacant, the packet controller 15 forwards the packet to W (Step S97).

When dx<0 and dy<0 do not hold in Step S94, the packet controller 15 determines whether the output port buffer OPBE that outputs the packet to E is vacant (Step S98). When the output port buffer OPBE is vacant, the packet controller 15 forwards the packet to E (Step S99). On the other hand, when the output port buffer OPBE is not vacant, the packet controller 15 forwards the packet to S (Step S100).

Through the above processing, in the case that the jam is generated in the first preferential direction, the packet is forwarded in the second preferential direction, whereby the packet is forwarded to the adjacent memory node along the straight line connecting the destination node (to) and the source node (from) while the jam is avoided.

FIG. 14D illustrates a specific example of the packet forwarding process. The case 1 is an example in which the jam is not generated. In the case 1, the packet is forwarded along the straight line connecting the destination node (to) and the source node (from). The cases 2 and 3 are examples in which the jam is avoided. In the case 2, the jam is generated in the N-direction when the packet is forwarded to N. Therefore, as illustrated in the case 3, the packet is forwarded to E to avoid the jam. The cases 4 and 5 are other examples in which the jam is avoided. In the case 4, the jam is generated in the E-direction when the packet is forwarded to E. Therefore, as illustrated in the case 5, the packet is forwarded to N to avoid the jam.

In the forwarding algorithm 3, in the case that the jam is generated in the first preferential direction, the jam can be avoided by forwarding the packet in the second preferential direction. At this point, the number of forwarding steps until the packet reaches the destination node is not changed compared with the case in which the jam is not generated.

[2] Forwarding Algorithm 4 of Storage Devices

Figure 15:
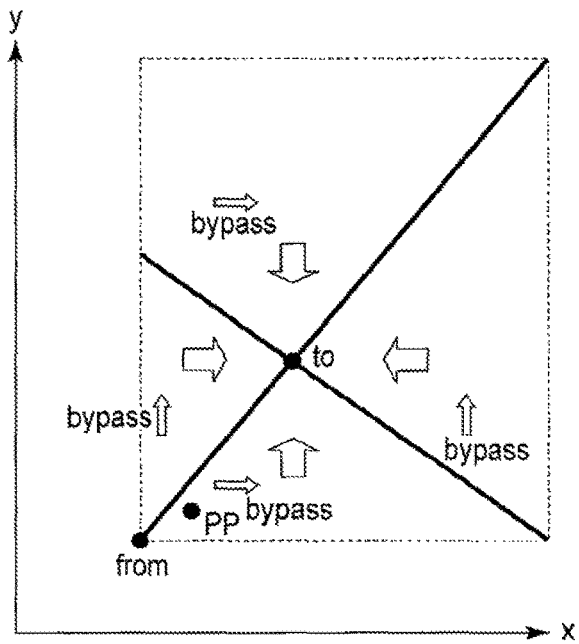
FIG. 15 is a view illustrating a forwarding algorithm 4 in the storage device of the third embodiment.

FIG. 15 is a view illustrating a forwarding algorithm 4 in the storage device. A first example of another method for determining the adjacent node of the forwarding destination based on the four pieces of information, namely, the destination address and the source address of the packet, the address of the self-node, and the output port occupancy information on the self-node will be described with reference to FIG. 15. This method is referred to as the forwarding algorithm 4.

As illustrated in FIG. 15, four areas that are separated by the first straight line connecting the destination node (to) and the source node (from) and a second straight line orthogonal to the first straight line at the position of the destination node (to) are defined. A determination which one of the four areas the self-node (PP) exists in is made, and the packet is forwarded to the adjacent node in the direction that is determined by the output port occupancy information on the self-node (PP) in the two directions of the first preferential direction and the second preferential direction, which are allocated to the area in which the self-node (PP) exists.

The advantage of the forwarding algorithm 4 over the forwarding algorithm 3 is as follows. In the forwarding algorithm 3, it is necessary to provide a restriction that the packet Is prohibited from being forwarded to the outside of the area defined by a rectangle in which the straight line connecting the destination node (to) and the source node (from) is used as a diagonal line. On the other hand, in the forwarding algorithm 4, it is not necessary to provide the restriction.

[3] Forwarding Algorithm 5 of Storage Device

Figure 16:
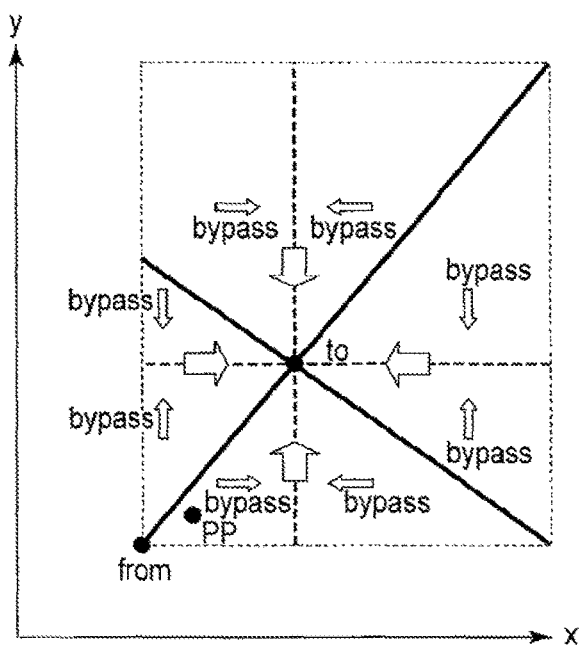
FIG. 16 is a view illustrating a forwarding algorithm 5 in the storage device of the third embodiment.

FIG. 16 is a view illustrating a forwarding algorithm 5 in the storage device. A second example of another method for determining the adjacent node of the forwarding destination based on the four pieces of information, namely, the destination address and the source address of the packet, the address of the self-node, and the output port occupancy information on the self-node will be described with reference to FIG. 16. This method is referred to as the forwarding algorithm 5.

As illustrated in FIG. 16, eight areas that are separated by four straight, lines, namely, the first straight line connecting the destination node (to) and the source node (from), the second straight line orthogonal to the fist straight line at the position of the destination node (to), and the third and fourth straight lines extending in the x-direction and the y-direction at the position of the destination node (to) are defined. A determination which one of the eight areas the self-node (PP) exists in is made, and the packet is forwarded to the adjacent node in the direction that is determined by the output port occupancy information on the self-node (PP) in the two directions of the first preferential direction and the second preferential direction, which, are allocated to the area in which the self-node (PP) exists. For example, the third and fourth straight lines extending in the x-direction and the y-direction at the position of the destination node (to) include two straight lines that pass through the destination node (to) and extend along two directions in which, the memory nodes are arrayed.

The advantage of the forwarding algorithm 5 over the forwarding algorithm 4 is as follows. In the algorithm 4, in the case that the packet is forwarded in the second preferential direction (bypass direction) outside of the area defined by the rectangle in which the straight line connecting the destination node (to) and the source node (from) is used as a diagonal line, the number of forwarding steps is increased by at least, one until the packet reaches the destination node (to). On the other hand, in the forwarding algorithm 5, the number of forwarding steps is not increased.

As described above, according to the third embodiment, the probability that the jam is generated can be decreased compared with the first and second embodiments, and the storage device in which the response speed is maintained even if many clients are simultaneously connected can be provided.

The logical address and the physical address of the memory node are matched similarly to the first embodiment, so that the data forwarding method can efficiently be performed while each memory node needs not to manage the routing table. Therefore, the storage device has the excellent expandability, namely, the memory node can easily be added to the storage device. Other configurations and effects of the embodiment are similar to those of the first embodiment.

[Fourth Embodiment]

In a storage system according to a fourth embodiment that includes a storage device including forwarding-function-equipped memory nodes and a control computer connected to the storage device, an operational condition of the storage system in which the jam is not generated in forwarding the packet, namely, the operational condition that becomes jam free will be described.

[1] Configuration of Storage System

Figure 17:
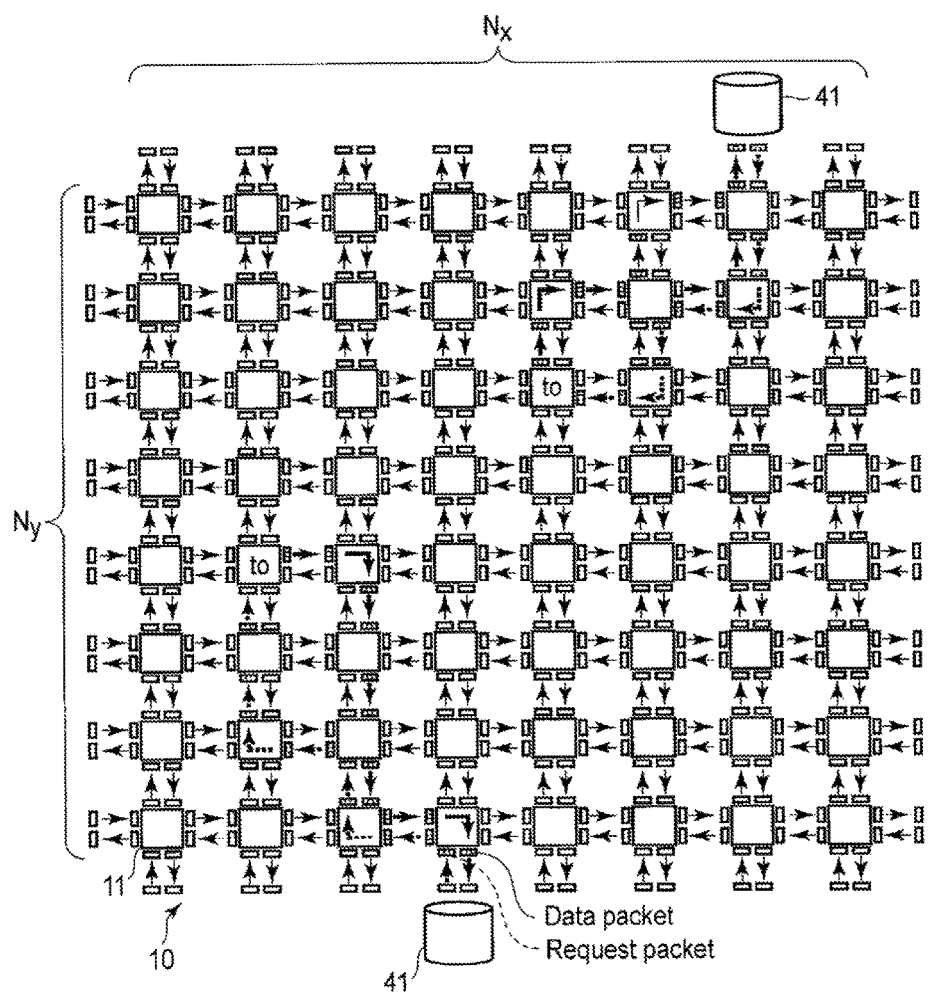
FIG. 17 is a view illustrating a configuration of a storage system according to a fourth embodiment.

FIG. 17 is a view illustrating a configuration of the storage system of the fourth embodiment.

As illustrated in FIG. 17, the storage system includes a storage device 10 that includes memory nodes 11 and control computers 41 that are connected to the storage device 10. As illustrated in FIG. 1, the storage device 10 has the configuration in which the memory nodes having the data forwarding functions are mutually connected. The control computer 41 is connected to the memory node 11 that is disposed in the outer peripheral portion of the storage device 10.

[2] Jam-Free Operational Condition of Storage System

A framework of a packet forwarding simulation in the storage system will be described with reference to FIG. 17. A process in which a request packet transmitted from the control computer 41 connected to the storage device 10 reaches the memory node of the destination address and a process in which a data packet sent back from the target memory node reaches the original control computer 41 are simulated. The bypass-function-equipped routing algorithm (forwarding algorithm 3) described with reference to FIG. 13 is used as the packet forwarding algorithm.

It is assumed that $N_{node}=Nx \times Ny$ is the number of memory nodes of the storage device 10, and it is assumed that Nc is the number of control computers connected to the storage device 10. It is assumed that a unit step time is a time for which the packet is forwarded once between the memory nodes. It is assumed that Rr is a probability that the control computer 41 transmits the request packet per unit step time. Rr is increased up to 1. It is assumed that $R_{bypass}$ a bypass transfer occurrence rate, and it is assumed that $R_{jam}$ is a jam occurrence rate.

The bypass transfer occurrence rate $R_{bypass}$ indicates a probability that the jam is avoided by the bypass forwarding when the memory node tries to forward one packet. On the other hand, the jam occurrence rate $R_{jam}$ indicates a probability that, because not only the output port buffer in the first preferential direction but also the output port buffer in the second preferential direction are occupied by other packets when the memory node tries to forward one packet, the packet cannot be forwarded, the jam is generated, and the packet remains. It is assumed that $R_{load}$ is a load factor. The load factor $R_{load}$ is an average of the number of packets existing in one memory node.

FIG. 18 illustrates a relationship between the bypass transfer occurrence rate $R_{bypass}$ the load factor $R_{load}$ and a relationship between the jam occurrence rate $R_{jam}$ and the load factor $R_{load}$. Many plots indicate results in the case that the number of memory nodes $N_{node}$, the number of control computers Nc, and the probability Rr are changed in various ways.

The jam occurrence rate $R_{jam}$ is substantially zero in the case that the load factor $R_{load}$ is smaller than 0.2, if is found that the jam-free operational condition of the storage system is load factor $R_{load} < 0.2$. The jam occurrence rate $R_{jam}$ starts to be increased when the load factor $R_{load}$ becomes 0.2 or more. However, even in the case of load factor $R_{load}=2$, the jam occurrence rate $R_{jam}$ is about 0.05 that is acceptable for practical usage. On the other hand, the jam occurrence rate $R_{jam}$ is rapidly increased when the load factor $R_{load}$ is more than 2. This is because a hung-up phenomenon in which the jam occurs in chain reaction due to the large $R_{load}$.

When the load factor $R_{load}$ is increased, the bypass transfer occurrence rate $R_{bypass}$ rises earlier than the jam occurrence rate $R_{jam}$ by about one order. That is, the bypass forwarding algorithm improves the threshold $R_{load}$ by about one order.

A relationship between the number of control computers and the number of memory nodes, in which the jam generation rate is acceptable for practical usage, is obtained based on the simulation results. It is assumed that $S_{avg}$ is an average packet staying step time. The average packet staying step time $S_{avg}$ is the sum of the step time $S_{request}$ since the control computer 41 transmits the request packet until the request packet reaches the memory node of the destination address and a step time until the data packet sent back from the target memory node reaches the original control computer. The step times $S_{request}$ and $S_{dat}$ are (Nx/2+Ny/2) in the case that the jam is not generated. Accordingly, the average packet staying step time $S_{avg}$ is (Nx+Ny) that is about $2\sqrt{N_{node}}$.

On the other hand, Nc×Rr is the total number of request packets transmitted per unit step time by the control computer 41. Accordingly, Nc×Rr×$2\sqrt{N_{node}}$ is the average of the total number of packets existing in the storage system. Therefore, $R_{load}$ is approximately Nc×Rr×$2\sqrt{N_{node}}/N_{node}$=Nc×Rr×$2/\sqrt{N_{node}}$. Assuming that $R_{load}^{limit}$ is the limit $R_{load}$ below which jam generating rate is acceptable, the preferable operational condition of the storage system is $R_{load}<R_{load}^{limit}$. Accordingly, the maximum number of control computers $Nc^{max}$, in which the jam generation rate is acceptable for practical usage, becomes $Nc^{max}<R_{load}^{limit}\times\sqrt{N_{node}}/(Rr\times 2)$. Because the Rr is increased up to 1, the stricter operational condition is $Nc^{max}<R_{load}^{limit}\times\sqrt{N_{node}}/2$.

As described above, in forwarding the packet, the jam-free operational condition is $R_{load}^{limit}$0.2, and the operational condition, in which the jam generation rate is acceptable for practical usage, is $R_{load}^{limit}=2$. Accordingly, preferably the maximum number of control computers $Nc^{max}$ is $Nc^{max}<\sqrt{N_{node}}$, more preferably $Nc^{max}<0.1\times\sqrt{N_{node}}$. Other configurations and effects are similar to those of the first embodiment.

[Fifth Embodiment]

A storage device according to a fifth embodiment includes forwarding-function-equipped memory nodes that are mutually connected as illustrated in FIG. 1, and each memory node is equipped with a distributed processing function.

[1] Configuration of Storage System

Figure 19:
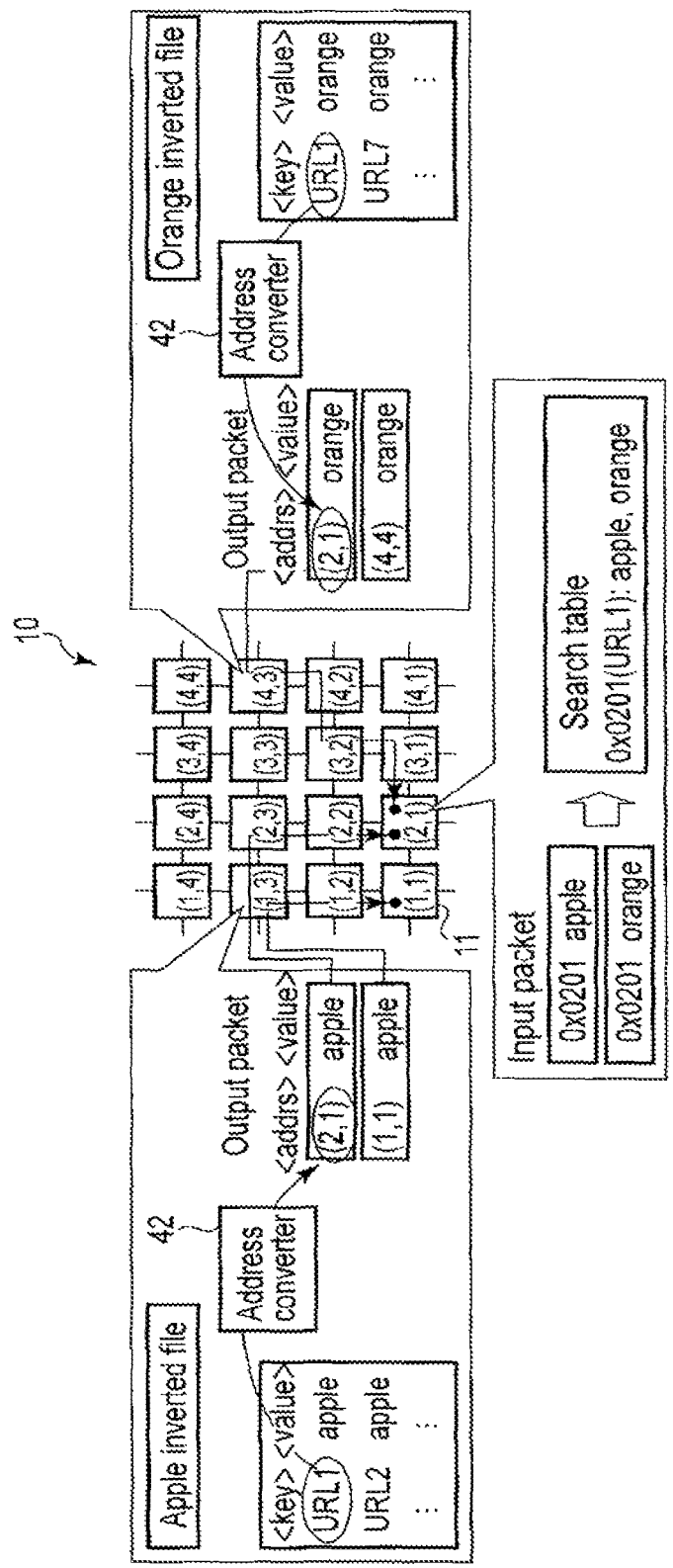
FIG. 19 is a view illustrating a configuration of a storage device according to a fifth embodiment.

FIG. 19 is a view illustrating a configuration of the storage device of the fifth embodiment.

As illustrated in FIG. 19, a storage device 10 includes memory nodes 11 as illustrated in FIG. 1, and is equipped with the distributed processing function. In the fifth embodiment, each memory node 11 further includes an address converter 42.

[2] Distributed Processing Function of Storage Device

The distributed processing function will be described with reference to FIG. 19 by taking an AND search processing for searching a URL including both keywords of "apple" and "orange" as an example.

At this point, it is assumed that memory nodes (1,3) and (4,3) retain inverted files of "apple" and "orange", respectively. The inverted file means a search file that is prepared for each keyword. For example, a list of all the URLs including "apple" is stored in the inverted file corresponding to the keyword of "apple".

The gateway server transmits an AND search command to the memory nodes that manage the inverted files of "apple" and "orange". The memory nodes that manage the inverted files perform mapping of contents of the inverted file into key-value type data. At this point, a key and a value are the URL and the keyword of the inverted file, respectively.

The memory node managing the inverted files of "apple" and "orange" convert the key into the address using the address converter 42 for each record of the key-value type data, and transmit the packet including the value to the converted address. The address converter 42 may directly calculate the address from the key according to a certain rule, or the address converter 42 may acquire the address corresponding to the key by making an inquiry to a server equipped with a function of converting the key into the address.

For example, the address converter 42 calculates the address from the key according to the following addressing rule.

address=hash (key) mod N

Where hash ( ) is a cryptologic hash function, N is the number of memory nodes in the storage device 10, and mod N expresses residue operation with modulus N.

For example, the address converter 42 makes the inquiry of the address corresponding to the key to another server, and another server converts the key into the address by the consistent hashing and replies the original address converter 42.

In the example illustrated in FIG. 19, it is assumed that both the inverted files of "apple" and "orange" include an URL1, and it is assumed, that the URL1 is converted into the address (2,1). In this case, the memory node (2,1) plays a role in determining whether the URL1 satisfies an AND search formula. The two packets having the values of "apple" and "orange" are delivered to the memory node (2,1). Therefore, the memory node (2,1) finds out that the URL1 satisfies an AND search condition.

The gateway server that outputs query is notified of the fact that the URL1 satisfies the AND search condition by the memory node (2,1). Many memory nodes make the same determinations for all the URLs described in the inverted files, whereby the gateway server that outputs the query can obtains the list of URLs satisfying the AND search condition.

In the case that the above AND search operation is performed by the single memory node, it is necessary to perform an operation expressed by the following code.

```
for (i = 0;i < N_apple;i+ +)
    for (j = i;j < N_orange;j + +)
        if (URLlist_apple[ i ] == URLlist_orange[ j ] )
```

Where $N_{apple}$ and $N_{orange}$ are numbers of URLs stored in the inverted files of "apple" and "orange" and indicates an identity operation. The memory node needs to repeat the identity operation $N_{apple} \times N_{orange}/2$ times. In the storage device of the fifth embodiment, the identity operation can be performed in the distributed manner by many memory nodes.

As described above, according to the fifth embodiment, each memory node can be equipped with not only the storage function of the first embodiment, but. also a distributed processing (distributed computing) function. Other configurations and effects are similar to those of the first embodiment.

[Sixth Embodiment]

A storage system according to a sixth embodiment includes a storage device that includes forwarding-function-equipped memory nodes, some memory nodes of the storage device include an extra input/output port (hereinafter referred to as a non-adjacent port) in addition to an input/output port (hereinafter referred to as an adjacent port) connected to the adjacent memory node (hereinafter referred to as an adjacent node), and the some memory nodes are connected to one of a control computer and a non-adjacent memory node (hereinafter referred to as a non-adjacent node) by the non-adjacent port.

[1] Configuration of Storage System

Figure 20:
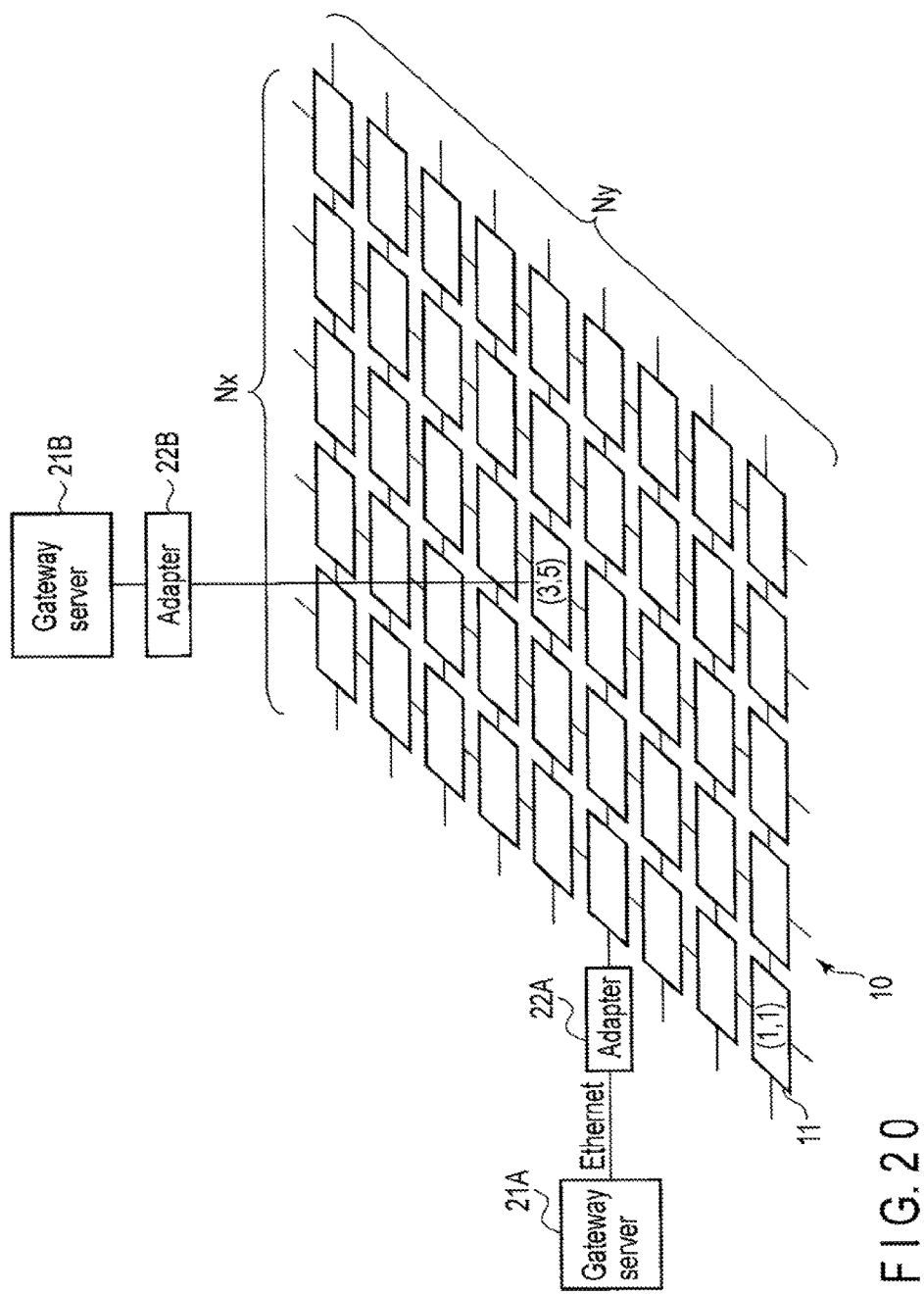
FIG. 20 is a view illustrating a configuration of a storage system according to a sixth embodiment.

FIG. 20 is a view illustrating a configuration of the storage system of the sixth embodiment.

As illustrated in FIG. 20, the storage system includes a storage device 10 including memory nodes 11 and gateway servers 21A and 21B connected to the storage device 10. The storage device 10 has the configuration in which the data-forwarding-function-equipped memory nodes are mutually connected as illustrated in FIG. 1. The gateway server 21A is connected to a memory node (1,4) disposed in the outer peripheral portion of the storage device 10 through an adapter 22A. A memory node (3,5) disposed in the central portion of the storage device 10 includes the input/output port (non-adjacent port) in addition to the input/output port connected to the adjacent node, and the gateway server 21B is connected to the non-adjacent port through an adapter 22B.

[2] Packet Forwarding of Storage System

An effect that the memory node including the input/output port (non-adjacent port) in addition to the input/output port connected to the adjacent node is introduced will be described with reference to FIG. 20. At this point, it is assumed that Nx is the number of memory nodes in the x-direction of the storage device 10, and it is assumed that Ny is the number of memory nodes in the y-direction.

In the case that the connection destination of the gateway server is restricted to the memory node disposed in the outer peripheral portion of the storage device 10, Nx/2+Ny/2 is the average number of forwarding times until the packet reaches the target memory node from the gateway server.

On the other hand, Nx/4+Ny/4 is the average number of forwarding times until the packet reaches the target memory node from the gateway server 21B, when the number of input/output ports of the memory node (3,5) located in the central portion of the storage device 10 is increased, and the memory node (3,5) is connected to the gateway server 21B by the additional input/output port (the non-adjacent port), as illustrated in FIG. 20.

In this way, increasing the numbers of input/output ports of some memory nodes in the storage device 10 and connecting the memory node to the gateway server by the additional input/output port, result in the decrease of the average number of forwarding times until the packet reaches the target memory node.

As illustrated in FIG. 21, plural memory nodes that are connected to the gateway server by the additional input/output ports may be disposed in the storage device 10. That is, the memory node (4,1) includes the input/output port (non-adjacent port) in addition to the input/output port connected to the adjacent node, and the non-adjacent port is connected to a gateway server 21C through an adapter 22C.

The gateway servers 21A, 21B, 21C, and 21D connected to the memory nodes in the storage device 10 may be connected by a line 23 that is different front the line connecting the server and the memory node. An adapter 22E may be connected between the gateway servers, for example, between the gateway servers 21A and 21B. Therefore, using the line 23, the packet can be forwarded between the gateway servers and between the gateway server and the memory node. For example, the packet may be forwarded in the order of gateway server 21A→gateway server 21B→gateway server 21C→memory node (4,7). The packet may also be forwarded in the order of gateway server 21A→gateway server 21D→memory node (5,4).

As described above, according to the sixth embodiment, the forwarding time can be shortened when the packet is forwarded between the gateway server and the memory node in the storage device. Other configurations and effects are similar to those of the first embodiment

[Seventh Embodiment]

A storage system according to a seventh embodiment includes a storage device that includes forwarding-function-equipped memory nodes, some memory nodes of the storage device include an input/output port (non-adjacent port) besides an input/output port connected to the adjacent node, and the some memory nodes are connected to a non-adjacent memory node by the non-adjacent port and the extra connection line.

[1] Con figuration of Storage System

Figure 22:
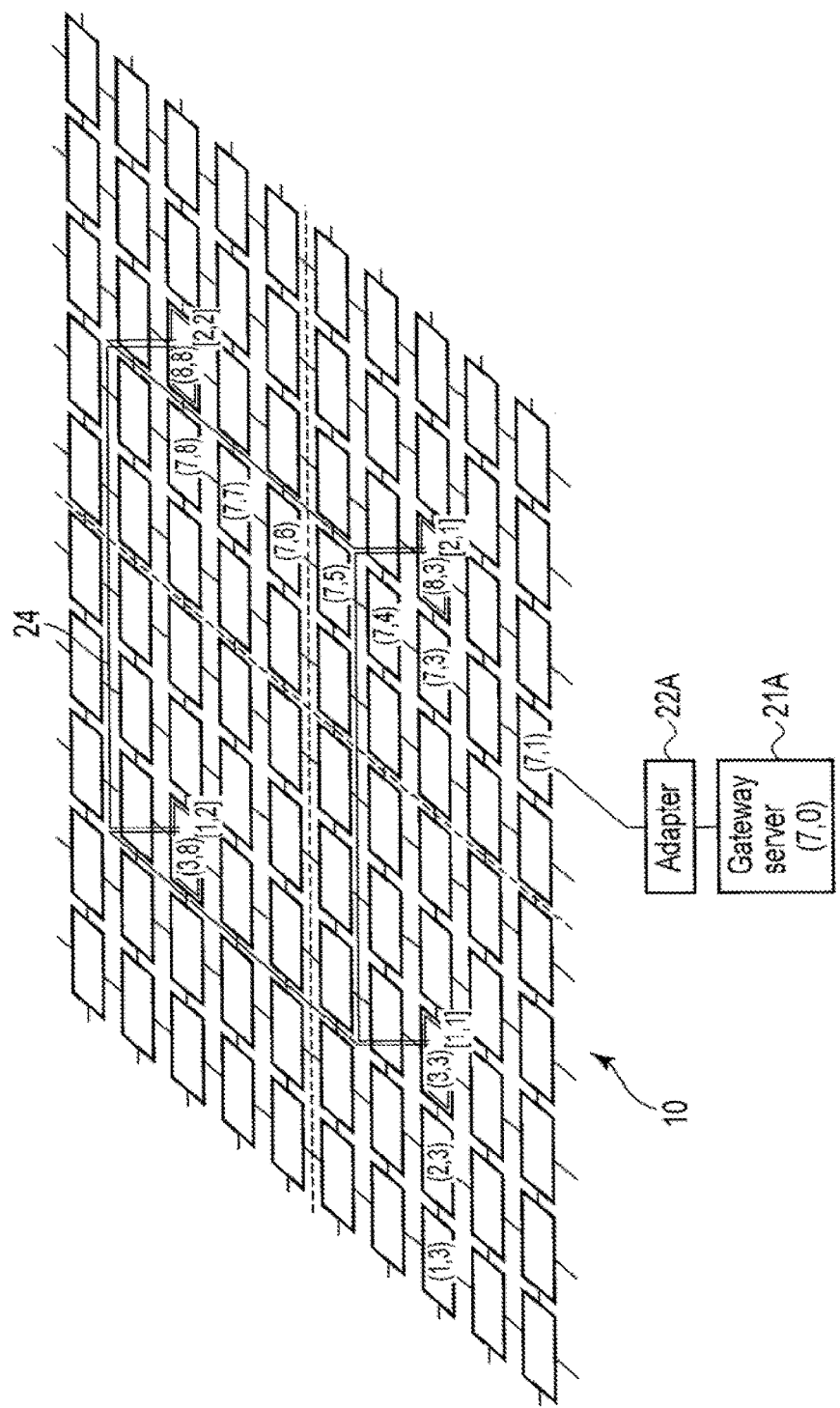
FIG. 22 is a view illustrating a configuration of a storage system according to a seventh embodiment.

FIG. 22 is a view illustrating a configuration of the storage system of the seventh embodiment.

As illustrated in FIG. 22, the storage system includes a storage device 10 composed of plural memory nodes and a gateway server 21A connected to the storage device 10. The storage device 10 has the configuration in which the data-forwarding-function-equipped memory nodes are mutually connected as illustrated in FIG. 1. The gateway server 21A is connected to a memory node (7,1) disposed in the outer peripheral portion of the storage device 10 through an adapter 22A.

Memory nodes (3,3), (3,8), (8,3), and (8,8) disposed in the storage device 10 include the input/output ports (non-adjacent ports) in addition to the input/output ports connected to the adjacent nodes. The non-adjacent ports are connected to each other by an extra connection line 24. For example, the memory nodes (3,3) and (3,8), the memory nodes (3,8) and (8,8), the memory nodes (8,8) and (8,3), and the memory nodes (8,3) and (3,3) are connected to each other by the extra connection lines 24.

The memory node connected to the non-adjacent node has the additional address decided by a relative physical position between the memory nodes connected to the non-adjacent node in addition to the address fixed by the physical position. In the case that the memory node connected to the non-adjacent node receives the packet addressed to the memory node except the self-node, the packet controller calculates the number of packet forwarding times for the candidate courses between the self-node and the destination node, based on the address fixed by the physical position and the additional address and finds the shortest route, then determines the output port of the packet.

[2] Packet Forwarding of Storage System

An influence of the direct connection between the non-adjacent memory nodes on the number of packet forwarding times in the storage device 10 will be described. As described above, FIG. 22 illustrates the storage device in which some non-adjacent nodes are mutually connected by the non-adjacent ports and the additional lines. On the other hand, FIG. 23 illustrates the storage device, in which the numbers of input/output ports of all the memory nodes are equal to one another while the non-adjacent nodes are not connected.

In the storage devices of FIGS. 22 and 23, the case in which the data packet is transmitted from the gateway server 21A of an address (7,0) to a memory node (7,8) is discussed.

In the case that the non-adjacent nodes are not connected (see FIG. 23), the shortest data forwarding route is gateway server 21A (7,0)→memory node (7,1)→(7,2)→(7,3)→(7,4)→(7,5)→(7,6)→(7,7)→(7,8). Therefore, the total number of packet forwarding times (between the gateway server and the memory node and between the memory nodes in the storage device 10) is 8.

On the other hand, in the case that the non-adjacent nodes are connected (see FIG. 22), the shortest data forwarding route is gateway server 21A→memory node (7,1)→(7,2)→(7,3)→(8,3)→(8,8)→(7,8), and the packet can be transmitted from the gateway server 21A to the destination memory node (7,8) by the six-time forwarding.

In this way, connecting some non-adjacent memory nodes by the additional input/output ports and the extra lines makes decrease in the number of packet forwarding times until the packet reaches the destination node.

It should be noted that when some non-adjacent memory nodes in a storage device are directly connected with each other, the shortest, data forwarding route cannot be decided only by the addresses of nodes or gateway server determined by the physical positions.

In the case that the data packet is transmitted from the gateway server 21A of the address (7,0) to the memory node (7,8), in the storage device in which the non-adjacent nodes are not connected (see FIG. 23), the minimum total number of packet forwarding times (8 times) is equal to a difference between the addresses (gateway server 21A (7,0) and memory node (7,8)) that are determined by the physical positions of the packet, source and the packet destination.

On the other hand, in the storage device in which some of the non-adjacent, nodes are connected (see FIG. 22), the packet communication between the gateway server 21A (7,0) and the destination memory node (7,8), which have the same physical addresses as the storage device of FIG. 23, can be performed by the six-time forwarding. Namely, the minimum total numbers of packet forwarding time differ from difference between the address of packet source and that of packet destination determined by the physical position.

In the storage device in which some of the non-adjacent nodes are connected, the addresses (hereinafter referred to as a sub-address) that reflects the relative physical positions of the memory nodes connected to the non-adjacent nodes are additionally provided to the memory nodes connected to the non-adjacent nodes. In FIG. 22, the address (hereinafter referred to as a main address) determined by the absolute physical position is expressed by a round bracket, and the sub-address is expressed by a square bracket. In this case, the data forwarding route, and therefore the packet forwarding destination, can be determined from both the main address and the sub-address.

The address information concerning the source node and the destination node is written in the header portion of the packet. When the packet forwarding is performed in the storage device in which some of the non-adjacent memory nodes are directly connected, it is necessary to decide the temporal source node and the temporal destination node, and to write their address information in the header portion of the packet. Furthermore, appropriate updating the address information is required as the packet transmission proceeds. The detailed procedure will be described below.

FIG. 24 illustrates an example of preferable address information on the header portion of the packet in the case that the packet forwarding is performed in the storage system including the memory nodes connected to the non-adjacent nodes.

In FIG. 24, the "final destination node" and the "source node" mean a node to which the packet is finally delivered and a node from which the packet transmission is started, respectively. On the other hand, the "temporary destination node address" and the "temporary source node address" are addresses, which are used to determine the packet forwarding destination in each memory node and are updated during a packet communication process. An update rule during the packet communication process is described later.

The "type" of a temporary node address in FIG. 24 is used to determine whether it is the main address or the sub-address. Both the "first relay node" and the "second relay node" are memory nodes connected to the non-adjacent nodes through which the packet should be transmitted. Furthermore, the "first relay node" is the memory node closest to the source node, and the "second relay node" is the memory node closest to the final destination node.

When the packet is transmitted in the storage device via the memory node connected to the non-adjacent node, determination of the packet forwarding destination and the correction of the header portion of the packet should be performed by, for example, the following rule.

(a) In the case that the memory node without additional input/output port receives the packet, the packet controller checks the address information recorded in the header portion of the packet, and (i) the packet is not forwarded when the address of the final destination node is matched with the address of the self-node.

(ii) when the address of the final destination node differs from the address of the self-node, the forwarding destination is determined toy referring to the main addresses of the temporary source node, the temporary destination node, and the self-node, and the packet is transmitted to the adjacent, memory node.

(b) In the case that the memory node connected to the non-adjacent node receives the packet, the packet controller checks the address information recorded in the header portion of the packet, and (i) the packet is not forwarded when the main address of the self-node is matched with the address of the final destination node.

(ii) when the main address of the self-node differs from the address of the final destination node, and (1) when the sub-address of the self-node is matched with the sub-address of the "first relay node", the address of the "temporary destination node" and that of the "temporary source node" are updated to the sub-address of the "second relay node" and that of the "first relay node", respectively. Furthermore, the "type" of the "temporary destination node address" and that of the "temporary source node address" are updated as sub-address. Then, the forwarding destination is determined by referring to the "temporary destination node address" and the "temporary source node address", and the packet is transmitted to the memory node connected to another non-adjacent, node.

(2) when the sub-address of the self-node is matched with the sub-address of the "second relay node", the "temporary destination node address" is changed, to the main address of the "final destination node", and the "temporary source node address" is changed to the main address of the self-node. Furthermore, the "type" of the "temporary destination node address" and that of the "temporary source node address" are updated as main address. Additionally, the forwarding destination is determined by referring to the main addresses of the "temporary source node", the "temporary destination node", and the self-node, and the packet is forwarded to another adjacent memory node.

(3) when the sub-address of the self-node differs from the addresses of both the "first relay node" and the "second relay node", and when the types of the "temporary destination address" and the "temporary source address", which are written in the header portion of the packet, are the sub-addresses, the forwarding destination is determined by referring to the sub-addresses of the "temporary source node", the "temporary destination node", and the self-node, and the packet is forwarded to the memory node connected to another non-adjacent node.

(4) when the sub-address of the self-node differs from the addresses of both the "first relay node" and the "second relay node", and when the types of the "temporary destination address" and the "temporary source address" are the main, addresses, the forwarding destination is determined by referring to the main addresses of the "temporary source node", the "temporary destination node", and the self-node, and the packet is forwarded to another adjacent memory node.

A procedure in which the client writes the file in the storage device through the gateway server 21A in the storage system illustrated in FIG. 22 will be described as an example in which the packet is transmitted by using the connection between the non-adjacent nodes together.

FIG. 25 is a view illustrating the write operation in the storage system of illustrated in FIG. 22.

The client transmits the file and the file ID to the gateway server 21A (see (1) of FIG. 25). The file ID is an identifier that can uniquely identify the file.

The gateway server 21A divides the file into pieces of data having a defined size and allocates a division data ID to each divided piece of data. The gateway server 21A writes the file ID and the division data IDs in the file table. The division data ID is an identifier that can uniquely identify the divided data (see (2) of FIG. 25).

The gateway server 21A determines the address of the memory node (hereinafter referred to as a write node) in which the divided data is written based on the information on the division data ID (in FIG. 22, the memory node of the main address (7,8)).

The route in which the number of communication times (the number of packet forwarding times) becomes the minimum is obtained by the following procedure when the gateway server 21A forwards the packet to the write node:

1. The address of the "first relay node" that is the memory node closest, to the gateway server 21A and connected to the non-adjacent node, and the address of the "second relay node" that is the memory node closest to the write node and connected to the non-adjacent node are checked. In the case that the data is written in the memory node (7,8) of FIG. 22, the "first relay node" and the "second relay node" are the memory nodes having the main addresses (8,3) and (8,8).

2. The number of forwarding times generated in transmitting the packet is calculated based on the main address with respect to the route between the memory nodes that are connected only to the adjacent nodes, and the number of forwarding times generated in transmitting the packet is calculated based on the sub-address with respect to the route between the memory nodes that are connected to the non-adjacent nodes. Then the shortest route including the connection between the non-adjacent nodes and the shortest route that does not include the connection between the non-adjacent nodes are decided. In the case that the data is written in the memory node (7,8) of FIG. 22, the former is gateway server 21A→memory node (7,1)→(7,2)→(7,3)→(8,3) ([2,1])→(8,8) ([2,2])→(7,8), and the latter is gateway server 21A→memory node (7,1)→(7,2)→(7,3)→(7,4)→(7,5)→(7,6)→(7,7)→(7,8).

3. The number of forwarding times of the shortest route through the memory nodes connected to the non-adjacent, and that of the shortest route that does not pass through the memory nodes connected to the non-adjacent nodes are compared and the default route is determined. In the case that the data is written in the memory node (7,8) of FIG. 22, the number of forwarding times of former route is 6, and the number of forwarding times of latter route is 8. Therefore, the shortest route through the memory nodes connected to the non-adjacent nodes is the default route (see (3) of FIG. 25).

The case in which the route including the connection between the non-adjacent nodes is the default route will be described below.

The gateway server 21A produces the write packet in which the header portion including the address data and the write command is added to the write data. The "temporary destination node" of the address information recorded in the header portion of the packet, is set to the main address (in FIG. 22, (8,3)) of the "first relay node", and the "temporary source node" is set to the main address (in FIG. 22, (7,0)) of the packet, source. Both "types" of the "temporary destination node address" and the "temporary source node address" are deiced as the main addresses. The "first relay node sub-address", the "second relay node sub-address", the "final destination node main address", and the "source node main address" are also written in the header portion of the packet in this stage.

The produced write packet is forwarded from the gateway server 21A to the memory node connected to the gateway server 21A (see (4) of FIG. 25).

According to the above algorithm, the write packet is forwarded between the memory nodes by referring to the main addresses of the "temporary destination node", the "temporary source node", and the self-node until the write packet reaches the "temporary destination memory node" (in FIG. 22, the first relay node having the main address (8,3)) (see (5) of FIG. 25).

The first relay node that receives the write packet reads the header portion of the packet. Because the final destination node of the packet is another memory node while the "first relay node sub-address" written in the header is same as that of the self-node, the "temporary destination node address" is changed to the sub-address (in FIG. 22, [2,2]) of the "second relay node" written in the header of the packet, and the "temporary source node address" is changed to the sub-address (in FIG. 22, [2,1]) of the self-node (see (6) of FIG. 25). Both "types" of the "temporary destination node address" and the "temporary source node address" are changed to the sub-addresses. The packet is forwarded to the memory node connected to the adjacent non-adjacent node (see (7) of FIG. 25).

According to the above algorithm, the write packet is forwarded between the memory nodes connected to the non-adjacent nodes by referring to the sub-addresses of the temporary destination, the temporary source, and the self-node until the write packet reaches the second relay node that is the "temporary destination memory node".

The second relay node that receives the write packet reads the header portion of the packet. Because the final destination is another memory node while "the second relay node" written in the header position of the packet is self-node, the "temporary destination node address" is changed to the main address (in FIG. 22, write node (7,8)) of the final destination node, and the "temporary source node address" is changed to the main address (in FIG. 22, (8,8)) of the self-node (see (8) of FIG. 25). The write packet is forwarded to the adjacent memory node.

The write packet is repeatedly forwarded between the memory nodes according to the above algorithm by referring to the main addresses of the "temporary source node", the "temporary destination node", and the self-node, and until the write packet reaches the write node (in FIG. 22, main address (7,8)) that is the final destination node (see (9) of FIG. 25).

Because the "final destination node address" is the same as that of the self-node, the write node that receives the packet does not forward the packet, but writes the address information on the header portion and the write data in a memory 16 of the self-node (see (10) of FIG. 25). Then a write completion reporting packet is produced in which the header addresses of the "temporary source node" and the "temporary destination node" and those of the "first relay node" and the "second relay node" and those of the "final destination node" and the "source node" are reversed as follows. The "source node" is set to the write node having the main address (7,8), the "final destination node" is set to the gateway server 21A having the main address (7,0), the "first relay node" is set to the node having the main address (8,8) (the sub-address [2,2]), and the "second relay node" is set to the node having the main address (8,3) (sub-address [2,1]). The "temporal source node" is set to the write node having the main address (7,8), the "temporal destination node" is set to the "first relay node" having the main address (8,8), and their "types" are changed to main, address. Then the write completion reporting packet is sent back to the gateway server 21A by the similar procedure (see (11) of FIG. 25).

After all the divided pieces of data are written, the gateway server 21A performs the write completion reporting to the client.

In the above example, the procedure how to write a client file in the storage device including memory nodes connected to another non-adjacent nodes is explained. In the case that a command such as read, erase, and free space reply is transmitted from the gateway server to the memory node of the storage device in order to read or erase the data written in the memory node or to confirm the free space, the packet forwarding time can foe shortened by conducting the communication through the connection between the non-adjacent nodes. In the case that the read data or the inquiry result are transmitted from the memory node to the gateway server, the packet forwarding time can also foe shortened by conducting the communication through the connection between the non-adjacent nodes.

As described above, the average number of packet forwarding times can be decreased by transmitting the data through the connection between the non-adjacent nodes. Preferably the memory nodes that are connected to the non-adjacent nodes by the additional input/output ports are disposed in the storage device with uniform distribution. One method to realize such layout is to divide the storage device such that each divided area has the same number of memory nodes, then to place the memory node with extra port in the center of each divided area.

For example, in the storage device of FIG. 22 constructed by the 10-by-10 memory node, the storage device is divided into four areas including the 5-by-5 memory node (boundary is indicated by a dotted line), and the memory nodes with an additional port is placed in the center nodes of four areas, namely, memory nodes (3,3), (8,3), (3,8), and (8,8).

More generally, it is preferable to divide the storage device constructed by the al-by-bm memory node into 1-by-m areas, and to place the memory node with extra port in the center node of each area, namely the memory node with address (c1+round (1/2,0), em+round (m/2,0)) (a≥c≥0, b≥e≥0, 1≥d≥0, m≥f≥0; round (A,0) is a function that rounds off A to the nearest integer).

In the storage device, a trouble that is caused by connecting some non-adjacent memory nodes is that the jam of the packet communication is easily generated at the nodes, as the route of packet transmission via such nodes is preferred due to small numbers of packet forwarding time.

The jam of the packet forwarding can be relaxed by making the packet communication speed between the non-adjacent memory nodes higher than that between the adjacent memory nodes. However, in this case, it is important to note that the total packet communication time, which is necessary to be calculated to decide the shortest route of packet transmission, differs from the total number of packet forwarding times. The total packet communication time is equal to a product of the communication time between the memory nodes and the number of packet forwarding times. Accordingly, in the case that the speed of data communication between the adjacent memory nodes is equal to that of data communication between the non-adjacent memory nodes, as described above, the data communication time can be compared by the number of forwarding times of each route. On the other hand, in the case that the packet transmission speed between the adjacent memory nodes differs from the packet transmission speed between the non-adjacent memory nodes, the data communication times cannot be compared only by the number of forwarding times.

The total packet communication time of the route through the connection between the non-adjacent nodes and the route that does not pass through the connection between the non-adjacent nodes can correctly foe compared by referring to a product of an inverse number (because of speed=distance/time, the inverse number is proportional to the communication time) of the communication speed and the number of forwarding times. However, the calculation becomes complicated when the connection between the adjacent nodes and the connection between the non-adjacent nodes are mixed in the packet communication route, as in the case described above.

In the storage device in which the packet communication speed between the adjacent nodes differs from the packet communication speed between the non-adjacent nodes, the step of the provided address may inversely be proportional to the packet communication speed to regard an address difference thereof as the number of forwarding time.

Figure 26:
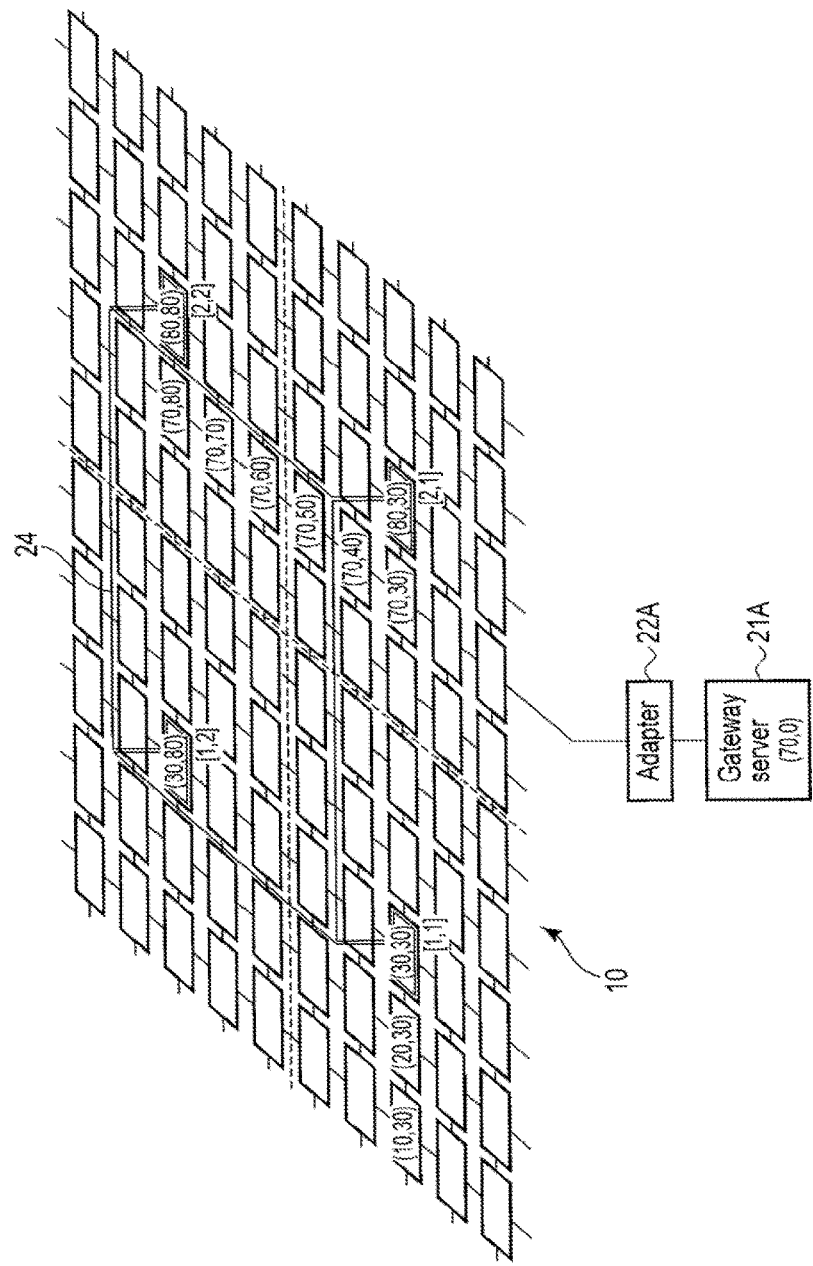
FIG. 26 is a view illustrating another configuration of the storage system of the seventh embodiment.

FIG. 26 illustrates an example in which the address is provided, wherein the packet communication speed between the non-adjacent nodes is ten times higher than the packet communication speed between the adjacent nodes. In FIG. 26, while reflecting the relative physical position, the sub-address is provided so as to be different by one between a certain memory node and the non-adjacent nodes connected to the memory node (expressed by a square bracket). Additionally, while reflecting the mutual physical positional relationship, the main address is provided so as to be different by 10 between the adjacent memory nodes (expressed by a round bracket), as shown in FIG. 26.

In the storage device, a difference of the sub-address between the memory nodes is calculated in the case that the packet is transmitted between the memory nodes connected to the non-adjacent nodes, and a difference of the main address between the memory nodes is calculated in the case that the packet is transmitted between the adjacent memory nodes, and the differences are regarded as the number of forwarding times. When the rule to calculate the number of forwarding times is decided as described above, the packet communication time can be estimated and compared only by the number of forwarding times even if the connection speed between the adjacent nodes differs from the connection speed between the non-adjacent nodes.

As described above, according to the seventh embodiment, the forwarding time can be shortened when the packet is forwarded between the gateway server and the memory node in the storage device. Other configurations and effects are similar to those of the first, embodiment.

[Eighth Embodiment]

In a storage system according to an eighth embodiment, a switching relay is added between a gateway server and a storage device in order to decrease the average number of packet forwarding times.

[1] Configuration of Storage System

Figure 27:
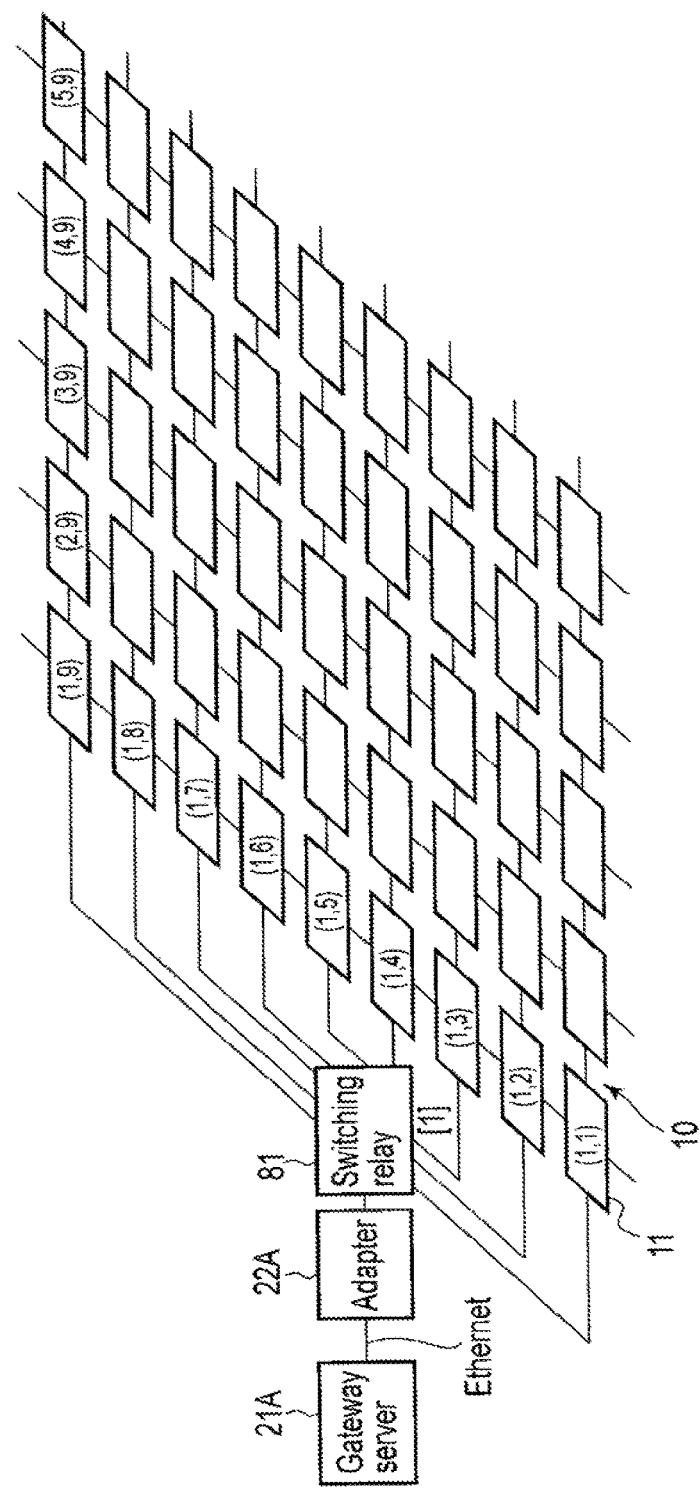
FIG. 27 is a view illustrating a configuration of a storage system according to an eighth embodiment.

FIG. 27 is a view illustrating a configuration of the storage system of the eighth embodiment.

As illustrated in FIG. 27, the storage system includes a storage device 10 that includes memory nodes 11, a switching relay 81 that is connected to the storage device 10, and a gateway server 21A that is connected to the switching relay 81.

The storage device 10 has the configuration in which the data-forwarding-function-equipped memory nodes are mutually connected as illustrated in FIG. 1. The switching relay 81 is connected to all, memory nodes (1,1), (1,2), (1,3), (1,4), (1,5), (1,6), (1,7), (1,8), and (1,9), which are disposed on one end side (left end in FIG. 27) of the storage device 10. The gateway server 21A is connected to the switching relay 81 through an adapter 22A, The switching relay 81 forwards the received packet to the assigned destination node according to the address information recorded in the header portion of the packet. An address (in FIG. 27, expressed by a square bracket) that is different from that of the memory node in the storage device is provided to the switching relay 81.

[2] Packet Forwarding of Storage System

The procedure to forward the packet in the storage device of the eighth embodiment will, be described.

The packet delivered from the gateway server 21A enters the switching relay 81 through the adapter 22A. The packet that enters the switching relay 81 is transmitted to one of the memory nodes (1,1), (1,2), (1,3), (1,4), (1,5), (1,6), (1,7), (1,8), and (1,9), which are connected to the switching relay 81, and then the packet is forwarded to the memory node of the destination address.

On the contrary, the packet transmitted from the memory node in the storage device 10 is transmitted to one of the memory nodes (1,1) to (1,9), and forwarded to the gateway server 21A through the switching relay 81 and the adapter 22A.

In the storage system, illustrated in FIG. 27, the case in which the packet is transmitted to the memory node (5,9) from the gateway server 21A through the switching relay 81 and the memory node (1,9) is as follows. The shortest route is switching relay 81→memory node (1,9)→(2,9)→(3,9)→(4,9)→(5,9), and the number of packet forwarding times in the storage device 10 is 4.

On the other hand, as illustrated in FIG. 28, in a storage system in which the gateway server 21A is connected to the memory node (1,4) of the storage device 10 without passing through the switching relay 81, the case in which the packet is transmitted from the gateway server 21A to the memory node (5,9) is as follows. One of the shortest route is gateway server 21A→memory node (1,4)→(1,5)→(1,6)→(1,7)→(1,8)→(1,9)→(2,9)→(3,9)→(4,9)→(5,9), and the number of packet forwarding times in the storage device 10 is at least 9.

When the switching relay 81 is introduced between the gateway server 21A and the storage device 10, the number of packet forwarding times can be decreased to shorten the forwarding time.

The case in which the packet is transmitted from the gateway server 21A to the storage device 10 is described above. Even in the case that the data stored in the memory node of the storage device 10 is transmitted to the gateway server 21A, in the storage system in which the switching relay 81 exists between the gateway server 21A and the storage device 10 (see FIG. 27), the number of packet forwarding times is decreased to shorten the forwarding time, compared with the storage system in which the gateway server 21A and the storage device 10 are directly connected through the adapter (see FIG. 28).

However, in the storage system in which the switching relay is introduced, the number of packet forwarding times depends on the memory node that performs the relay in transmitting and receiving the packet between the switching relay and the storage device. For example, as described above, in the case that the gateway server 21A forwards the packet to the memory node (5,9) in the storage system illustrated in FIG. 27, the number of packet forwarding times in the storage device 10 is at least 4 when the memory node (1,9) is used as the relay memory node. On the other hand, in the case that another memory node except the memory node (1,9) is used as the relay memory node, it is necessary to forward the packet five times or more.

In order to minimize the number of packet forwarding times, it is necessary that the memory node closest to the destination node be selected as the relay memory node in the memory nodes that are directly connected to the switching relay. The procedure to calculate the address of the relay memory node such that, the packet forwarding time becomes the minimum is described later.

In the storage system in which the gateway server and the storage device are connected without passing through the switching relay, in the case that the packet is forwarded between the gateway server and the memory node in the storage device, the source and the destination are one of the gateway server and the memory node, and the source and the destination are not changed while the packet is forwarded.

On the other hand, in the storage system in which the gateway server and the storage device are connected through the switching relay, in the case that the packet is forwarded, the packet is forwarded while the relay memory node is set to the destination. After the packet reaches the relay memory node, the packet is forwarded while the memory node (in the case that the packet is transmitted from the gateway server to the memory node) or the switching relay (in the case that the packet is transmitted from the memory node to the gateway server) is set to the destination. That is, it is necessary to change the destination of the packet before and after the packet reaches the relay memory node.

Figures 29, 30:
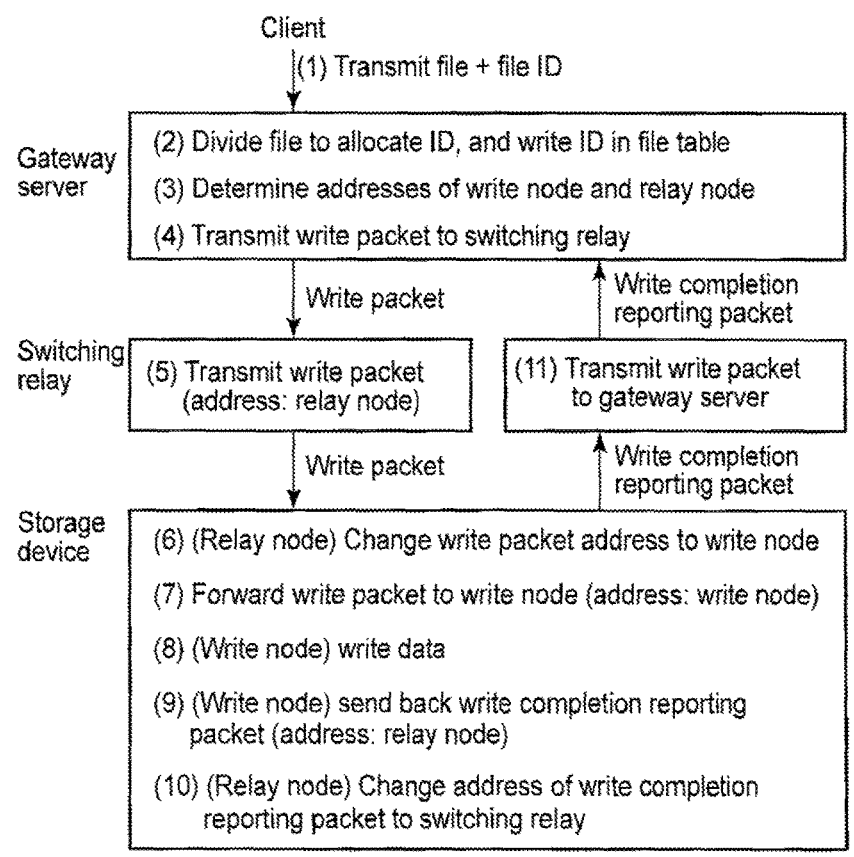
FIG. 29 is a view illustrating address information recorded in the header portion of the packet in the eighth embodiment.
FIG. 30 is a view illustrating a write operation in the storage system of the eighth embodiment.

FIG. 29 illustrates an example of the address information recorded in the header portion of the packet in the storage system in which the switching relay is used. As used herein, a final destination node and a source node means a memory node having the address to which the packet is finally delivered and a memory node that initially produces and transmits the packet, respectively. On the other hand, a temporary destination node address and a temporary source node address are addresses, which are used to determine the packet forwarding destination in each memory node and updated by the relay memory node connected to the switching relay (an update rule is described later).

An address type is used to determine whether the address is the address of the memory node In the storage device 10 or the address of the switching relay 81. A relay node address is an address of the memory node that is connected to the switching relay 81, and the packet should he forwarded through the relay node address.

As described above, the address information recorded in the header portion of the packet is updated in the memory nodes connected to the switching relay. In the case that the address information on the packet is illustrated in FIG. 29, for example, the update rule is as follows.

1. In the case that the final destination node is the memory node except the self-node while the source is the switching relay, the temporary destination is changed to the final destination node and the temporary source is changed to the self-node.

2. In the case that the final destination node is the switching relay, the temporary destination is changed to the switching relay and the temporary source is changed to the self-node.

3. In the case that the final destination is the memory node except the self-node while the source is also the memory node, both the temporary destination and the temporary source are not changed.

For example, the procedure in which the client writes the file in the storage device 10 in the storage system illustrated in FIG. 27 is as follow.

FIG. 30 is a view illustrating the write operation in the storage system Illustrated in FIG. 27.

The client transmits the file and the file ID to the gateway server 21A (see (1) of FIG. 30). The file ID is an identifier that can uniquely identify the The gateway server 21A divides the file into pieces of data having a defined size and allocates a division data ID to each divided piece of data. The gateway server 21A writes the file ID and the division data IDs in the file table. The division data ID is an identifier that can uniquely identify the divided data (see (2) of FIG. 30).

The gateway server 21A determines the address of the memory node (write node) in which the divided data is written based on the information on the division data ID (in FIG. 27, address (5,9)). Assuming that the relay memory node is the memory node closest to the write node in the memory nodes connected to the switching relay 81, the gateway server 21A calculates the address of the relay memory node (in FIG. 27, address (1,9)) (see (3) of FIG. 30).

The gateway server 21A produces the write packet in which the header portion including the address information is added to the write data. At this point, it is assumed that temporary destination address is the address of the relay node (in FIG. 27, address (1,9)), and if is assumed that the temporary source node address is the address of the switching relay 81 (in FIG. 27, [1]). Then the packet is transmitted to the switching relay 81 (see (4) of FIG. 30).

The switching relay 81 that receives the write packet transmits the write packet to the assigned temporary destination memory node (relay memory node (1,9)) (see (5) of FIG. 30).

The relay memory node that receives the write packet from the switching relay 81 reads the header portion of the packet. Because the final destination node is another memory node in the storage device 10, the relay memory node produces the write packet in which the header portion is updated as follows. In the header portion, the temporary source address is changed to the self-node address, and the temporary destination node address is changed to the address (in FIG. 27, (5,9)) of the write node that is the final destination (see (6) of FIG. 30).

Then the write packet is forwarded to the adjacent memory node. The write packet is repeatedly forwarded in the storage device 10, the write packet reaches the write node (in FIG. 27, memory node (5,9)) (see (7) of FIG. 30).

In the memory node in which the write packet is written, the addresses of the write data, packet source and the relay node of the received packet are written in a memory 16 of the self-node (see (8) of FIG. 30). Then the write completion reporting packet is produced and sent back to the gateway server 21A through the inverse route (see (9) of FIG. 30). In the write completion reporting packet, the final destination node of the address information of the header portion is set to the switching relay, the source is set to the write node, the relay node is set to the same memory node as the case in which the gateway server 21A forwards the packet to the write node, the temporary destination node is set to the relay node, and the temporary source node is set to the write node. As to the address information in the header portion of the packet, in the relay memory node, the temporary destination is updated to the switching relay, and the temporary source is updated to the relay node (see (10) of FIG. 30).

After all the divided pieces of data are written, the gateway server 21A performs the write completion reporting to the client.

Not only in the case that the client writes the file in the storage device 10, but also in the case that a read command, an erase command and a free space replay command are transmitted to the memory node of the storage device 10 in order to read or erase the written data or to confirm the free space, the packet can be forwarded through the memory node connected to the switching relay 81 according to the above procedure. In the case that command execution completion report of the write and erase operations and the data read from the memory node are transmitted from the memory node to the gateway server 21A, similarly the packet can be forwarded through the memory node connected to the switching relay 81 according to the above procedure. Therefore, the forwarding time can be shortened.

The storage system in which only the memory nodes at the left end are connected to the switching relay 81 as illustrated in FIG. 27 is described above. As illustrated in FIG. 31, in a storage system in which the memory nodes in the whole outer peripheral portion are connected to switching relays 81, 82, 83, and 84, the number of packet forwarding times can be decreased to shorten the packet forwarding time compared with the storage system in which the switching relay Is not introduced. In the storage system illustrated in FIG. 31, the switching relay 81 is connected to the memory nodes disposed at the left end of the storage device, the switching relay 82 is connected to the memory nodes disposed at the upper end, the switching relay 83 is connected to the memory nodes disposed at the right end, and the switching relay 84 is connected to the memory nodes disposed at the lower end. All the switching relays are connected to the gateway server 21A through the adapter 22A.

Figure 32:
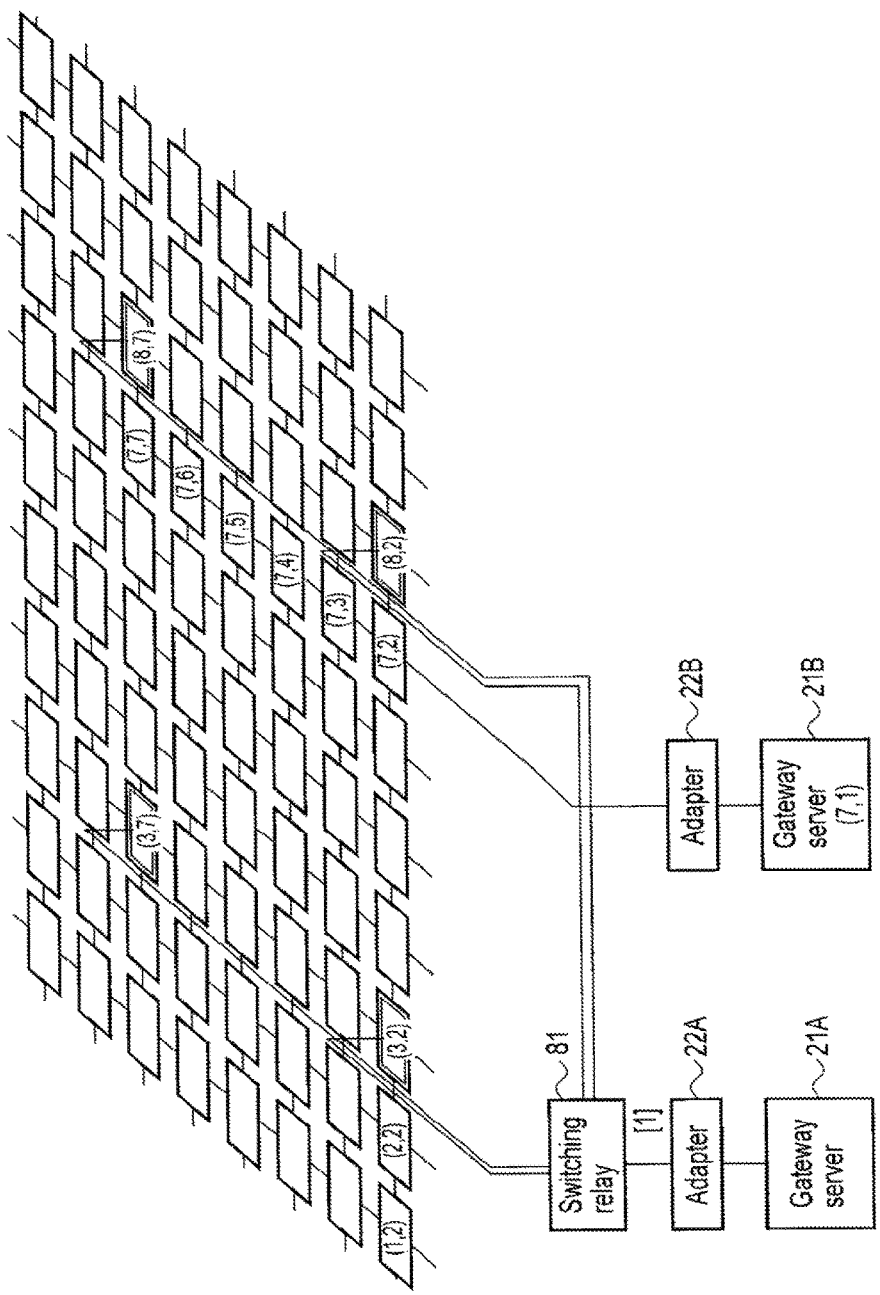

As illustrated in FIG. 32, in the storage system including the storage device in which the memory nodes including the input/output ports (non-adjacent ports) except the input/output port connected to the adjacent node are connected to the switching relay 81 by the non-adjacent ports, the average number of packet forwarding times can be decreased to shorten the packet forwarding time compared with the storage system in which the switching relay is not introduced. In the storage system illustrated in FIG. 32, the switching relay 81 is connected to the memory nodes (3,2), (3,7), (8,2), and (8,7) in the storage device 10.

As described above, in the case that the packet is forwarded through the memory node connected to the switching relay, it is necessary that the memory node be selected as the relay memory node such that the packet forwarding time (the number of forwarding times) becomes the minimum. The method for calculating the address of the relay memory node will be described below.

As illustrated in FIG. 27, in the case that the data is forwarded between the gateway server 2IA and the storage device 10 in which all the memory nodes at the left end are connected to the switching relay 81, the memory node having the address (l,y) is the memory node, which is connected to the switching relay 81 and in which the packet forwarding distance (the number of forwarding times) becomes the minimum, with respect to the packet destination/source memory node of the address (x,y) in the storage device 10.

The storage device includes the array in which c0 memory nodes are horizontally disposed while d0 memory nodes are vertically disposed, and the memory node disposed at a corner has the address (a0, b0). In this case, in the case that all the memory nodes in the outer peripheral portion are connected to the switching relay, when the memory node having the address (x,y) in the storage device 10 performs the packet forwarding with the gateway server 21A, the address of the relay memory node in which the packet forwarding time (the number of forwarding times) becomes the minimum is as follows. At this point, as illustrated in FIG. 31, the address of the memory node connected to the switching relay is expressed by (a0, y), (a0+c0, y), (x ,b0), and (x, b0+d0) (x is any integer of a0 to a0+c0 and y is any integer of b0 to b0+d0).

(x-a0, y) in the case of min (x-a0, a0+c0-x)≤min (y-b0, b0+d0-y) and min (x-a0, a0+c0-x)=x-a0;

(a0+c0-x,y) in the case of min (x-a0, a0+c0-x)≤min (y-b0, b0+d0-y) and min (x-a0, a0+c0-x)=a0+c0-x;

(x, y-b0); in the case of min (x-a0, a0+c0-x)≤min (y-b0, b0+d0-y) and min (y-b0, b0+d0-y)=y-b0; and (x, b0+d0-y) in the case of min (x-a0, a0+c0-x)≤min (y-b0, b0+d0-y) and min (y-b0, b0+d0-y)=b0+d0-y.

Where min (x, y) is a function that gives a smaller one of two arguments x and y.

On the other hand, as illustrated in FIG. 32, in the case that the address of the memory node connected to the switching relay 81 is given by an integer (am+b, cn+d) (m and n are integers) (in FIG. 32, a=5, b=3, c=5, d=2, m=0 or 1, and n=0 or 1), the memory node (relay memory node), which is connected to the switching relay 81 and in which the packet forwarding time (the number of forwarding times) becomes the minimum, with respect to any memory node (address (x,y)) is given by (a (round (x/a, 0)+b, c (round (y/c, 0)+d). Where round (u, 0) is a function that rounds off a numerical value u to the nearest Integer.

As described above, according to the eighth embodiment, the number of packet forwarding times can be decreased between the memory nodes in the storage device. Other configurations and effects are similar to those of the first embodiment.

[Ninth Embodiment]

A storage system according to a ninth embodiment includes a data processing procedure to select the memory node having a data forwarding time different from that of a gateway server as a storage destination of each of a plurality of pieces of data in data processing of storing the data in memory nodes.

[1] Configuration of Storage System

Figure 33A:
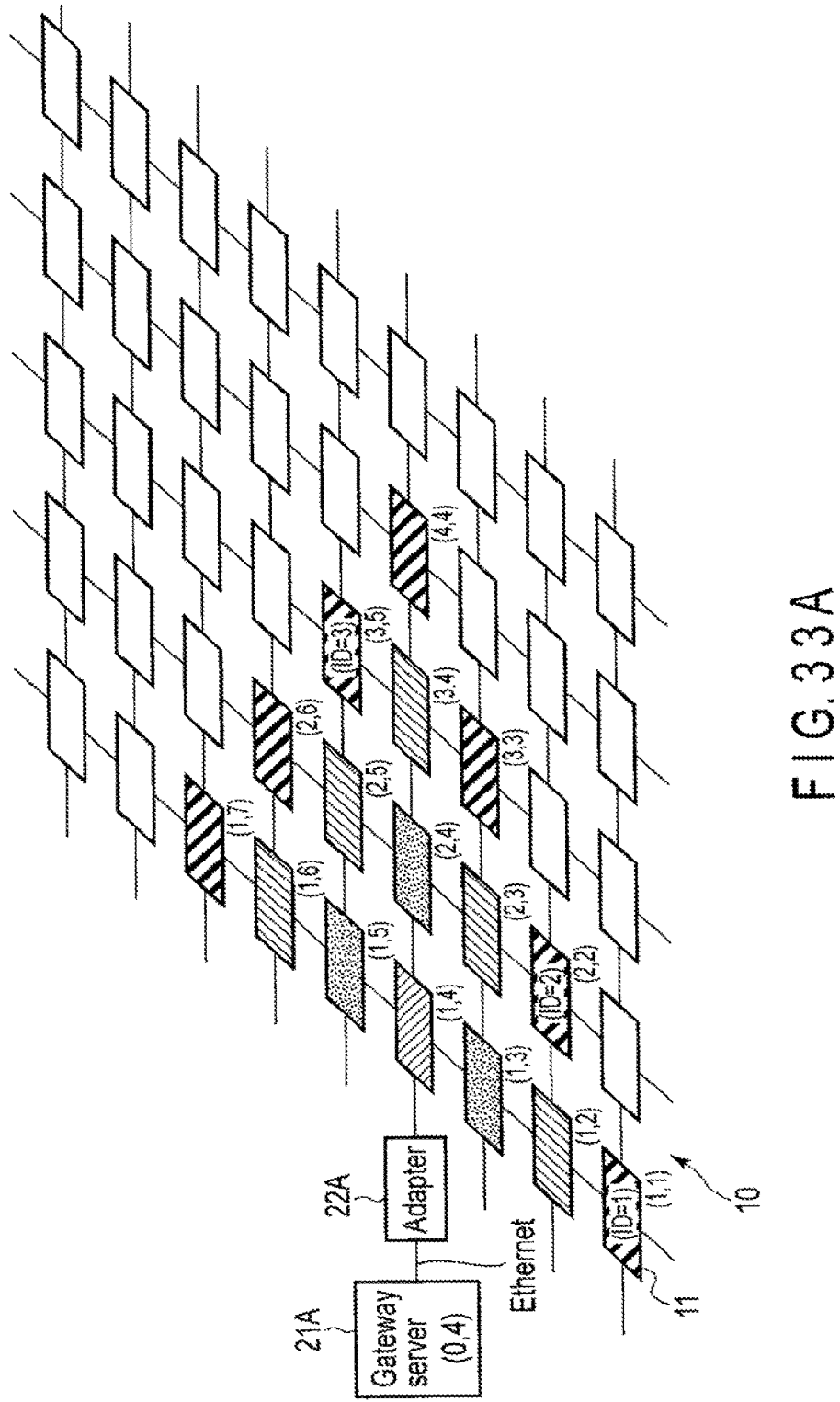
FIG. 33A is a view illustrating a configuration of a storage system according to a ninth embodiment.

FIG. 33A is a view illustrating a configuration of the storage device of the ninth embodiment.

As illustrated in FIG. 33A, the storage system includes a storage device 10 that includes memory nodes 11 and gateway servers 21A that are connected to the storage device 10. The storage device 10 has the configuration in which the data-forwarding-function-equipped memory nodes are mutually connected as illustrated in FIG. 1. The gateway servers 21A are connected to a memory node (1,4) disposed in the outer peripheral portion of the storage device 10 through an adapter 22A.

[2] Data Processing Method of Storage System

A data processing procedure in the storage system of the ninth embodiment will be described.

FIGS. 33A to 33D and FIGS. 34A to 34E illustrate a storage system in which the storage device 10 is connected to the gateway servers 21A through the adapter 22A. The storage device includes the memory nodes 11 in which the adjacent memory nodes are mutually connected.

Each memory node 11 receives the packet when the packet is addressed to the self-node, and the memory node 11 forwards the packet to the adjacent memory node when the packet is addressed to another memory node. The packet communication can be conducted between the gateway server 21A and the assigned memory node by the data forwarding function.

However, the number of forwarding times necessary for the packet forwarding depends on the memory node. For example, the minimum number of forwarding times necessary for the packet communication with the gateway server 21A is 0 with respect to the memory node having an address (1,4), the minimum, number of forwarding times is 1 with respect to the memory nodes having addresses (1,5), (2,4), and (1,3), and the minimum number of forwarding times is 2 with respect to the memory nodes having addresses (1,6), (2,5), (3,4), (2,3), and (1,2). In FIGS. 33A to 33D and FIGS. 34A to 34E, the memory nodes having the same minimum number of forwarding times are expressed by the same hatching.

At this point, it is assumed that a packet forwarding time in the memory node of the storage device 10 and the packet transmission time between the memory nodes are kept constant irrespective of the memory node. In this case, a total packet forwarding time is identical anywhere in the memory nodes. The packet forwarding time means a time until a determination whether the packet is addressed to the self-node is made from the address recorded in the header portion of the packet to output the packet from the output port after the packet is received by the input port. The total packet forwarding time means a time until the packet transmitted to the adjacent node reaches the adjacent node since the memory node receives the packet.

One file is divided into three, and the three pieces of data to which ID=1, ID=2, and ID=3 are provided according to the order of the data after the division are stored in three memory nodes, respectively. The data processing in which the three pieces of data are read from the memory node and transmitted to the gateway server is discussed.

The read data forwarding processes in the storage device are compared with respect to the case that the three memory nodes in which the pieces of data are stored are memory nodes in which the minimum numbers of forwarding times necessary for the packet communication with the gateway server become identical and the case that the three memory nodes in which the pieces of data are stored are memory nodes in which the minimum numbers of forwarding times necessary for the packet communication with the gateway server differ from one another. It is assumed that the read command is simultaneously issued, and it is assumed that the transmission of the read data is simultaneously started, and therefore it is assumed that the three pieces of data are simultaneously forwarded, FIGS. 33A to 33D illustrate an example of a process, in which the three pieces of data stored in memory nodes (1,1), (2,2), and (3,5) in which the minimum number of forwarding times necessary for the packet communication with the gateway server 21A is 3 is forwarded to the gateway server 21A after the three pieces of data read from the memory nodes.

Figure 33B:
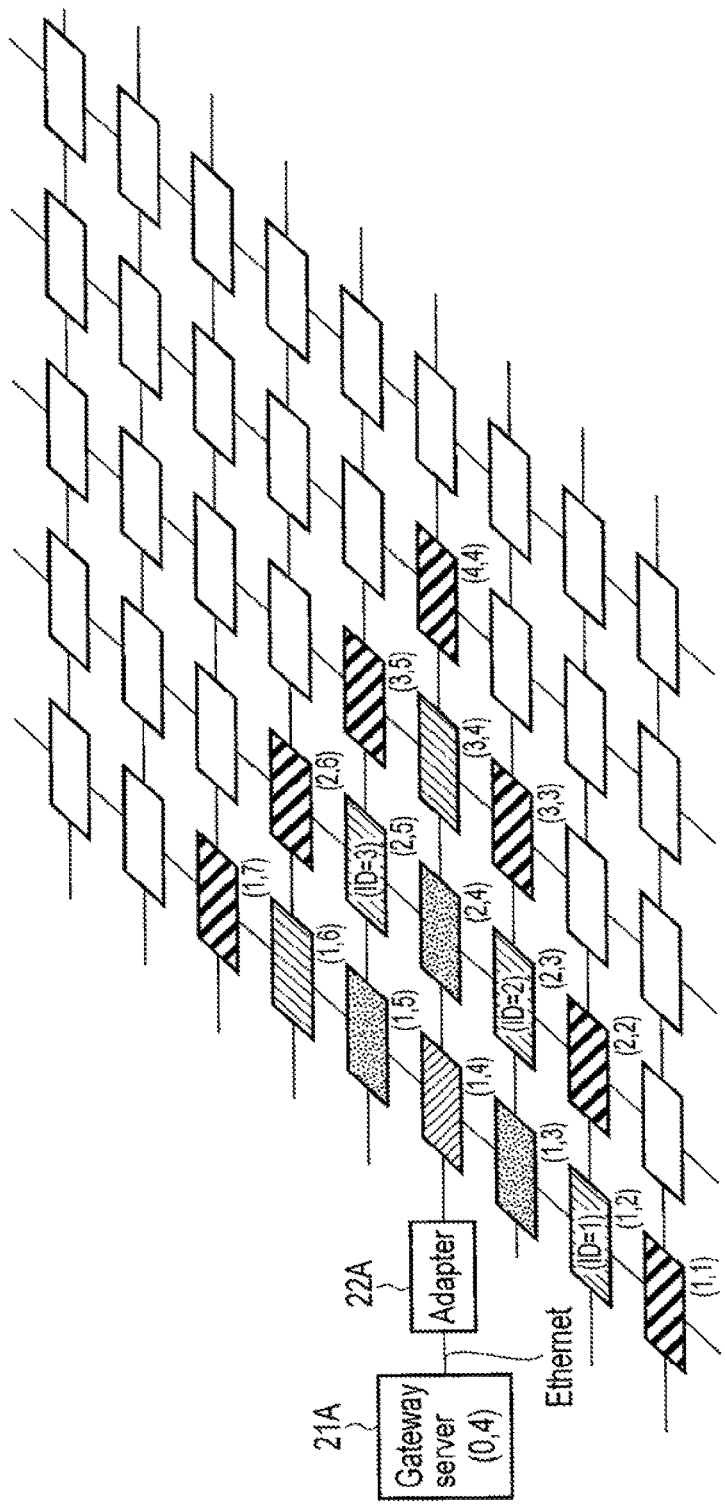

FIG. 33A illustrates the state of the storage device 10 immediately after the data is read from the memory in each memory node (before the forwarding), and FIG. 33B illustrates the state in which all the three pieces of data are forwarded to the adjacent node of the memory node in which the data is stored after a given time elapses from the state of FIG. 33A. As illustrated in FIG. 33B, the three pieces of data stored in the memory nodes (1,1), (2,2), and (3,5) in the state of FIG. 33A are forwarded to memory nodes (1,2), (2,3), and (2,5), respectively.

Figure 33C:
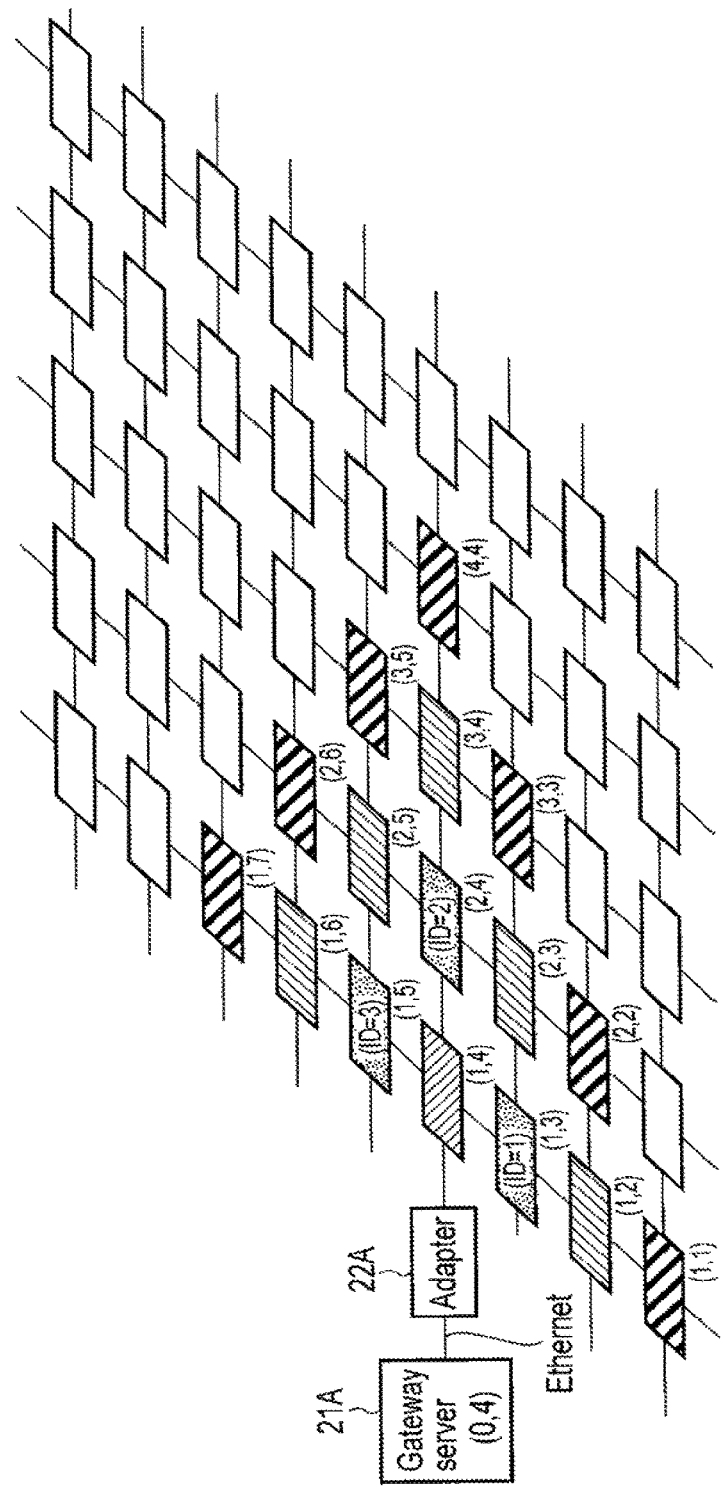

FIGS. 33C and 33D illustrate the state in which each piece of data is forwarded twice and triple. As illustrated in FIG. 33O, the three pieces of data stored in the memory nodes (1,2), (2,3), and (2,5) in the state of FIG. 33B are forwarded to memory nodes (1,3), (2,4), and (1,5), respectively. As illustrated in FIG. 33D, the three pieces of data stored in the memory nodes (1,3), (2,4), and (1,5) in the state of FIG. 33C are forwarded to memory node (1,4). In the process illustrated in FIGS. 33A to 33D, because the data is forwarded from the memory node in which the data is stored toward the gateway server 21A, the pieces of data are forwarded to the memory node having the smaller minimum number of forwarding times necessary for the packet communication with the gateway server 21A as time advances.

In the storage device 10 Illustrated in FIGS. 33A to 33C, the three pieces of data exist separately in the memory nodes. On the other hand, in the storage device 10 illustrated in FIG. 33D, all the pieces of data are located on the memory node having the address (1,4). This expresses the state in which the three pieces of data simultaneously reaches the memory node having the address (1,4).

In the case that a storage capacity size of the temporarily storing memory (input port buffer) of the memory node is not as large as an extent in which the plurality of pieces of data can be stored, only one piece of data can be received once by the memory node (1,4). The temporarily storing memory is a memory in which the data is stored until the data is forwarded in the case that the temporarily storing memory receives the data that is not addressed to the self-node.

In this case, until the received one piece of data is forwarded to the adapter 22A, other pieces of data cannot be forwarded to the memory node having the address (1,4), and it is necessary for other pieces of data to wait in the adjacent nodes.

Even if the temporarily storing memory of the memory node has the sufficiently large storage capacity size to be able to temporarily store the three pieces of data at the same time, because usually the three pieces of data cannot simultaneously be transmitted from the memory node having the address (1,4) to the gateway server 21A, it is necessary for other pieces of data to wait in the memory node having the address (1,4) until one piece of data is transmitted to the gateway server 21A. When the waiting of the data forwarding is generated, the time necessary to forward all the pieces of data is increased.

As can be seen from FIGS. 33A to 33D, the number of memory nodes in which the minimum numbers of forwarding times necessary for the packet communication with the gateway server 21A become Identical is decreased with decreasing number of forwarding times. Accordingly, as illustrated in FIG. 33A, the plurality of pieces of data are stored in the different memory nodes in which the minimum numbers of forwarding times necessary for the packet communication with the gateway server 21A become identical, and the plurality of pieces of data are simultaneously read to start the forwarding. In this case, as the data is closer to the gateway server 21A with time, the number of memory nodes of the forwarding destinations is decreased to Increase a probability that the plurality of pieces of data are simultaneously forwarded to the same memory node. When the plurality of pieces of data are stored in the memory nodes in which the minimum numbers of forwarding times necessary for the packet communication with the gateway server 21A become identical, the unnecessary waiting time is easily generated when the forwarding is performed after the data is read.

A data processing procedure to decrease the waiting time during the forwarding will be described with reference to FIGS. 34A to 34E, FIG. 35A, and FIG. 35B.

FIGS. 34A to 34E are views illustrating an example of a process of forwarding the data read from the memory node toward the gateway server 21A. FIGS. 34A to 34E illustrate the process in which, after the data of ID=2 is stored in the memory node (1,5) in which the minimum number of forwarding times necessary for the packet communication with the gateway server 21A is 1,after the data of ID=1 is stored in the memory node (1,2) in which the minimum number of forwarding times is 2, after the data of ID=3 is stored in the memory node (4,4) in which the minimum number of forwarding times is 3, the pieces of data are simultaneously read and forwarded to the gateway server 21A.

In this case, the pieces of data are forwarded to the memory node having the smaller minimum number of forwarding times necessary for the packet communication with the gateway server 21A. However, in the case of FIGS. 34A to 34E, the forwarding of the plurality of pieces of data to the same memory node is not generated in the whole process unlike the case of FIG. 33D. This is because the pieces of data are stored in the memory nodes having the different minimum numbers of forwarding times necessary for the packet communication with the gateway server 21A. In this case, although the pieces of data are also forwarded to the memory node having the smaller minimum number of forwarding times, because the forwarding of all the pieces of data is started from the memory node having the different minimum number of forwarding times, each piece of data is located in the memory node having the different minimum number of forwarding times anytime.

The pieces of data are stored in the memory nodes having the different minimum numbers of forwarding times necessary for the packet communication with the gateway server 21A. Therefore, the simultaneous forwarding of the plurality of pieces of data to the same memory node is avoided when the read data is forwarded, which allows the data forwarding time to be shortened.

Figure 34A:
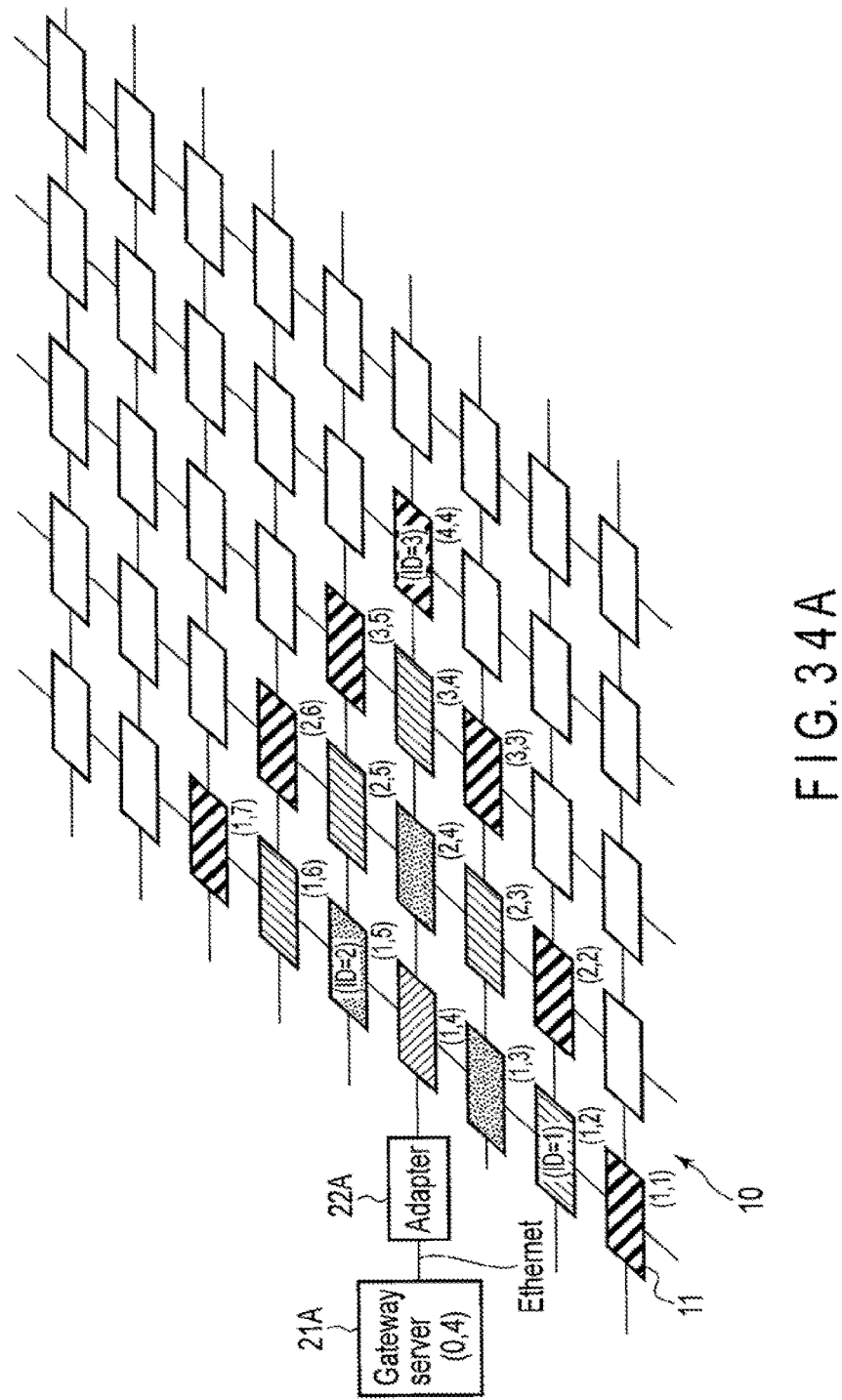
FIGS. 34A, 34B, 34C, 34D and 34E are views illustrating a read operation in which generation of the forwarding waiting is avoided in the storage system of the ninth embodiment.
Figure 34B:
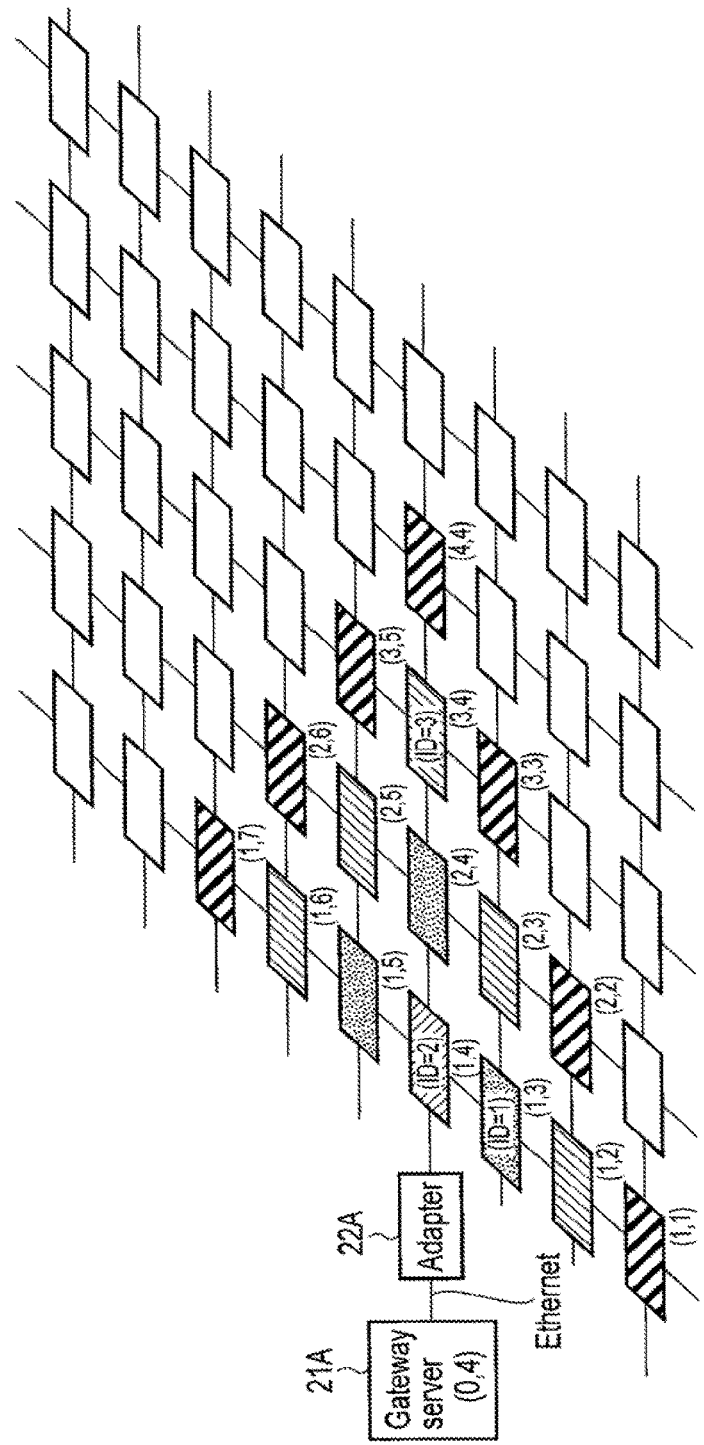
Figure 34C:
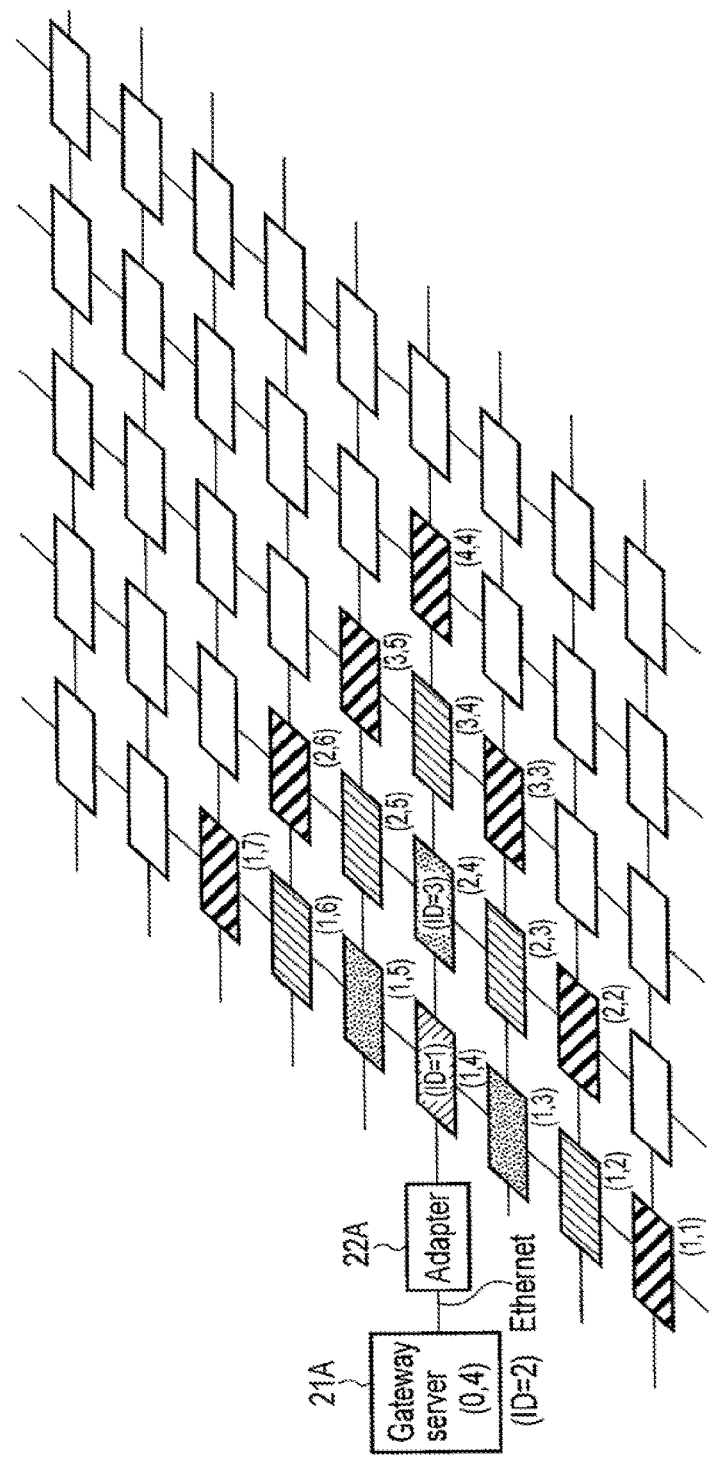
Figure 34D:
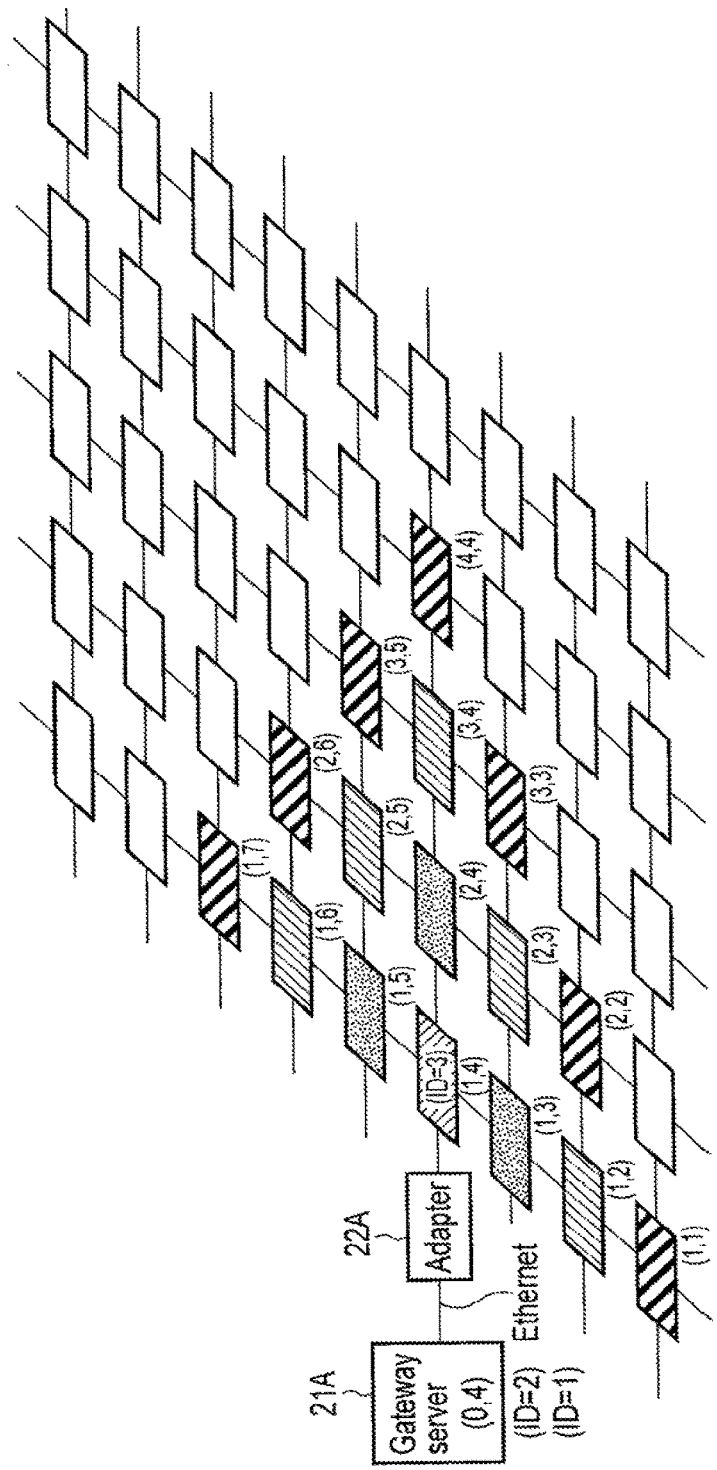
Figure 34E:
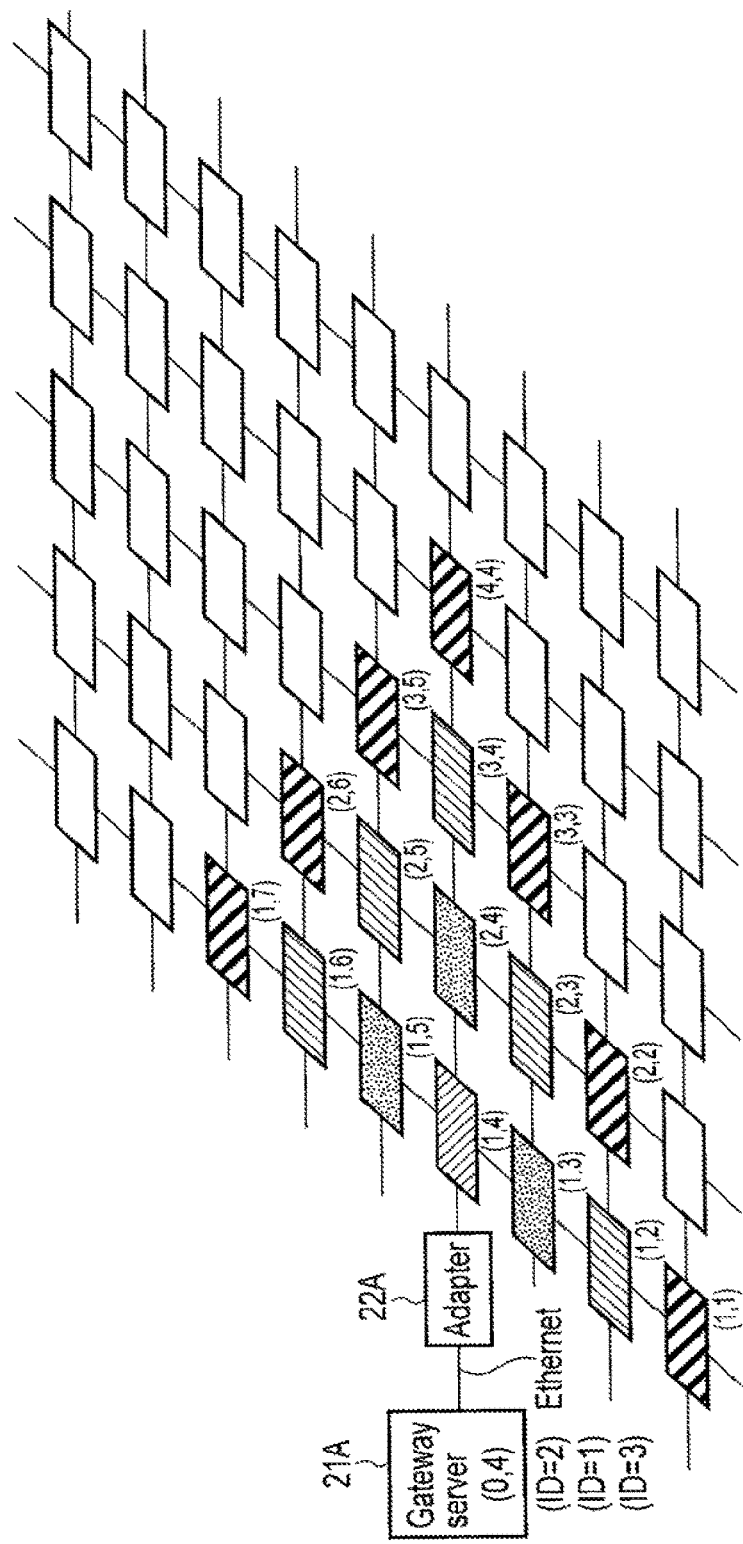

In the case that the pieces of data stored in the memory nodes having the different minimum numbers of forwarding times necessary for the packet communication with the gateway server are read and forwarded to the gateway server, the pieces of data reach the gateway server in the order in which the memory node in which the data is stored is closer to the gateway server. In FIG. 34A, the data of ID=2 is stored in the memory node that is closest to the gateway server 21A, the data of ID=1 is stored in the memory node that is second closest to the gateway server 21A, and the data of ID=3 is stored in the memory node that is farthest from the gateway server 21A. Therefore, the pieces of data read and forwarded from the memory nodes reach the gateway server 21A in the order of the data of ID=2, the data of ID=1, and the data of ID=3 as illustrated in FIGS. 34C to 34E.

As described above, the pieces of data are obtained by dividing the one file into three, and ID=1, ID=2, and ID=3 are provided according to the order of the pieces of data after the division. Therefore, in order to reconstruct the file from the divided pieces of data, it is necessary that the pieces of data that reach the gateway server 21A are replaced in the order of the ID.

On the other hand, in FIG. 35A, the data of ID=1 is stored in the memory node in which the minimum number of forwarding time necessary for the packet communication with the gateway server 21A is 1, the data of ID=2 is stored in the memory node in which the minimum number of forwarding times is 2, and the data of ID=3 is stored in the memory node in which the minimum number of forwarding times is 3. Therefore, when the pieces of data are read and forwarded from the memory nodes, the pieces of data reach the gateway server 21A in the order of the data of ID=1, the data of ID=2, and the data of ID=3 as illustrated in FIG. 35B. Accordingly, it is not necessary to replace the pieces of data in reconstructing the file.

In the case that the plurality of pieces of data in which the data reading order has the meaning are stored in the memory nodes having the different minimum numbers of forwarding times necessary for the packet communication with the gateway server, the pieces of data are stored in the order from the memory node closer to the gateway server to the memory node farther from the gateway server. Therefore, work that replaces the pieces of data forwarded to the gateway server 21A can foe eliminated.

Figure 36A:
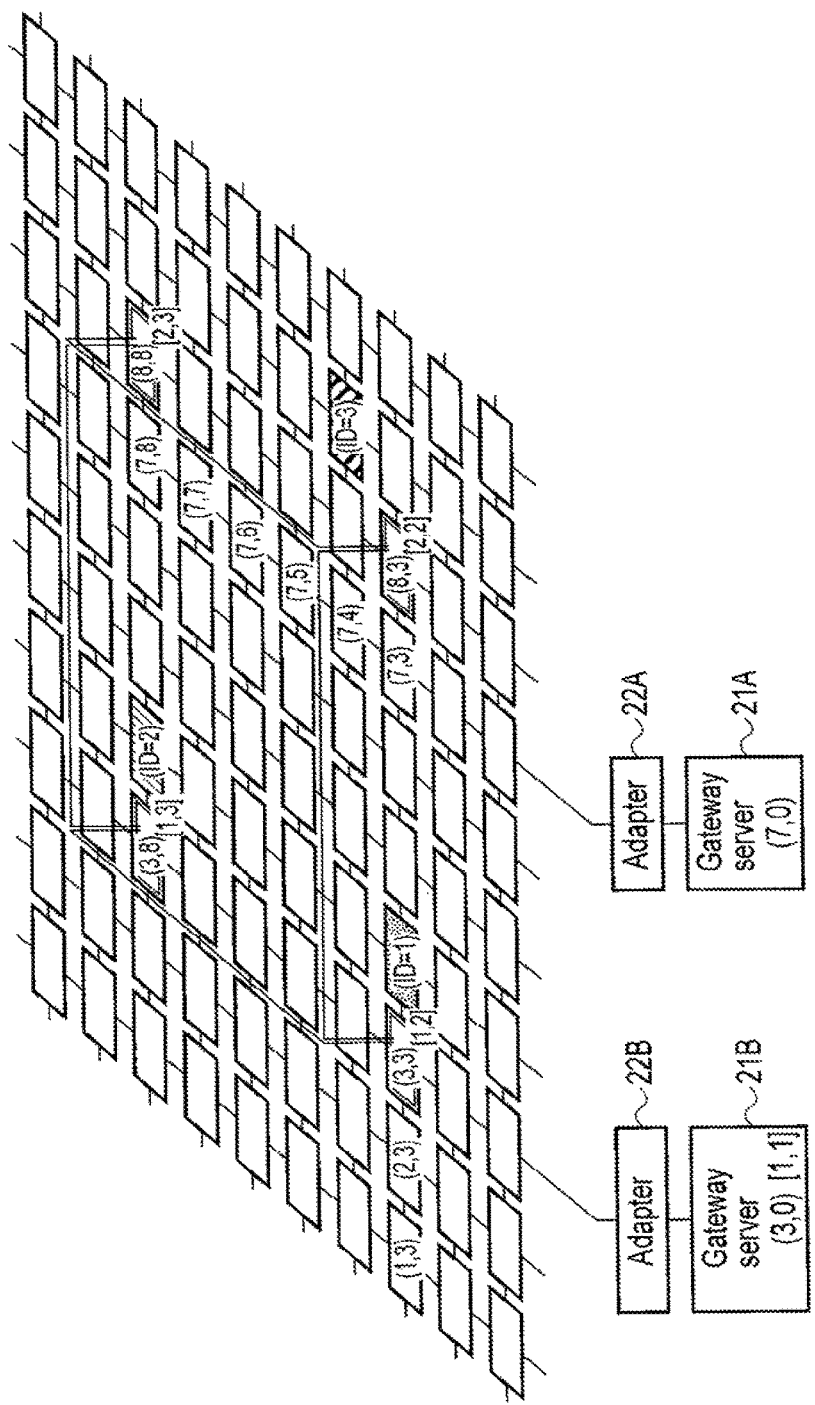

The procedure to store the plurality of pieces of data in the storage device is described above in the storage system in which the single memory node and the gateway server of the storage device including the memory nodes equivalent to one another are connected through the adapter. As illustrated in FIG. 36A, in the storage device that includes an input/output port (non-adjacent port) except the input/output port connected to the adjacent node and memory nodes that are mutually connected by the non-adjacent ports, the pieces of data are stored in the memory nodes having the different minimum numbers of forwarding times necessary for; the packet communication with the gateway server 21B, which allows the generation of the unnecessary waiting time to be avoided when the stored data is forwarded.

Figure 36B:
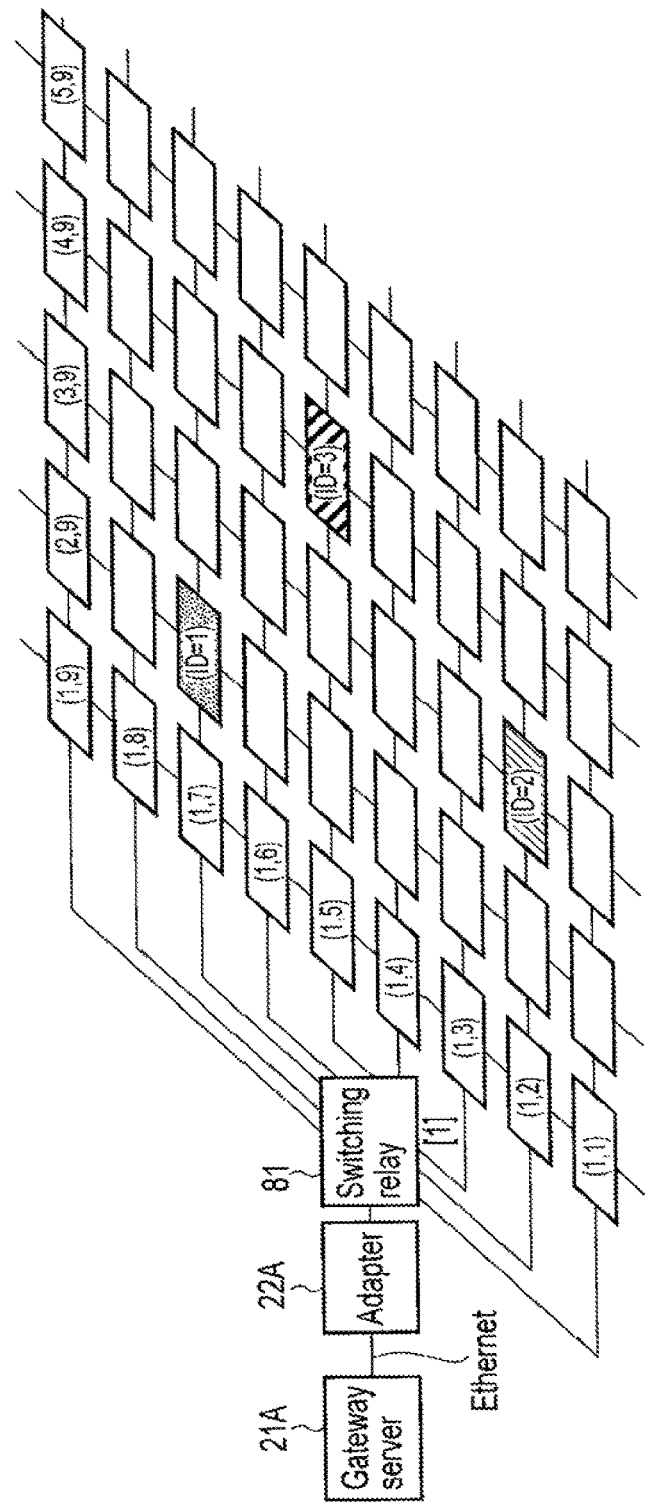
Figure 36D:
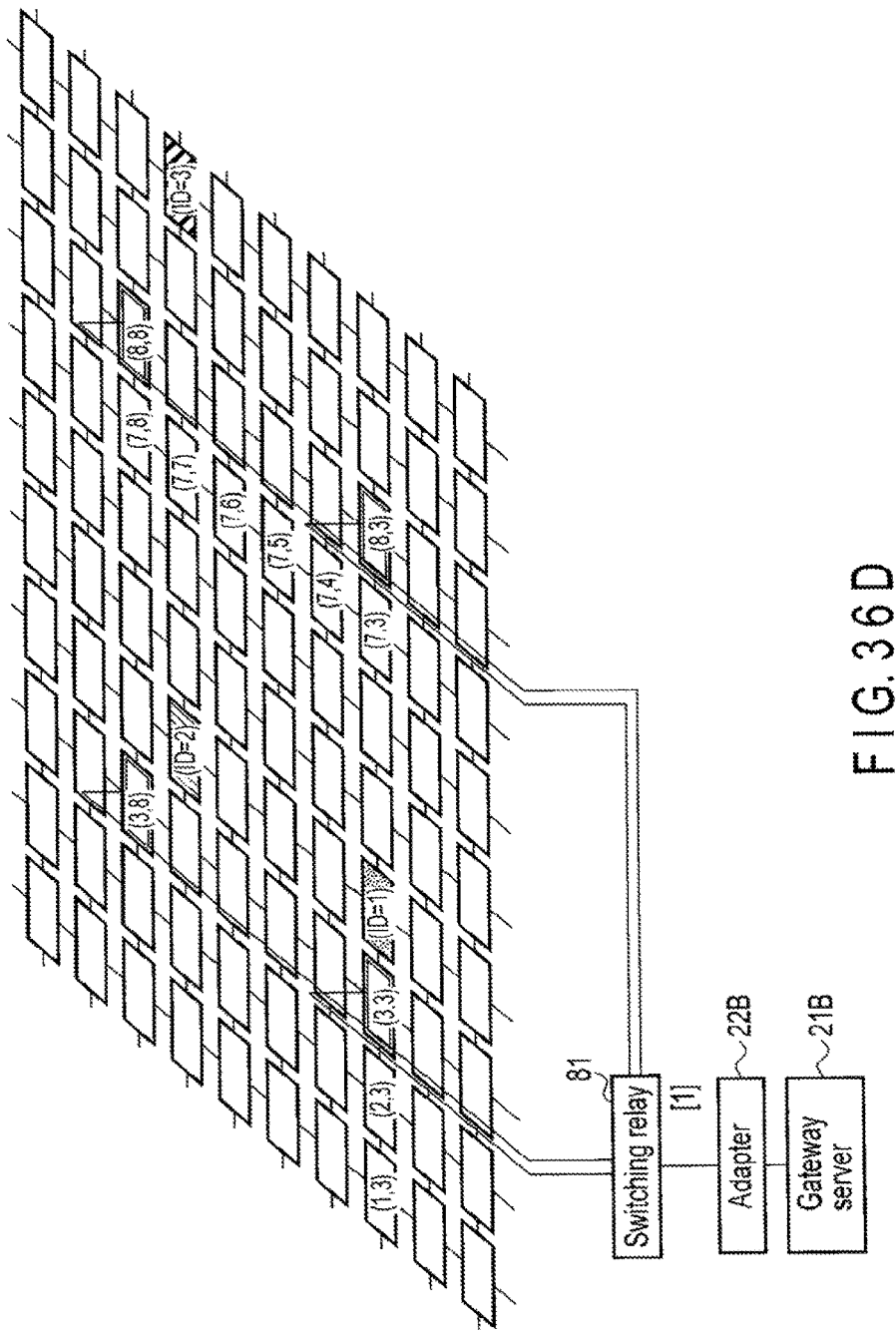

As illustrated in FIGS. 36B to 36D, in the case that the storage device 10 and the gateway server 21A are connected through the switching relay, the pieces of data are stored in the memory nodes having the different minimum numbers of forwarding times necessary for the packet communication with the gateway server 21A, which allows the generation of the unnecessary waiting time to be avoided when the stored data is forwarded. FIGS. 36A to 36D illustrate examples in which the pieces of data of ID=1, ID=2, and ID=3 are stored in the memory nodes in which the minimum numbers of forwarding times necessary for the packet communication is 1, 2,and 3,respectively.

As described above, there is the method (consistent hashing) for determining the address of the memory node in which the packet data is stored from the hash values of the address of the memory node and the packet ID. For example, in consideration of an ID space having integral values of 0 to $2^{160}-1$, the cryptological hash function SHA-1 is calculated (the calculation result becomes one of the integral values of 0 to $2^{160}-1$) with respect to the memory node and the packet with the address as the former and with the packet ID as the latter. Therefore, the memory node and the packet are allocated to each ID in the ID space. The ID space is traced clockwise from the ID of the hash value with respect to each packet, and the memory node initially confronted is determined to be the memory node in which the packet is stored.

The consistent hashing method has the advantages that not only the packets can be distributed and stored in memory node with high uniformity, but also the number of packets that needs to be change is decreased even if the number of memory nodes is increased or decreased (that is, the memory node has high scalability). However, when the memory node in which the packet is stored is determined by the consistent hashing method, possibly the packet is stored in the memory node having the same numbers of forwarding times necessary for the packet communication with the gateway server (as described above, the packets collide with each other when the data is read).

In order to uniformly distribute and store the N packets in the memory nodes having the different numbers of forwarding times necessary for the packet communication with the gateway server, for example, the hash value mod N of the packet ID is calculated (mod is a function of returning a remainder of division) to determine the number of forwarding times of the memory node in which the packet is stored (one of 0 to (N−1) (as a result of the calculation, when the packets in which the numbers of forwarding times are matched with each other exist, the adjustment is made such that the numbers of forwarding times have different values). For each packet, the memory node in which the packet is stored may be determined from the memory nodes having the fixed numbers of forwarding times toy the consistent hashing method.

In the procedure to determine the memory node in which the packet is stored, it is necessary to understand the addresses of the memory nodes having the fixed numbers of forwarding times. The memory node having a certain number of forwarding times is expressed as follows.

As illustrated in FIGS. 33A to 35B, in the storage system in which the gateway server 21A is connected to a memory node (1, a0) located at an end of the storage device (at this point, it is assumed that the address of the memory node is a positive integral value) through the adapter 22, in the case that the packet communication is conducted with the memory node (1, a0), the address of the memory node in which the minimum number of forwarding times is n is expressed by (1+b, a0+(n−b)) (n≥b≥0) and (1+c, a0−(n−c)) (a0−1≥n−c≥0).

As illustrated in FIGS. 36A and 36D, in the storage device (it is assumed that the address of the memory node is a positive Integral value) in which the non-adjacent memory nodes or the memory node and the switching relay are connected by the expansion port (non-adjacent port), in the case that the packet communication is conducted with the node (a0, b0) including the expansion port, the address of the memory node in which the minimum number of forwarding times is n is expressed by (a0+c, b0+(n−c)) (n≥c≥0), (a0+d, b0−(n−d)) (n≥d≥0 and b0−1≥n−d), (a0−e,b0+(n−e)) (min (a0−1,n)≥e≥0), (a0−f, b0−(n−f)) (a0−1≥f≥0 and b0−1≥n−f≥0).

As illustrated in FIG. 36B, in the storage system in which the memory node at the left end (address (1,y)) of the storage device (it is assumed that the address of all the memory nodes is a positive integral value) is connected to the switching relay, in the case that the packet communication is conducted with the relay memory node having the address (1, a0), the address of the memory node in which the minimum number of forwarding times is n is expressed by (1, a0+n).

In the above description, the storage system includes the storage device in which the memory nodes having the same data forwarding time are mutually connected. The ninth embodiment can be applied to the storage system, such as a storage system in which the memory nodes having the same data forwarding time are connected in the tree shape as illustrated in FIG. 36E and a storage system including the memory nodes having the different data forwarding times as illustrated in FIG. 36F, which includes the storage device in which the memory nodes having the data communication times different from those of the server exist.

Figure 38A:
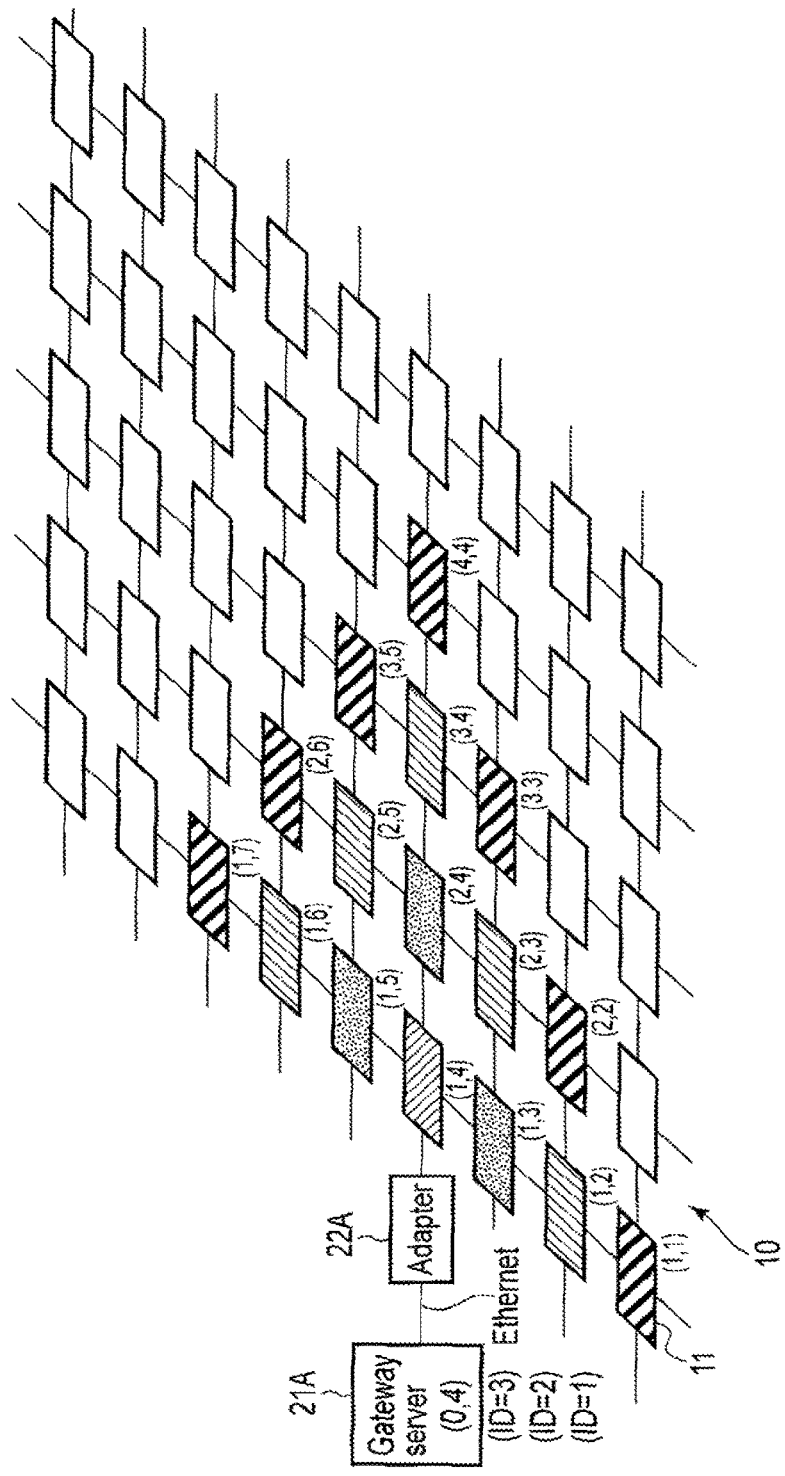

In the storage system illustrated in FIG. 36E, the memory nodes having the same data forwarding time are connected in the tree structure, and the memory node having the same communication time as the gateway server 21A is expressed by the same hatching. In the storage system illustrated in FIG. 38F, the data communication speed between the memory nodes is equal to the data communication speed between the memory node and the switching relay. The data communication speed between the memory nodes of the addresses (α, δ), (β, γ), and (β, ε) and the data communication speed between the memory nodes and the switching relay 81 are double the data communication speed between the memory nodes of addresses (a, l), (a,m), (a,n), (b, l), (b,m), and (b,n) and the data communication speed between the memory nodes and a switching relay 81. The data excommunication speed between the address (A,B) and the switching relay 81 is four times the data communication speed between the memory nodes of addresses (a,l), (a,m), (,n), (b, l), (b, m), and (b,n) and the data communication speed between the memory nodes and a switching relay 81. The memory node having the same data forwarding time as the switching relay 81 is expressed by the same hatching. However, it is assumed that the data forwarding time in the memory node is sufficiently smaller than the data forwarding time between the memory nodes and the data forwarding time between the switching relay and the memory node.

As described above, according to the ninth embodiment, the forwarding time can be shortened when the data is transmitted to the gateway server after the data stored in each of the memory nodes is read from, the memory node. Therefore, the data can be read at high speed. Other configurations and effects are similar to those of the first embodiment.

[Tenth Embodiment]

A storage system according to a tenth embodiment includes a data processing procedure to perform the data forwarding in order from data addressed to the memory node having the longer data communication time to data addressed to the memory node having the shorter data communication time in data processing of transmitting a plurality of pieces of data from a gateway server to memory nodes.

[1] Configuration of Storage System

Figure 37A:
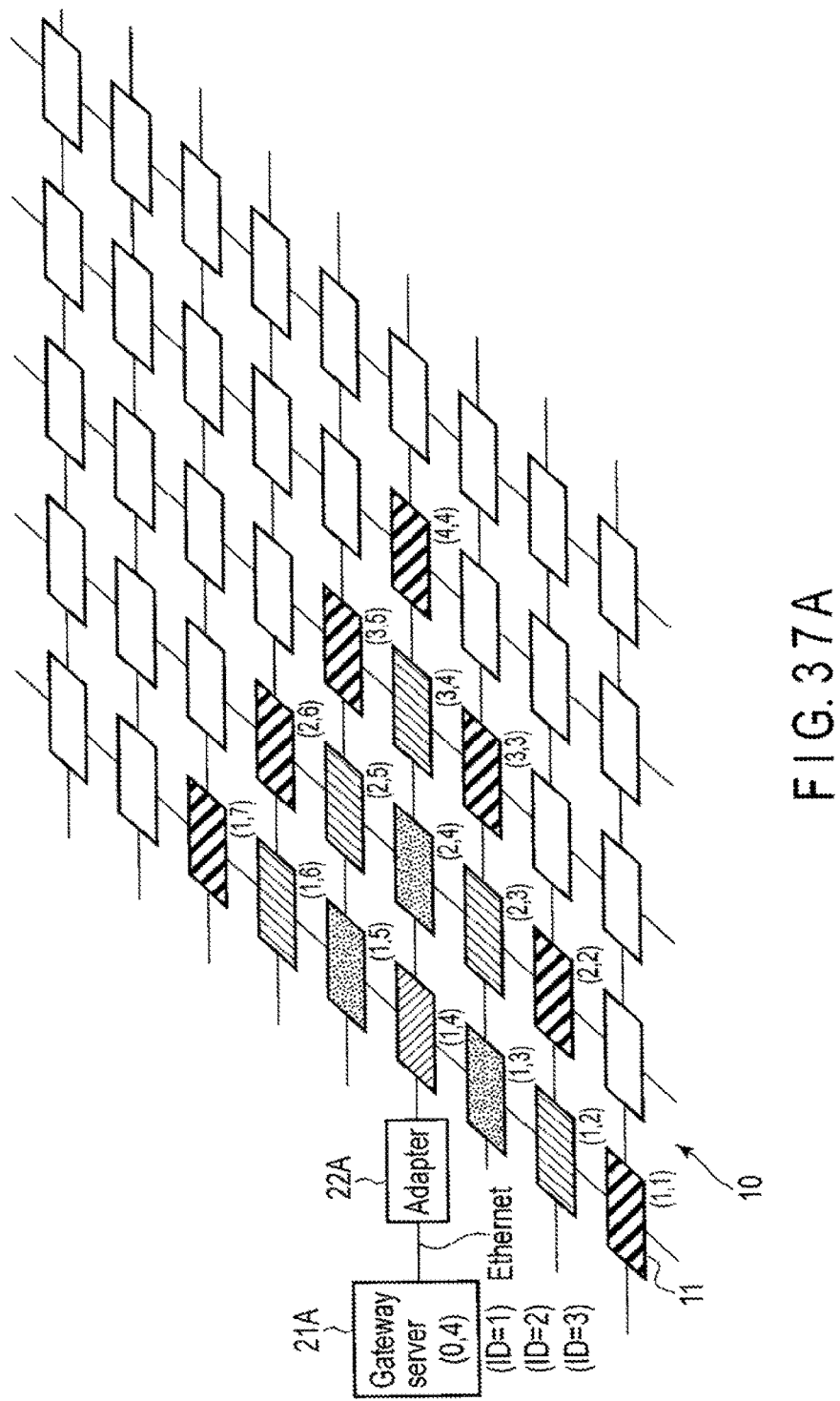
FIG. 37A is a view illustrating a configuration of a storage system according to a tenth embodiment.

FIG. 37A is a view illustrating a configuration of the storage system of the tenth embodiment.

As illustrated In FIG. 37A, the storage system includes a storage device 10 that includes memory nodes 11 and gateway servers 21A that are connected to the storage device 10. The storage device 10 has the configuration in which the data-forwarding-function-equipped memory nodes are mutually connected as illustrated in FIG. 1. The gateway servers 21A are connected to a memory node (1,4) disposed in the outer peripheral portion of the storage device 10 through an adapter 22A.

[2] Data Processing Method of Storage System

The data processing procedure in the storage system, of the tenth embodiment will be described.

FIGS. 37A to 37G and FIGS. 38A to 38B illustrate the storage system in which the storage device is connected to the gateway servers 21A through the adapter 22A similarly to the ninth embodiment. The storage device includes the memory nodes in which the adjacent memory nodes 11 are mutually connected.

A relationship between order of the data transmitted from gateway server 21A and a time necessary to transmit all pieces of data in the case that three pieces of data ID=1, ID=2, and ID=3 are transmitted from the gateway server 21A to the memory nodes having addresses (1,5), (1,2), and (4,4), respectively, will be discussed. It is assumed that only one packet can be stored in a temporarily storing memory (input port buffer) of the memory node, and it is assumed that only one packet can be transmitted once front the gateway server 21A to the memory node having the address (1,4).

FIGS. 37A to 37G illustrate the packet forwarding process in the case that the packet is transmitted from the gateway server 21A to the storage device in the order from data addressed to the memory node closest to the gateway server 21A to data addressed to the memory node farthest from the gateway server 21A (that is, in the order of the data of ID=1, the data of ID=2, and the data of ID=3).

Figure 37C:
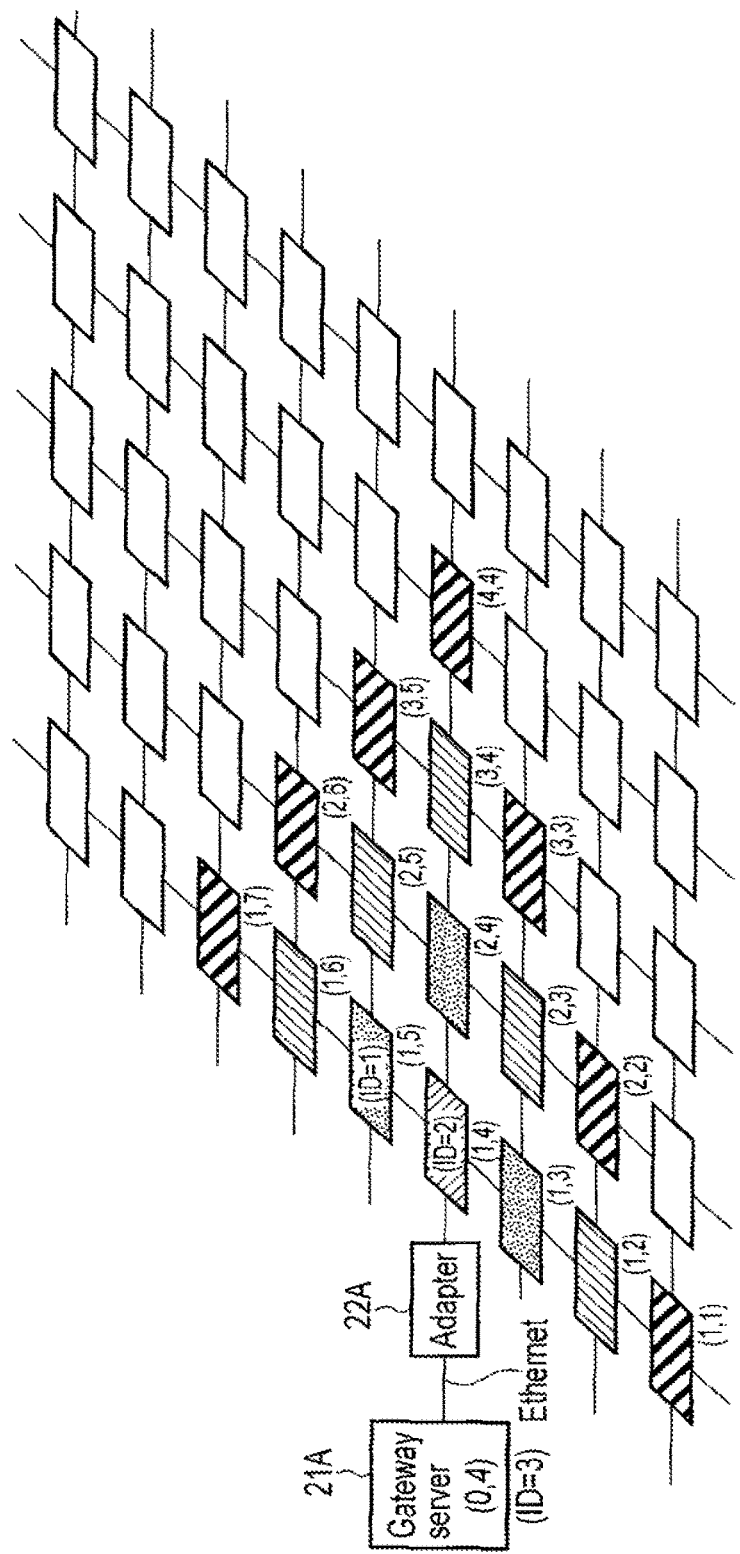

In this case, as illustrated in FIGS. 37B to 37C, the transmission of the data (ID=1) addressed to the memory node having the address (1,5) closest to the gateway server 21A is ended earliest.

Figure 37D:
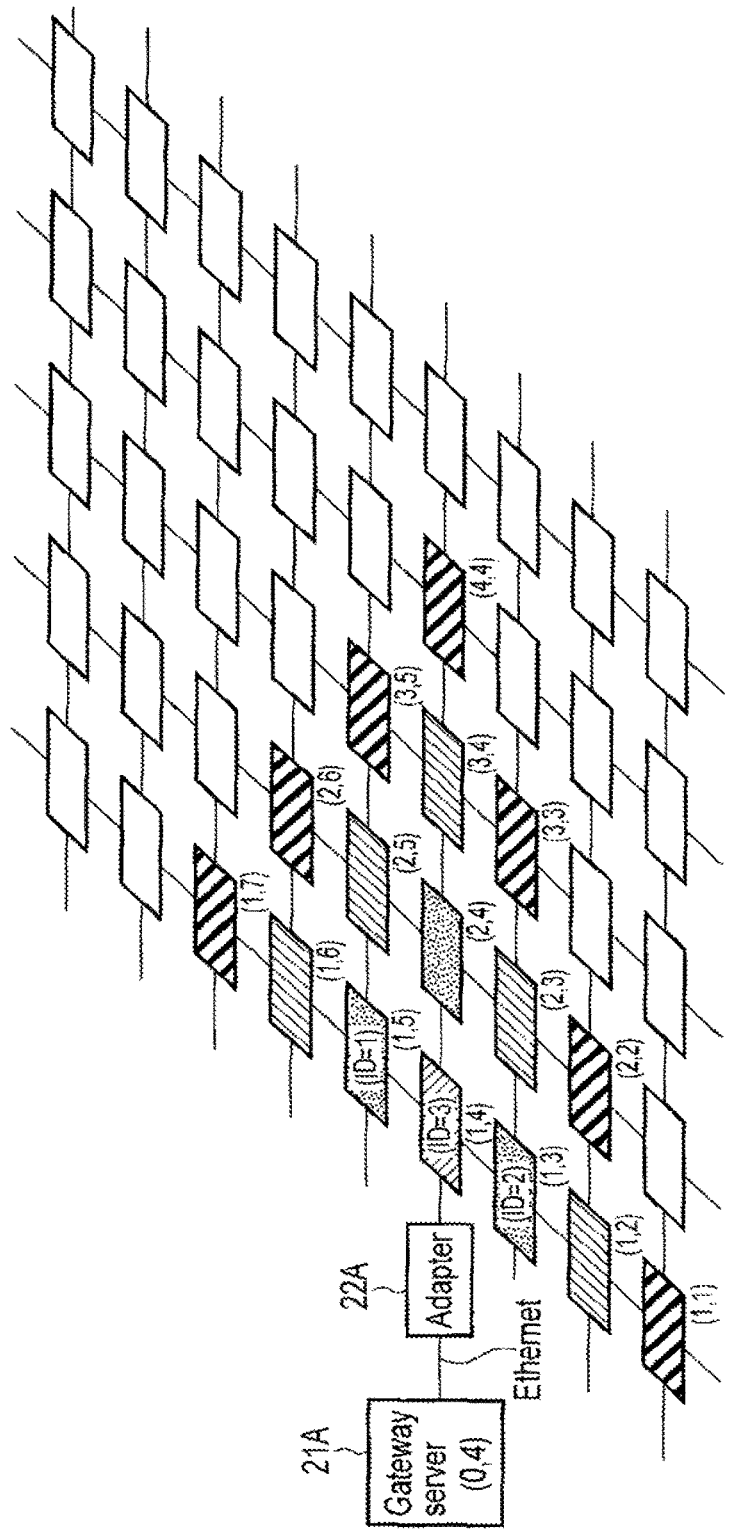
Figure 37E:
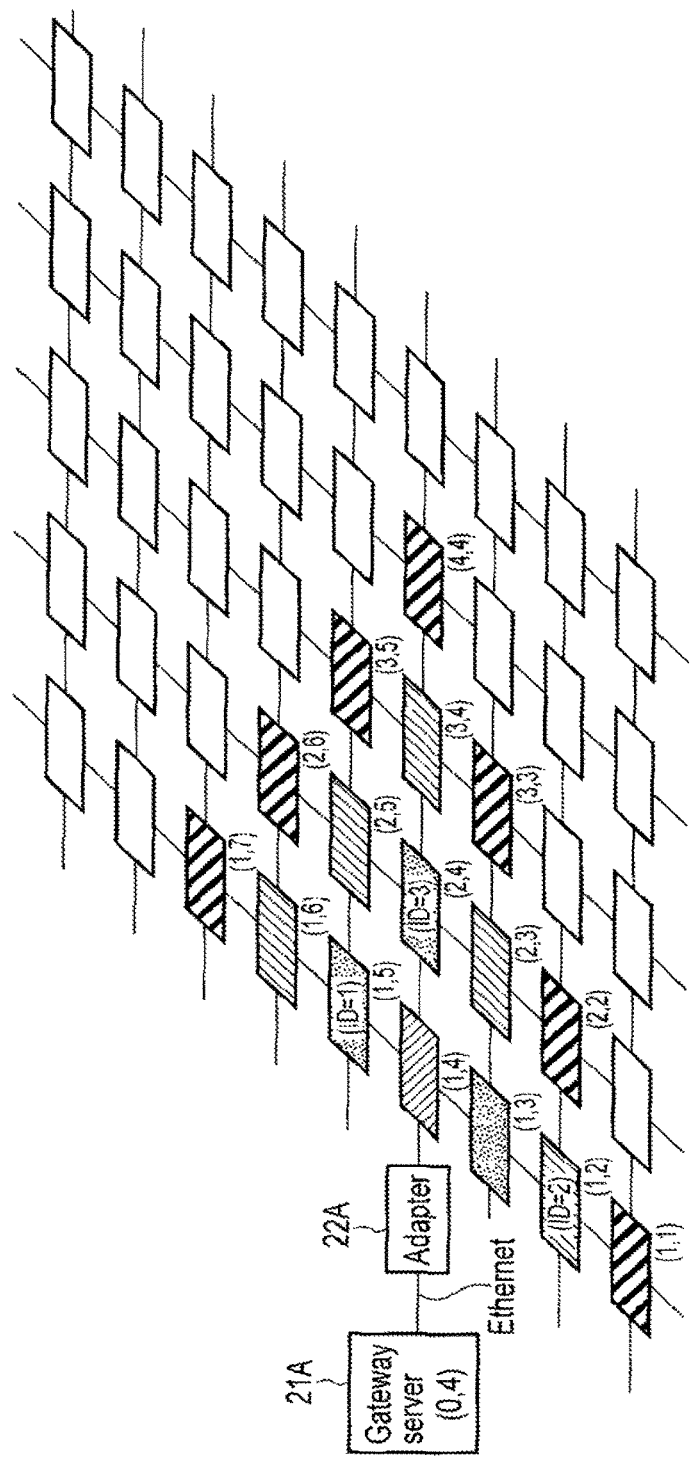

On the other hand, the data (ID=3) addressed to the memory node having the address (4,4) farthest from the gateway server 21A cannot be transmitted to the address (1,4) until the two pieces of data (ID=1 and ID=2) are forwarded from the memory node having the address (1,4) to the adjacent memory node as illustrated in FIG. 37D, and meanwhile it is necessary that the data (ID=3) waits in the gateway server 21A. Even if the data (ID=3) is transmitted to the memory node having the address (1,4) after the waiting, in order that the data reaches the address (4,4), it is necessary to perform the data forwarding at least three times as illustrated in FIGS. 37D to 37G.

On the other hand, FIGS. 38A to 38E illustrate the packet forwarding process in the case that the packet is transmitted from the gateway server 21A to the storage device in the order from data addressed to the memory node farthest from the gateway server 21A to data addressed to the memory node closest to the gateway server 21A (that is, in the order of the data of ID=3, the data of ID=2, and the data of ID=1).

Figure 38C:
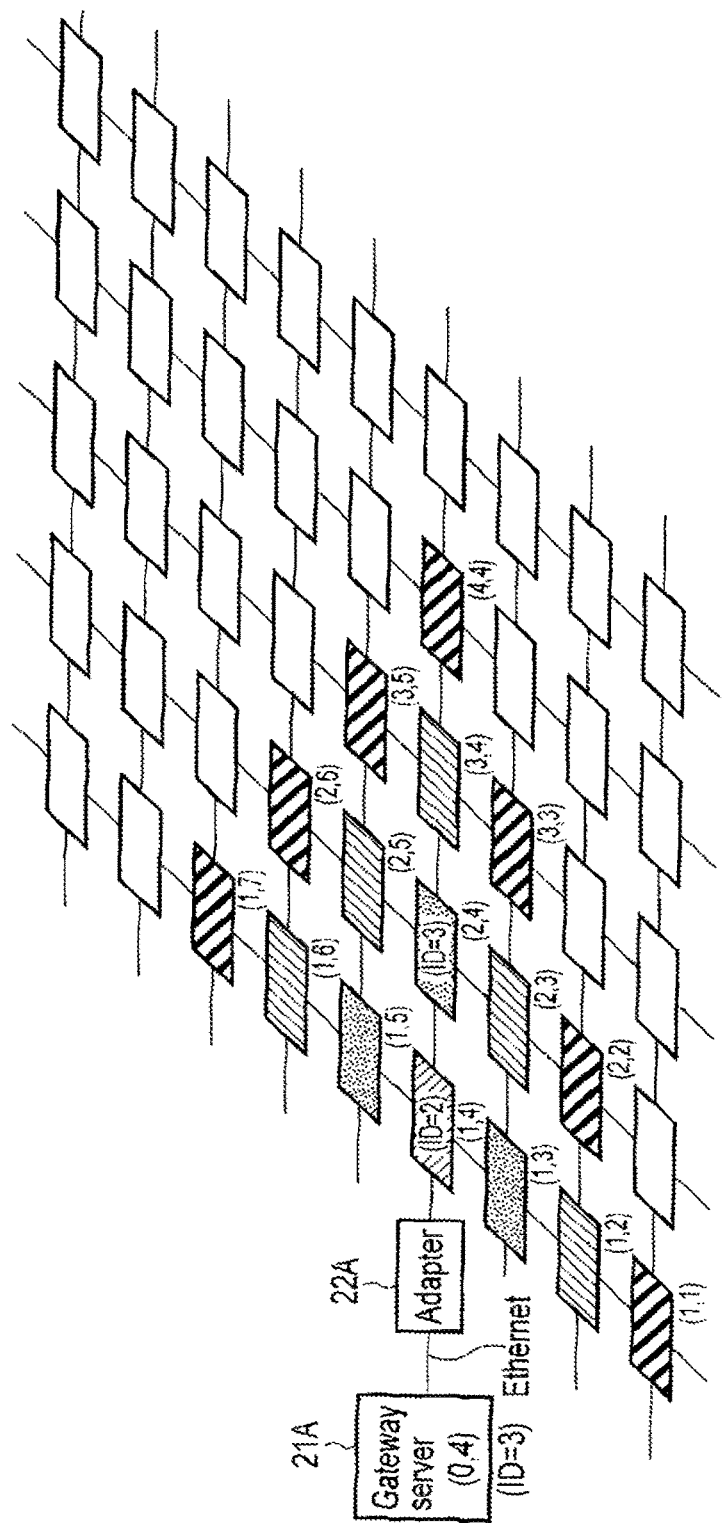
Figure 38D:
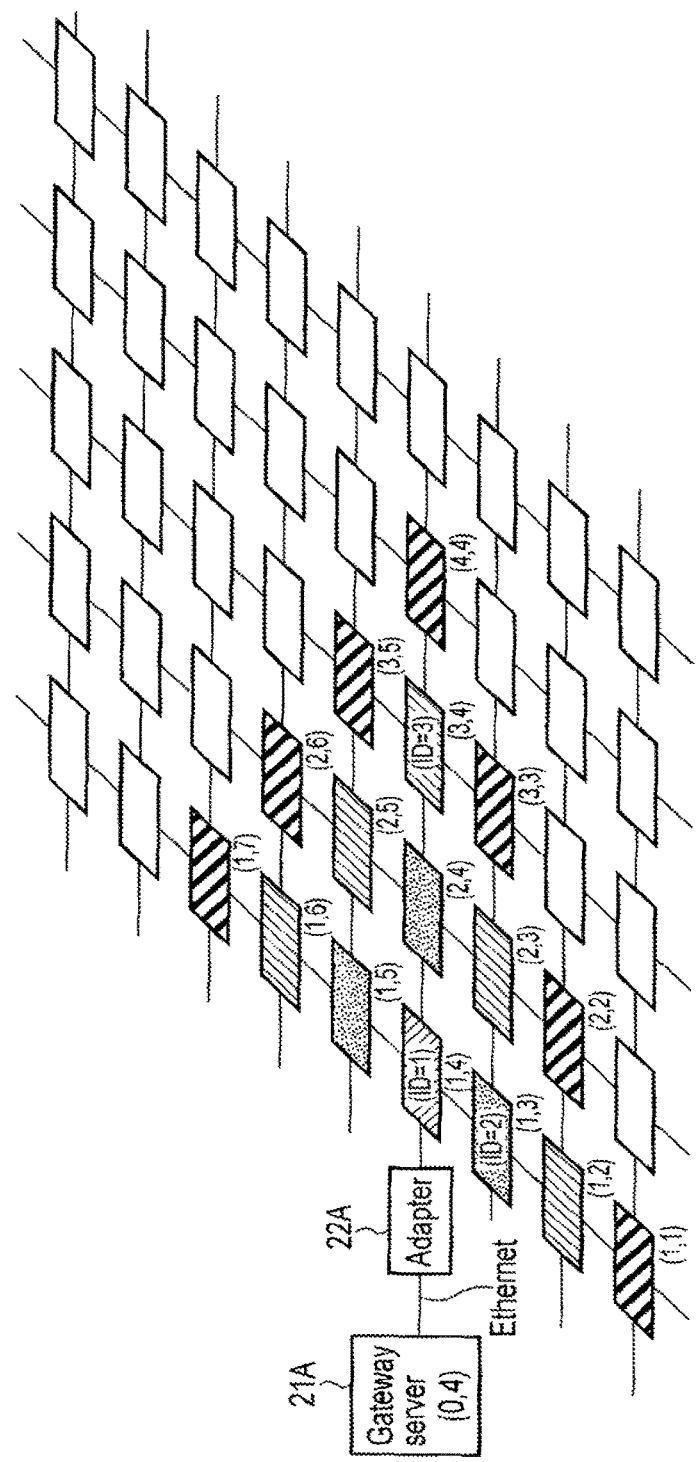

Even in this case, as illustrated in FIGS. 38B to 38D, the data (ID=1) cannot be transmitted to the address (1,4) until the two pieces of data (ID=3 and ID=2) are forwarded from the memory node having the address (1,4) to the adjacent node, and meanwhile it is necessary that the data (ID=1) waits in the gateway server 21A.

Figure 38E:
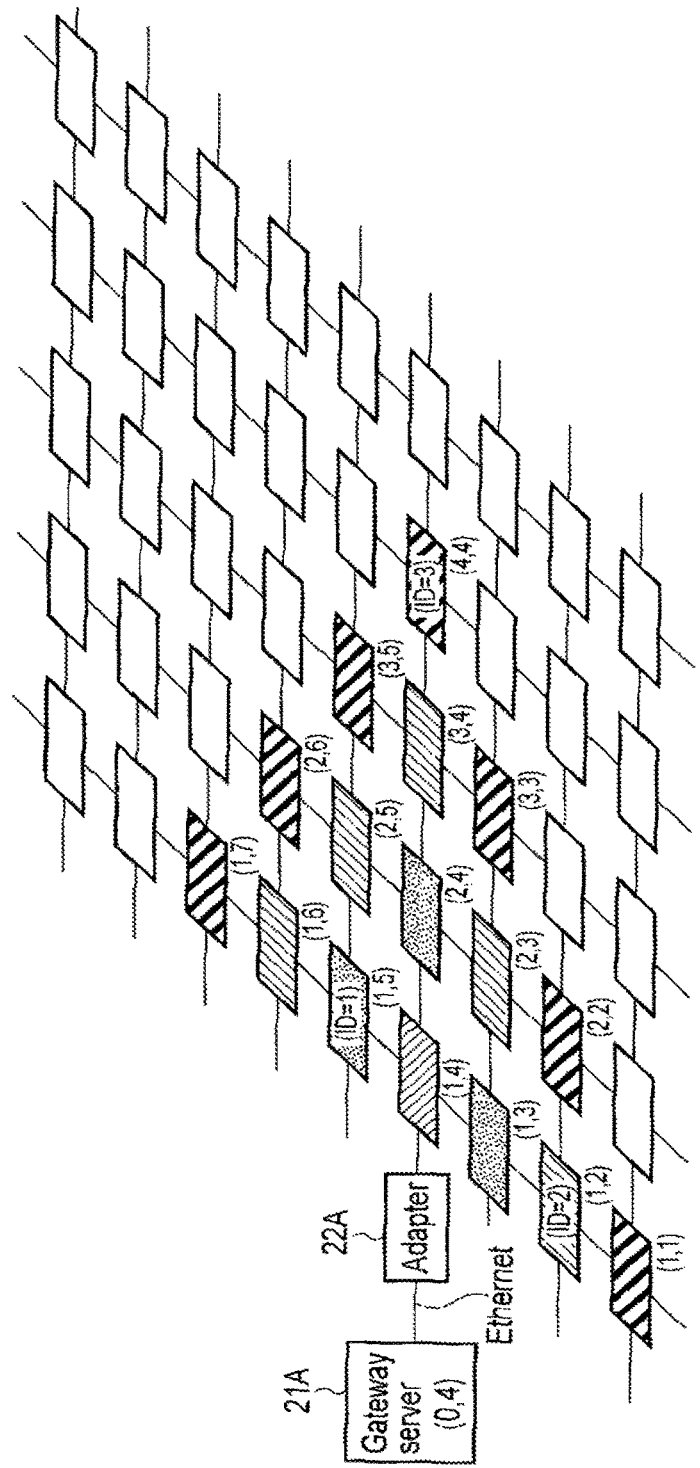

However, the memory node having the address (1,5) that is the address of the lastly-transmitted data (ID=1) is close to the gateway server 21A, and the data reaches the memory node of the destination by the smaller number of forwarding times. On the other hand, although the destination of the data (ID=3) previously transmitted from gateway server 21A is distant from the gateway server 21A, the data (ID=3) reaches the destination earlier because the forwarding is started while another piece of data waits in the gateway server 21A. As a result, as illustrated in FIG. 38E, the three pieces of data simultaneously reach the memory nodes of the destinations.

As can be seen from the comparison of FIGS. 37A to 37G and FIGS. 38A to 38E, the pieces of data are transmitted from the gateway server 21A in the order from the data in which the memory node of the destination is farthest from the gateway server 21A to the data in which the memory node of the destination is closest to the gateway server 21A, so that the time necessary to transmit all the pieces of data can be minimised.

The storage system includes the storage device in which the memory nodes having the same data forwarding time are mutually connected. The tenth embodiment can similarly be applied in the case that the plurality of pieces of data are transmitted to a storage device, such as a storage system in which the memory nodes having the same data forwarding time are connected in a tree shape (see FIG. 36E) and a storage system including the memory nodes having different data forwarding times (see FIG. 36F), in which the memory node having the data forwarding time different from that of the server exist.

As described above, according to the tenth embodiment, the necessary communication time can be minimized when the plurality of pieces of data are transmitted to the memory nodes in which the communication time is different from that of the gateway server. Other configurations and effects are similar to those of the first embodiment.

As described above, according to the first to tenth embodiments, the storage device in which the packet can efficiently be forwarded while the memory node needs not to manage the routing table and the data processing method can be provided.

In the embodiments, the storage device in which the packet can efficiently be forwarded while the memory node needs not to manage the routing table and the data processing method can be provided. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of controlling a plurality of memory nodes, each of the memory nodes including a plurality of input ports, a plurality of output ports, and a memory in which data is stored, each of the memory nodes being configured to output a packet input to the input port to one of the output ports, the memory nodes being mutually connected at the input ports and the output ports and have addresses, the method comprising;

determining a straight line connecting a memory node of a destination address and a memory node of a source address, the destination address indicating an address of a memory node of a target for the packet to be forwarded; and forwarding a packet to a memory node adjacent to the memory node of a current position address such that the packet proceeds based on the straight line, wherein while the packet is forwarded from the memory node of the source address to the memory node of the destination address, a trajectory of the packet forwarded from the memory node of the source address to the memory node of the destination address is along the straight line, and the packet proceeds across the straight line at least once.

2. The method according to claim 1, further comprising switching the output port based on information including at least the destination address, the current position address, the source address and output port occupancy information of the memory node of the current position address.

3. The method according to claim 2, further comprising output buffers connected to the output ports, wherein the output port occupancy formation indicates whether each of the output buffers is occupied by a packet.

4. The method according to claim 1, wherein the forwarding includes forwarding the packet to the adjacent memory node in a direction determined by output port occupancy information of the memory node of the current position address, and wherein the output port occupancy information indicates whether each of the output ports can forward the packet.

5. The method according to claim 1, wherein the forwarding includes forwarding the packet to the memory node in which a distance between the memory node of the destination address and a memory node of an output position of the packet is minimized in the plurality of memory nodes adjacent to the memory node of the current position address.

6. The method according to claim 1, wherein a part of the memory nodes includes additional input ports and additional output ports and is connected to at least one of computers and non-adjacent memory nodes by the additional input ports and the additional output ports.

7. The method according to claim 6, wherein the memory node connected to the non-adjacent memory node includes an additional address that is determined by relative physical positions of the memory nodes connected to the non-adjacent memory node in addition to the address, and
in the case that the memory node connected to the non-adjacent memory node receives a packet addressed to other memory node, the packet controller of the memory node switches the output port based on information including at least one of the addresses and the additional addresses of the self-node and a connected non-adjacent memory node.

8. The method according to claim 6, wherein the plurality of memory nodes are divided into areas including the same number of memory nodes, and wherein memory nodes located in centers of the area are connected to other non-adjacent nodes by the additional input ports and the additional output ports.

9. The method according to, claim 1, further comprising a relay that is connected to the plurality of memory nodes, wherein the relay transmits the packet to the memory node that has a minimum distance to the memory node of the destination address.

10. The method according to claim 1, wherein the memory node further comprises an address converter, and wherein the m node uses the address converter to convert a key into an address with respect to each record of key-value type data held by the memory node and transmits the packet including the value to the address.

11. The method according to claim 1, wherein the memory nodes are arranged on a lattice coordinate, and wherein the destination address, the current position address and the source address are determined by their physical positions on the lattice coordinate.

12. The method according to claim 11, wherein the memory nodes are three-dimensionally arranged on a lattice coordinate.

13. A method of controlling a plurality of memory nodes, each of the memory nodes including a plurality of input ports, a plurality of output ports, and a memory in which data is stored, each of the memory nodes being configured to output a packet input to the input port to one of the output ports, the memory nodes being mutually connected at the input ports and the output ports and have addresses, the method comprising:
determining which one of four areas separated by a first straight line connecting the memory node of a destination address and the memory node of a source address and a second straight line orthogonal to the first straight line the memory node of a current position address belongs to, the destination address indicating an address of a memory node of a target for the packet to be forwarded, and
forwarding a packet to an adjacent memory node in a direction determined by output port occupancy information of the memory node of the current position address in two directions allocated to the area to which the memory node of the current position address belongs, wherein
while the packet is forwarded from tine memory node of the source address to the memory node of the destination address, a trajectory of the packet forwarded from the memory node of the source address to the memory node of the destination address is along the straight line, and the output port occupancy information indicates whether each of the output ports can forward the packet.

14. The method according to claim 13, wherein while the packet is forwarded from the memory node of the source address to the memory node of the destination address, the packet proceeds across the straight line at least once.

15. The method according to claim 13, further comprising output buffers connected to the output ports,
wherein the output port occupancy information indicates whether each of the output buffers is occupied by a packet.

16. A method of controlling a plurality of memory nodes, each of the memory nodes including a plurality of input ports, a plurality of output ports, and a memory in which data is stored, each of the memory nodes being configured to output a packet input to the input port to one of the output ports, the memory nodes being mutually connected at the input ports and the output ports and have addresses, the method comprising:
determining which one of eight areas separated by a first straight line connecting the memory node of a destination address and the memory node of a source address, a second straight line orthogonal to the first straight line, and two straight lines passing through the memory node of the destination address and extending along a direction in which the memory nodes are arrayed the memory node of a current position address belongs to, the destination address indicating an address of a memory node of a target for the packet to be forwarded, and
forwarding a packet to an adjacent memory node in a direction determined by output port occupancy information of the memory node of the current position address in two directions allocated to the area to which the memory node of the current position address belongs, wherein
while the packet is forwarded from the memory node of the source address to the memory node of the destination address, a trajectory of the packet forwarded from the memory node of the source address to the memory node of the destination address is along the straight line, and the output port occupancy information indicates whether each of the output ports can forward the packet.

17. The method according to claim 16, wherein while the packet is forwarded from the memory node of the source address to the memory node of the destination address, the packet proceed s across the straight line at least once.

18. The method according to claim 16, further comprising output buffers connected to the output ports,
wherein the output port occupancy information indicates whether each of the output buffers is occupied by a packet.

* * * * *